United States Patent [19]
Hosoya et al.

[11] Patent Number: 5,504,649
[45] Date of Patent: Apr. 2, 1996

[54] ELECTRONIC APPARATUS SYSTEM INCLUDING EXPANSION UNIT WHICH HAS AN EXPANSION DEVICE FOR EXPANDING THE FUNCTION OF AN ELECTRONIC APPARATUS AND WHICH IS CONNECTABLE TO THE ELECTRONIC APPARATUS BY MEANS OF A CARD CONNECTOR

[75] Inventors: Ryo Hosoya; Takaichi Kobayashi, both of Tokyo, Japan

[73] Assignee: Kabushiki Kaisha Toshiba, Kawasaki, Japan

[21] Appl. No.: 446,153

[22] Filed: May 22, 1995

Related U.S. Application Data

[60] Continuation of Ser. No. 215,419, Mar. 21, 1994, abandoned, which is a division of Ser. No. 940,641, Sep. 4, 1992, abandoned.

[30] Foreign Application Priority Data

Sep. 6, 1991 [JP] Japan ................... 3-071836 U
Sep. 6, 1991 [JP] Japan ....................... 3-226847

[51] Int. Cl.⁶ .................. G06F 1/16; H05K 7/12
[52] U.S. Cl. ........................... 361/686; 361/684
[58] Field of Search ............ 364/708.1; 312/223.2, 312/223.3; 361/679, 683–686

[56] References Cited

U.S. PATENT DOCUMENTS

| | | | |
|---|---|---|---|
| D. 276,342 | 11/1984 | Kitai . | |
| 4,002,892 | 1/1977 | Zielinski . | |
| 4,530,066 | 7/1985 | Ohwaki et al. | 364/708.1 |
| 4,654,818 | 3/1987 | Wetterau, Jr. . | |
| 4,680,674 | 7/1987 | Moore | 361/686 |
| 4,769,764 | 9/1988 | Levanon | 364/708.1 X |
| 4,788,658 | 11/1988 | Hanebuth | 361/684 |
| 4,858,162 | 8/1989 | Kieffer et al. | 364/708.1 X |
| 4,969,830 | 11/1990 | Daly et al. | 361/683 X |
| 5,030,128 | 7/1991 | Herron et al. | 361/683 X |
| 5,315,478 | 5/1994 | Cadwell et al. | 361/684 |

FOREIGN PATENT DOCUMENTS

| | | | |
|---|---|---|---|
| 0332793A1 | 9/1989 | European Pat. Off. | H05K 7/14 |
| 0426414A2 | 5/1991 | European Pat. Off. | G06F 13/40 |
| 49-25332 | 3/1974 | Japan . | |
| 51-77033 | 6/1976 | Japan | G06F 1/00 |
| 53-29057 | 7/1978 | Japan | G06F 1/00 |
| 54-96546 | 7/1979 | Japan | G06F 15/02 |
| 55-100236 | 7/1980 | Japan | G06F 15/02 |
| 57-17041 | 1/1982 | Japan | G06F 1/00 |
| 58-44647 | 3/1983 | Japan | G06F 15/02 |
| 60-170831 | 11/1985 | Japan | G06F 1/00 |
| 62-30096 | 8/1987 | Japan | G06F 1/00 |
| 1520573 | 8/1978 | United Kingdom . | |

OTHER PUBLICATIONS

*IBM Technical Disclosure Bulletin, vol. 27, No. 12, May 1985, pp. 6887–6890, "Extension Device For A Personal Computer".

Primary Examiner—Michael W. Phillips
Attorney, Agent, or Firm—Limbach & Limbach

[57] ABSTRACT

An electronic apparatus system comprises a portable computer and an expansion unit containing a FDD for expanding the function of the computer. The computer has an inlet into which a memory card having a terminal is accessibly inserted, and a first connector is provided in the inlet, and the terminal of the memory card is detachably connected to the first connector. The expansion unit attaches underneath the computer and has a second connector connected to the FDD. The second connector is accessibly inserted into the third thru an opening in the bottom of the computer and connected to the first connector at the time of the insertion, so that the computer and the expansion unit are electrically connected to each other. The second connector is mounted on a slider.

20 Claims, 35 Drawing Sheets

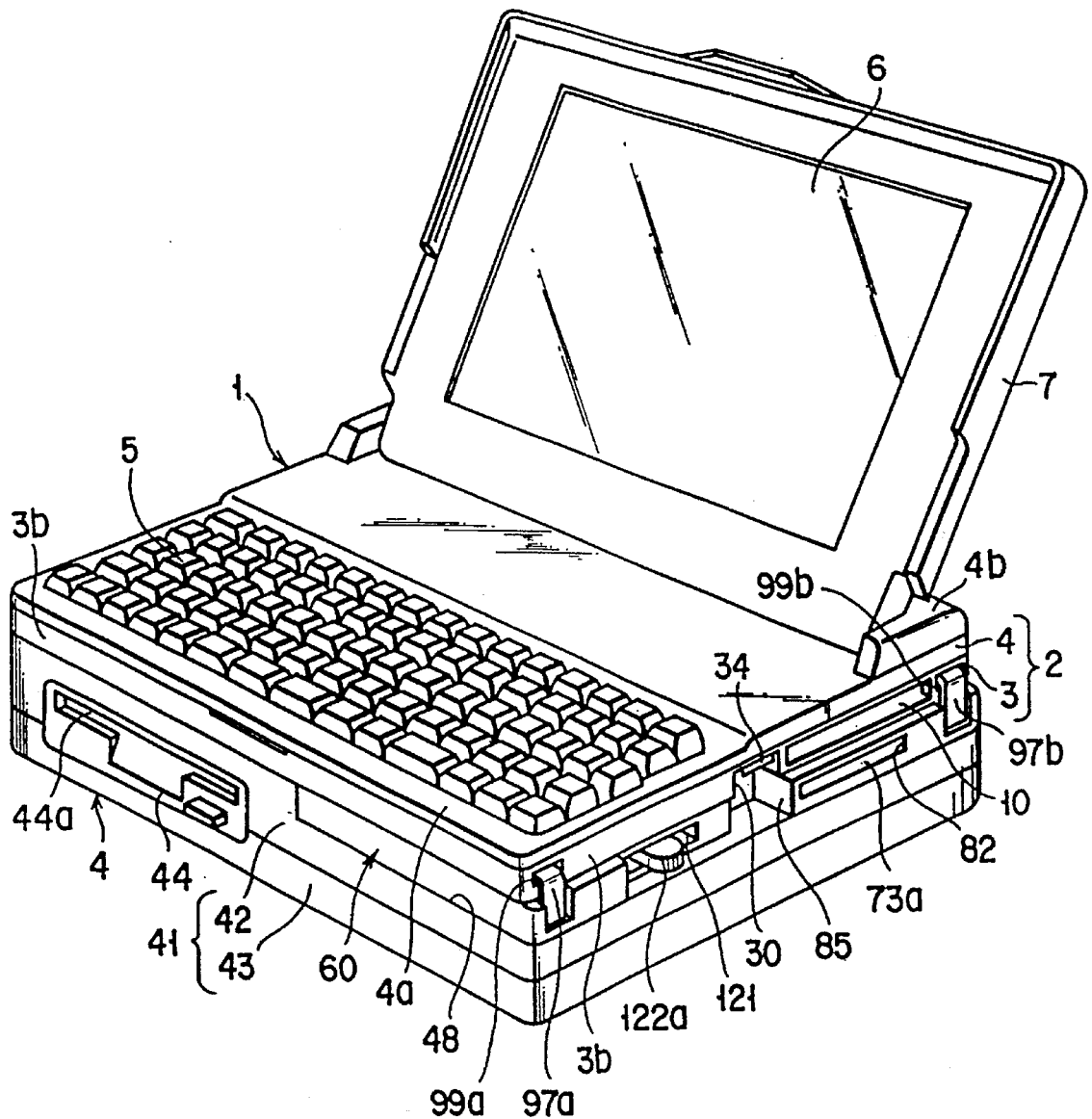
F I G. 1

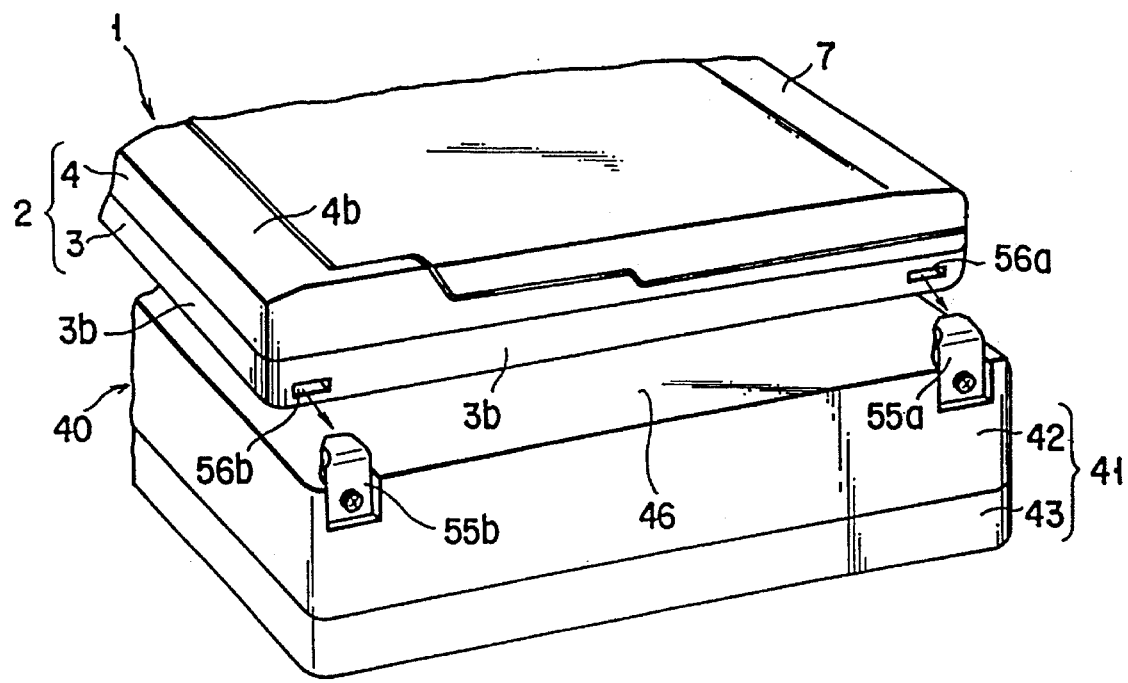
F I G. 4

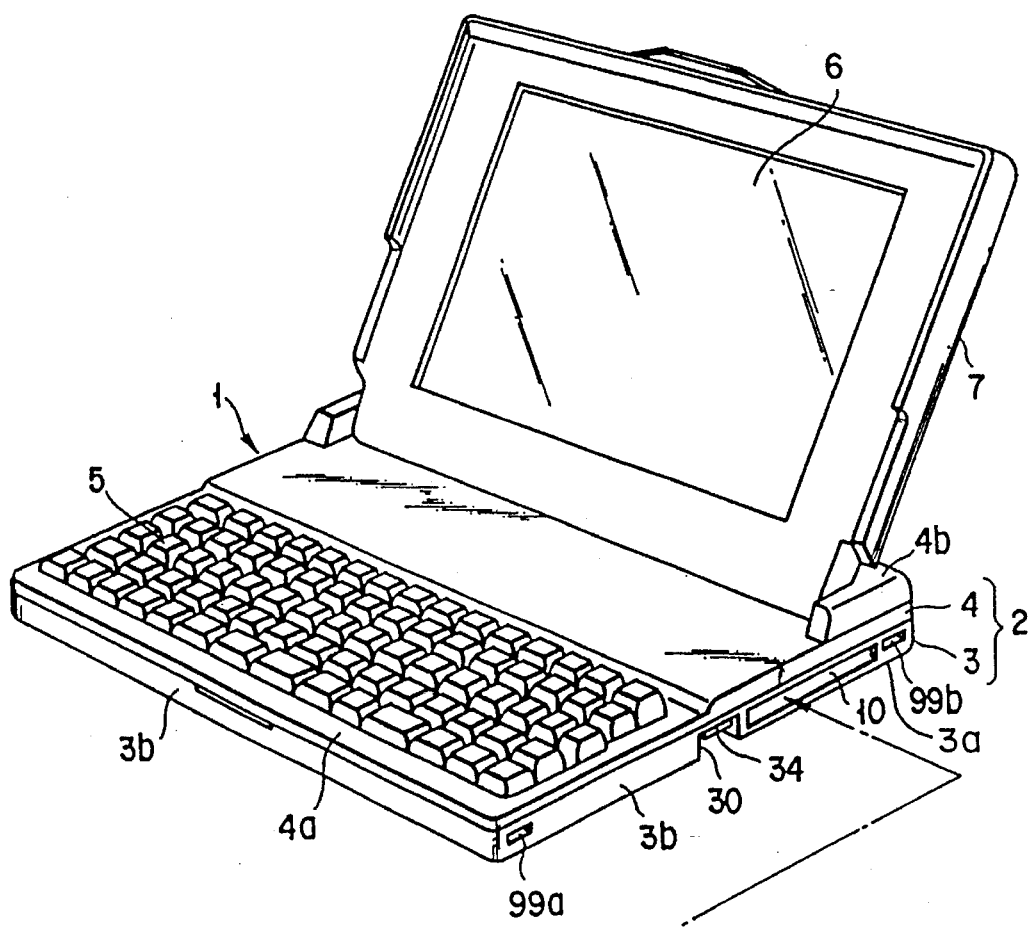
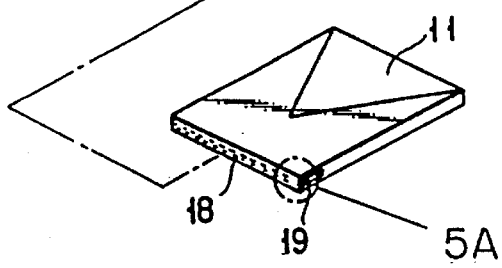
FIG. 5
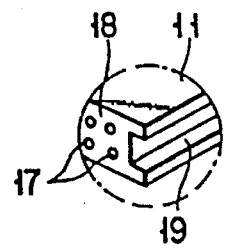
FIG. 5A

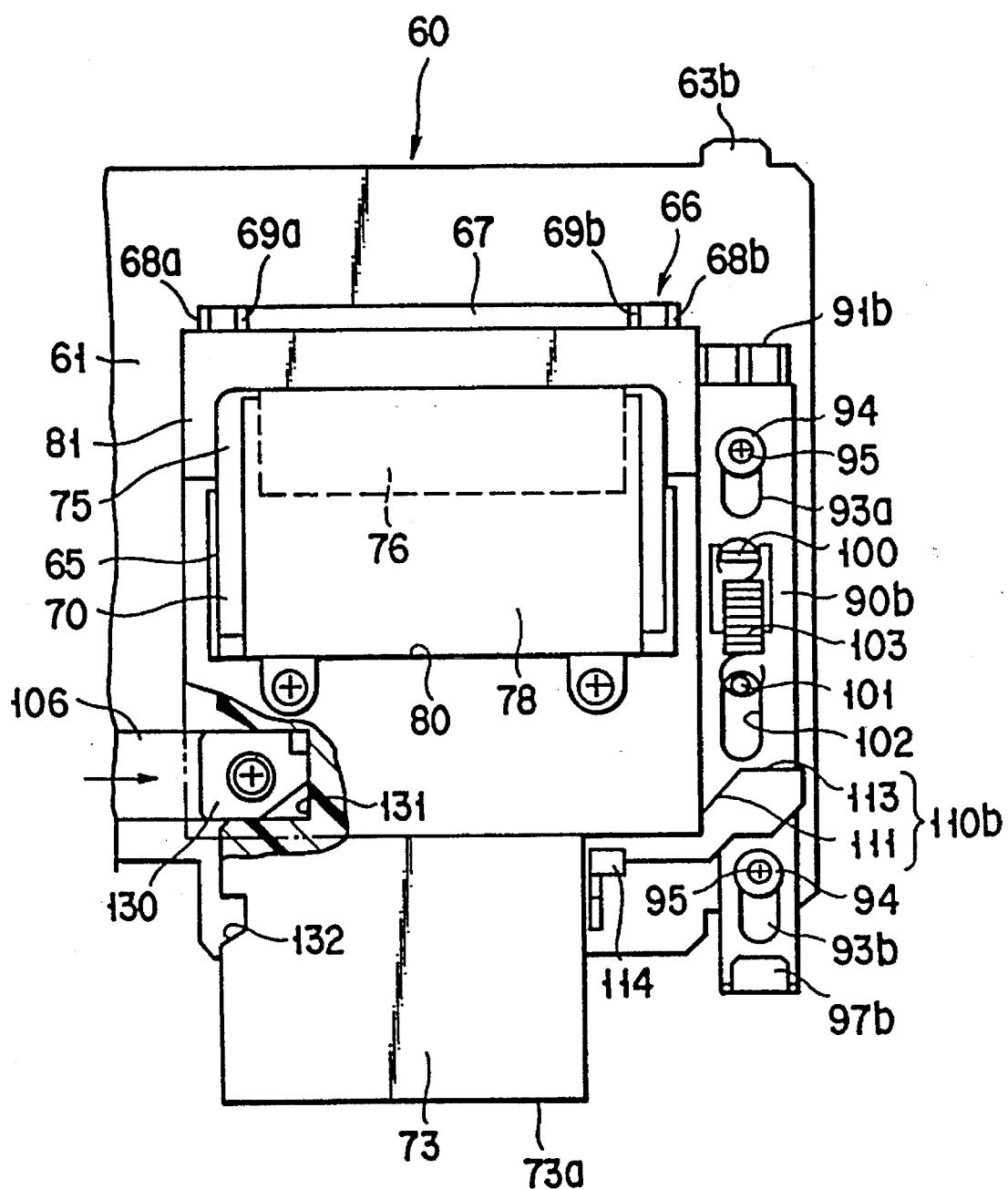
F I G. 11

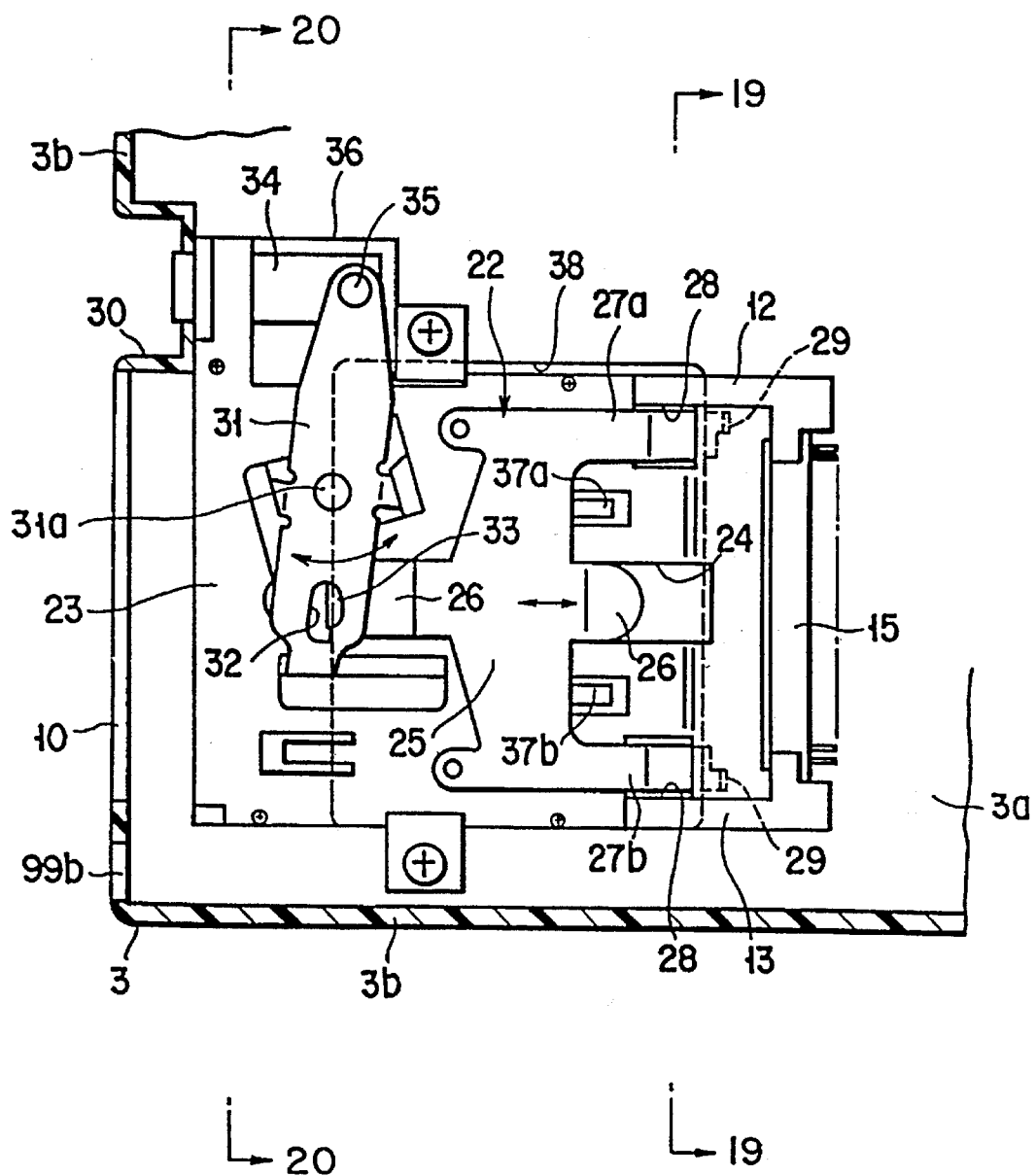
F I G. 15

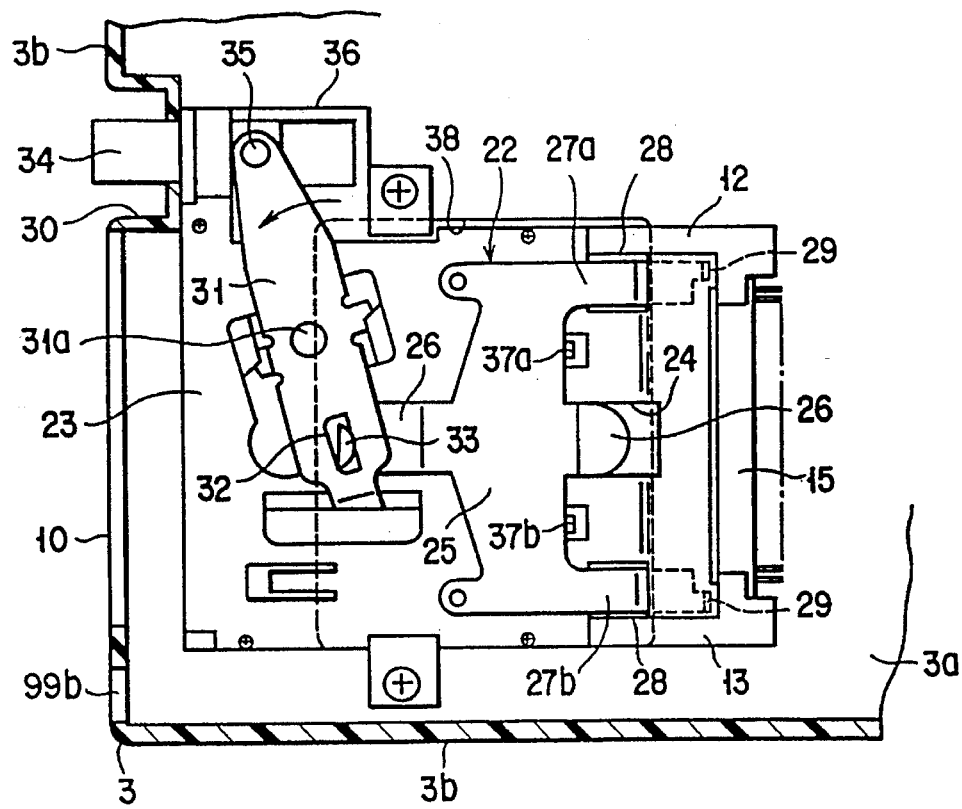
F I G. 16
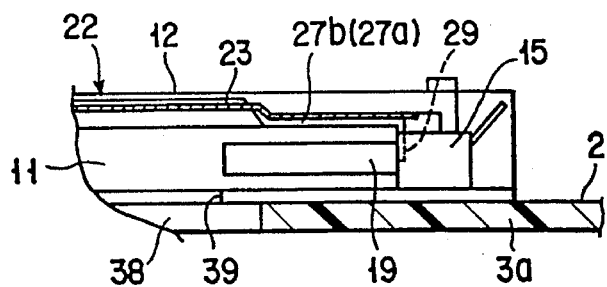
F I G. 17
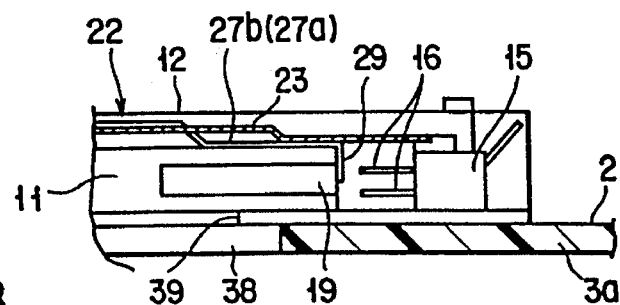
F I G. 18

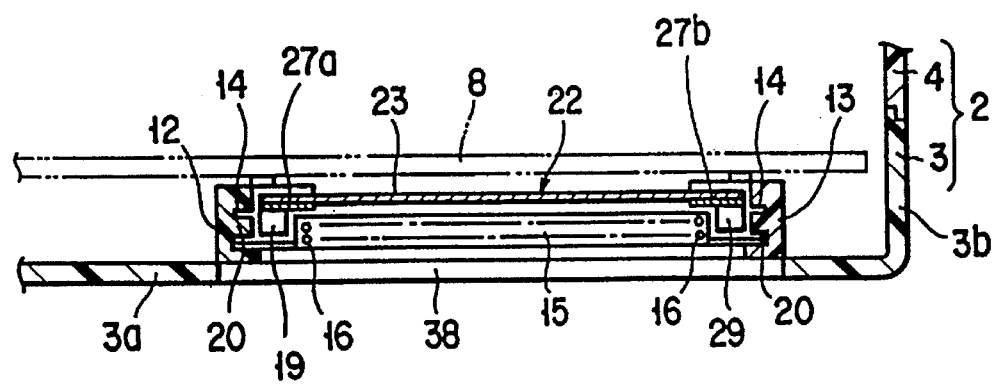
F I G. 19
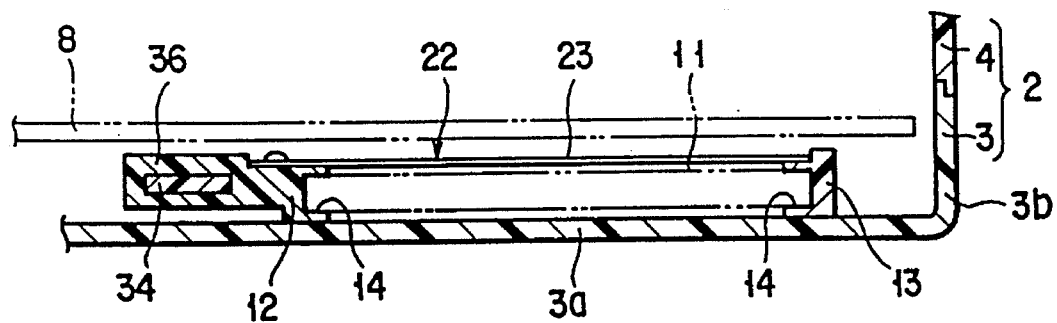
F I G. 20

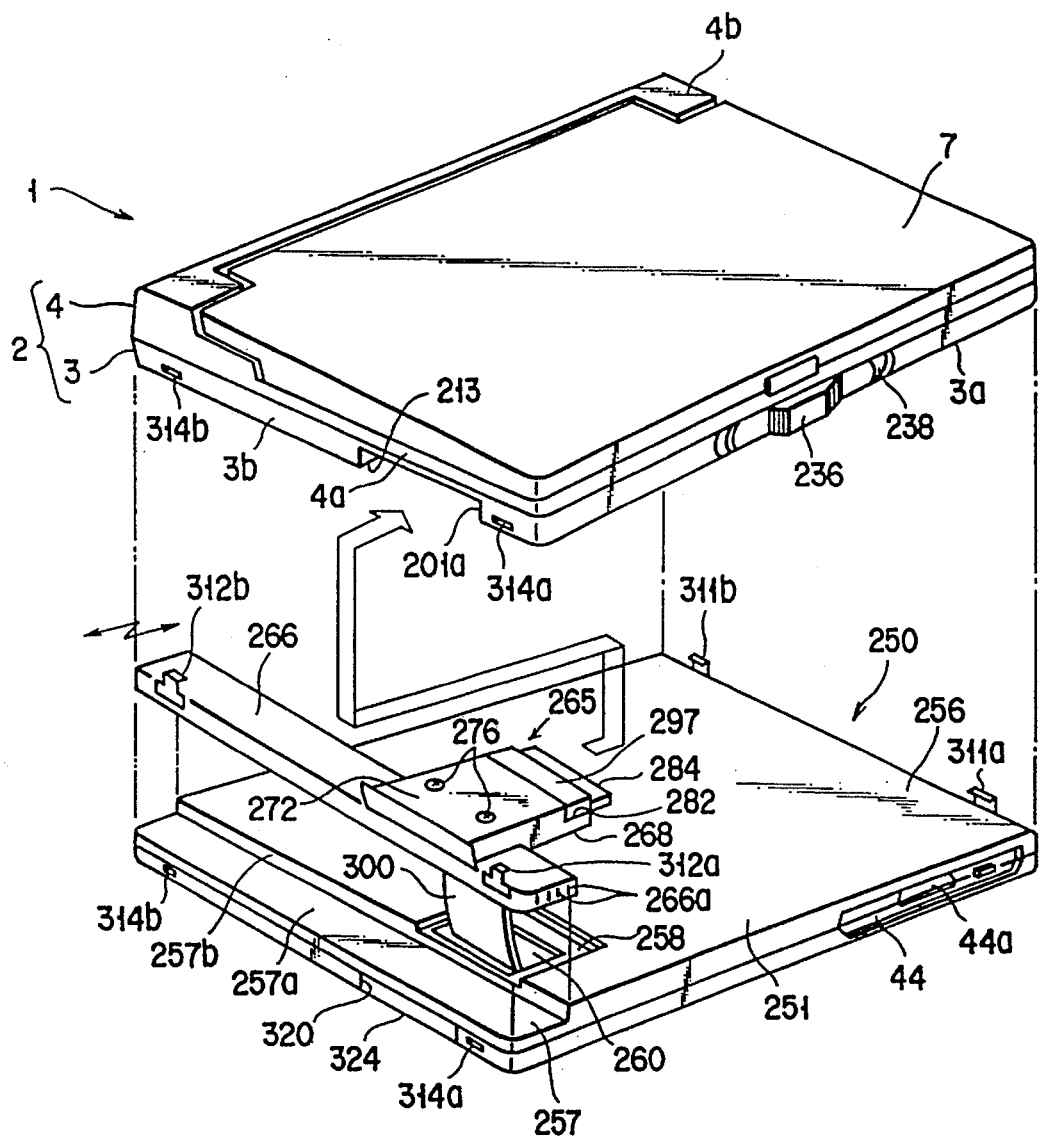
F I G. 21

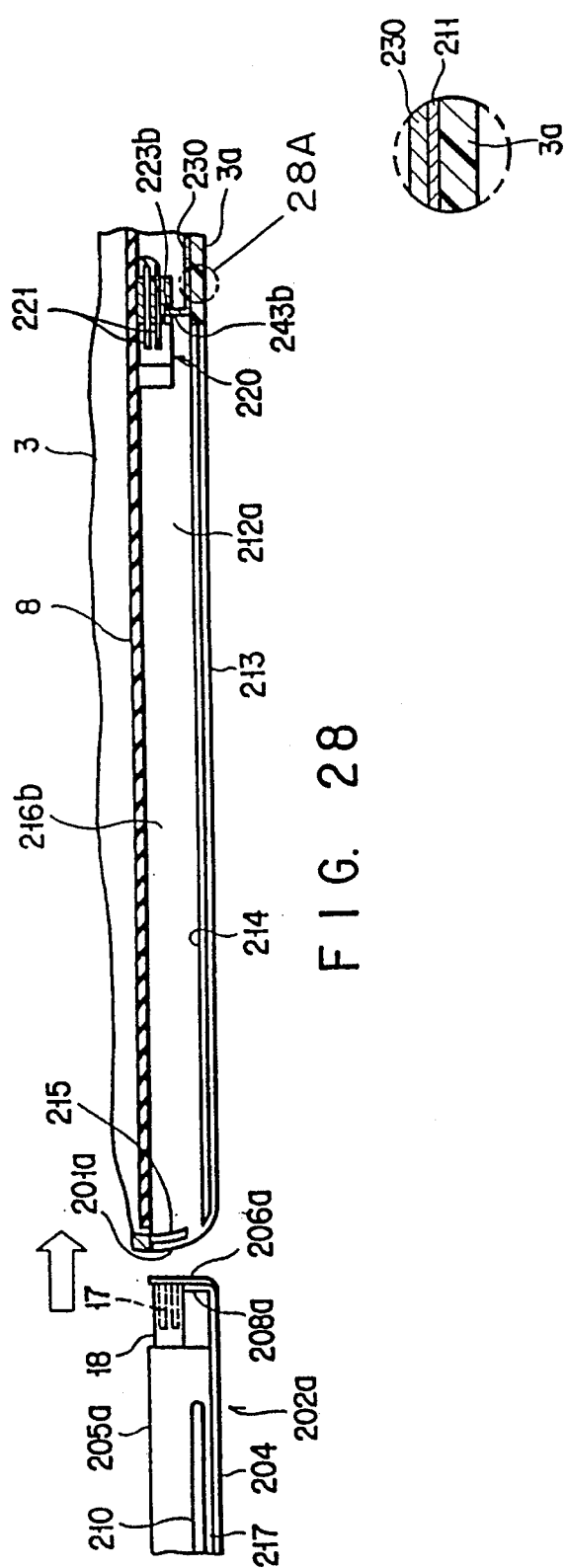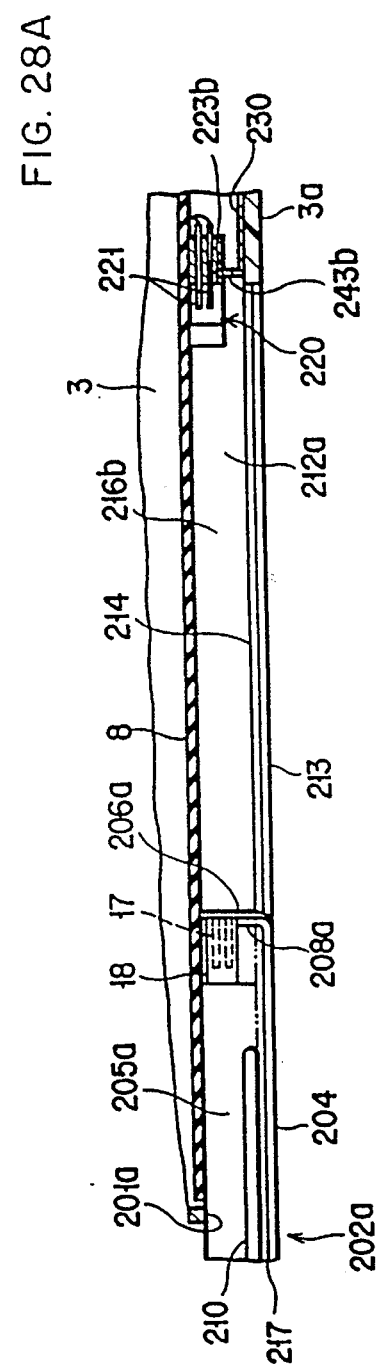

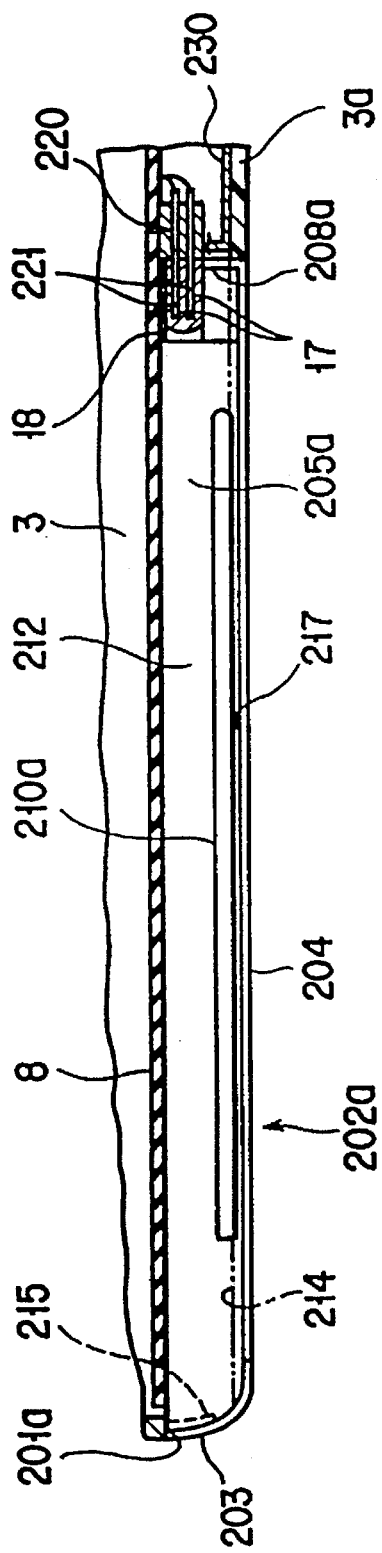
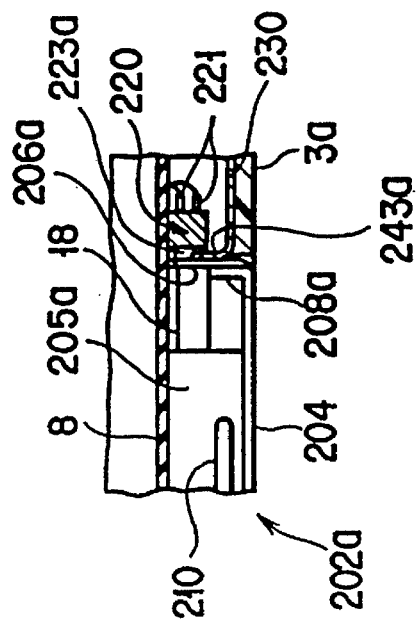
FIG. 30
FIG. 31

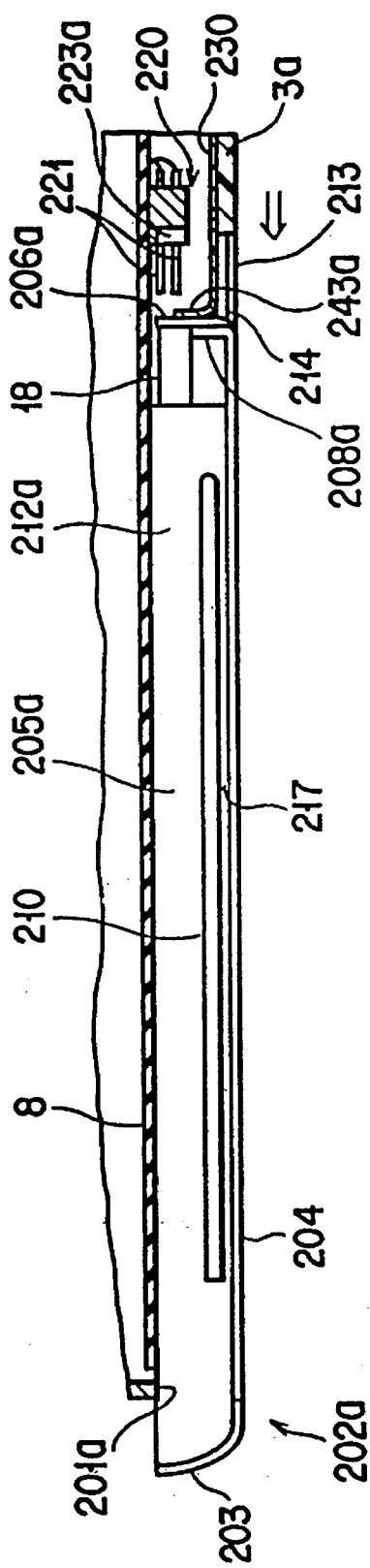
F I G. 32
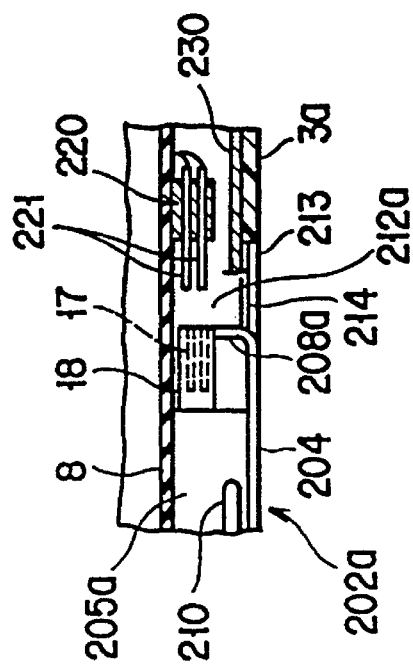
F I G. 33

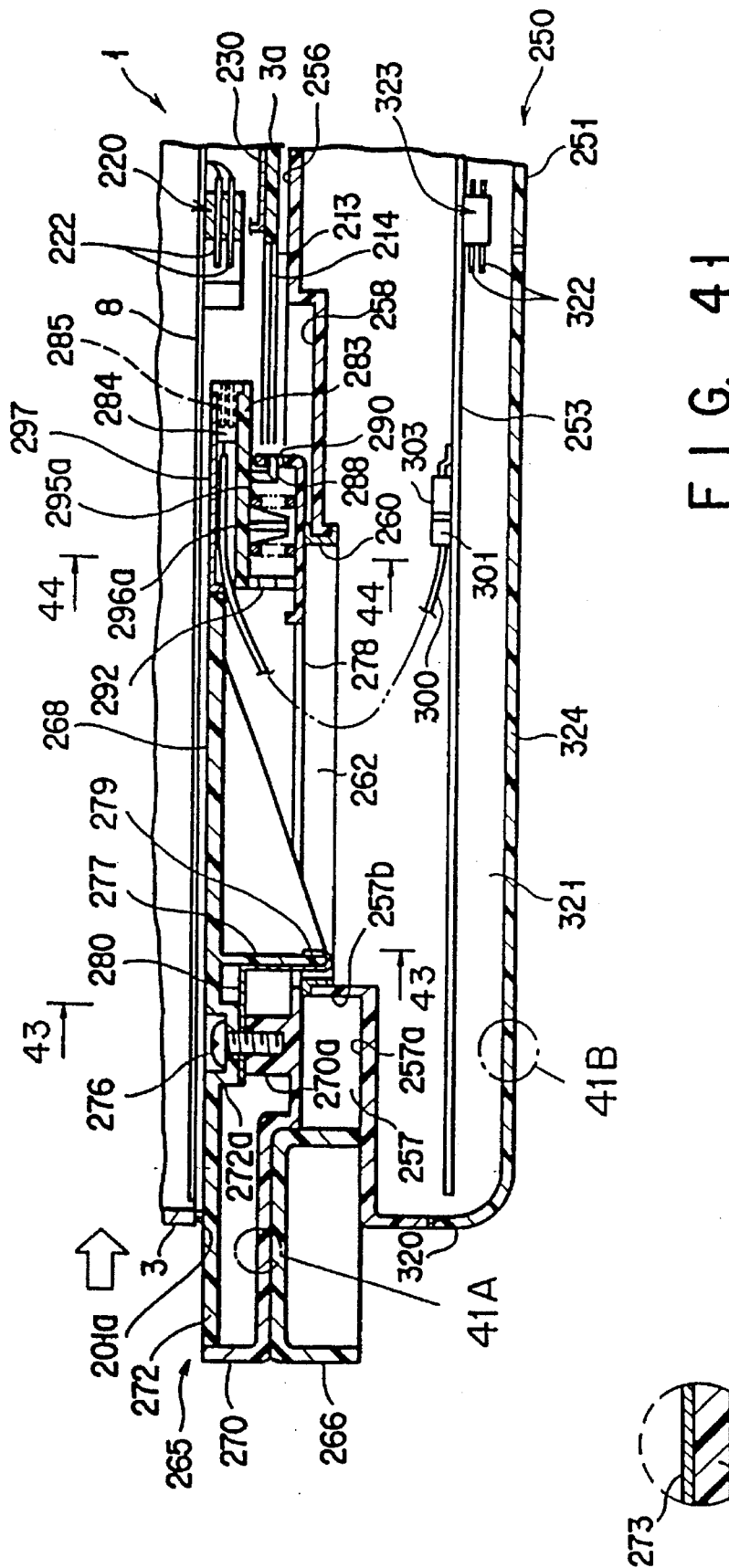
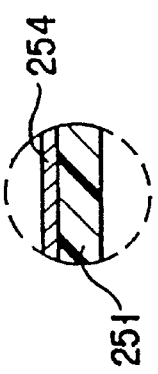
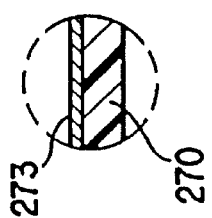
FIG. 41
FIG. 41B
FIG. 41A

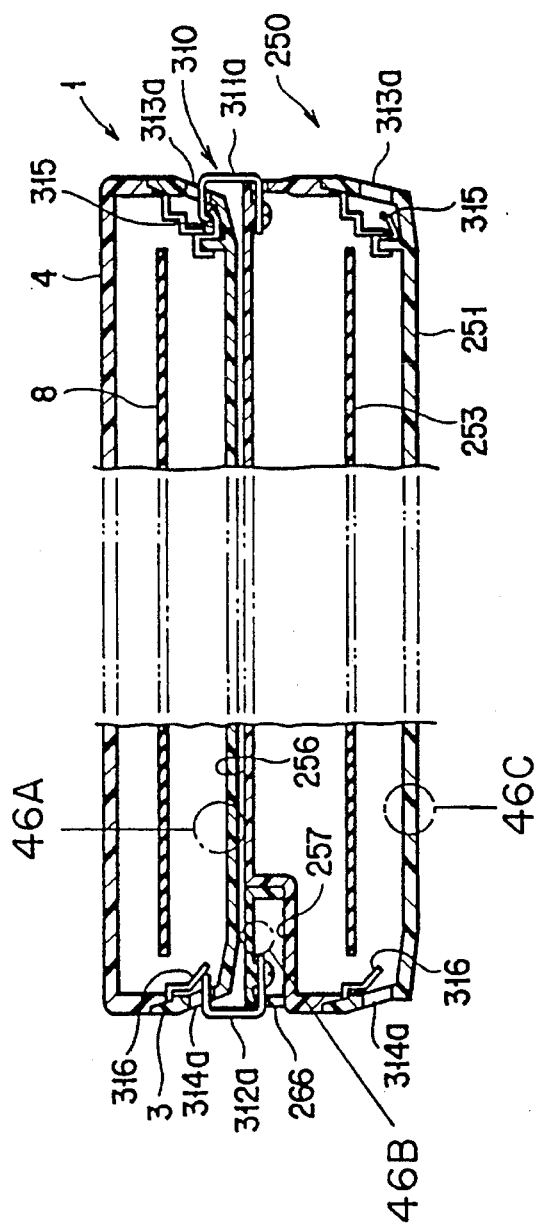
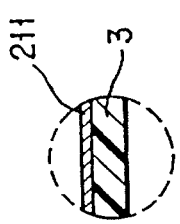
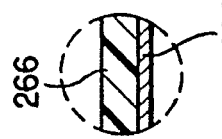
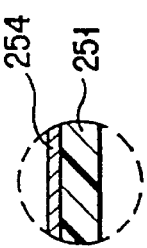
FIG. 46
FIG. 46A
FIG. 46B
FIG. 46C

ELECTRONIC APPARATUS SYSTEM INCLUDING EXPANSION UNIT WHICH HAS AN EXPANSION DEVICE FOR EXPANDING THE FUNCTION OF AN ELECTRONIC APPARATUS AND WHICH IS CONNECTABLE TO THE ELECTRONIC APPARATUS BY MEANS OF A CARD CONNECTOR

This is a continuation of application Ser. No. 08/215,419 filed on Mar. 21, 1994, now abandoned, which was a divisional application of U.S. Ser. No. 07/940,641, filed Sep. 4, 1992, now abandoned.

BACKGROUND OF THE INVENTION

1. Field of the Invention

The present invention relates to an electronic apparatus system comprising a small-sized electronic apparatus unit such as a portable book-type personal computer or word-processor and an expansion unit having an expansion device for expanding the function of the electronic apparatus unit.

2. Description of the Related Art

There has been widely used a portable book-type or laptop personal computer since such a personal computer can be easily carried and freely used at a location where a commercial power source cannot be obtained.

In this type of the computer, it has been conventionally known to have a computer wherein an inlet for inserting a memory card is formed in a base unit having a keyboard and a display unit, and a connector to which the end portion of the memory card is electrically connected is formed at the final end of the inlet. In this type of the computer, since the entire shape of the base unit is compactly designed so as to miniaturize and lighten the whole body of the computer, there are provided only minimum functions working as an electronic apparatus. Due to this, in a case where a function other than the above minimum functions is needed, an expansion device having an additional function such as a hard disc driving device or a modem for communication is connected to the computer by a cable.

Therefore, in this type of the computer, an expansion connector is provided in the back surface of the base unit. If a cable connector is inserted into the expansion connector, the electrical connection between the computer and the expansion device can be made.

However, in this conventional computer, the connector for connecting the memory card and the expansion connector for connecting the expansion device must be provided in the base unit whose size is largely limited. Due to this, a space for providing two types of connectors in the base unit must be ensured, and this prevents the miniaturization of the base unit or causes a problem in the arrangement of the parts in the base unit.

SUMMARY OF THE INVENTION

Accordingly an object of the present invention is to provide an electronic apparatus system wherein an expansion unit for expanding the functions of the electronic apparatus can be connected to an electronic apparatus unit by use of a connector for connecting a card-like electronic part in a manner that a base unit can be miniaturized and lightened, and the arrangement of parts can be realized with no difficulty.

Another object of the present invention is to provide an electronic device system wherein the connection of an expansion unit can be easily carried out without using a special cable for external wiring and no large space in connecting the expansion unit.

In order to achieve the above objects, the electronic apparatus system of the present invention comprises an electronic apparatus unit having a card insertion section into which a card-like electronic part having a terminal is accessibly inserted, and a first connector, provided in the card insertion section, and detachably connected to the terminal, an expansion unit containing an expansion device for expanding the function of the electronic apparatus unit, and a second connector provided in the expansion unit, the second connector is accessibly inserted into the card insertion section and connected to the first connector at the time of the insertion of the second connector into the insertion section, so that the electronic apparatus unit and the expansion unit are electrically connected to each other.

In order to connect the electronic apparatus unit to the expansion unit, the terminal of the card-like electronic part is detached from the first connector, and the card-like electronic part is taken out of the card insertion section. In this state, the second connector is contained in the empty card insertion section, and the second connector is connected to the first connector. By this connection, the electronic apparatus unit and the expansion unit are electrically connected to each other. Therefore, since the first connector for connecting the card-like electronic part can be used as a connector for connection of the expansion unit, there is no need of a special connector, which is conventionally necessary for the expansion unit. In other words, the number of the connectors to be incorporated in the electronic apparatus unit can be reduced by one, so that the mounting space in the electronic apparatus unit can be reduced.

Moreover, in order to achieve the other object, the electronic apparatus system comprises a card-like electronic part having a terminal, an electronic apparatus unit having a bottom surface and a side surface continuous to the bottom surface, the side surface has an inlet into which the card-like electronic part is detachably inserted as the terminal is guided as a head, and the bottom surface has an opening corresponding to the insertion position of the card-like electronic part, and a first connector to which the terminal of the card-like electronic part is detachably connected arranged in the opening, an expansion unit containing an expansion device for expanding the function of the electronic apparatus unit, and the expansion unit having an overlaying surface on which the bottom surface of the electronic apparatus unit is overlaid, and a connector holder projected onto the overlaying surface, and entering the opening when the electronic apparatus unit is overlaid on the overlaying surface, and the connector holder is provided to be movable to a direction connection and separating to/from the first connector in the opening, a second connector provided in the connector holder, and electrically connected to the expansion device, and a connector connection mechanism provided in the expansion unit, moving the connector holder to a direction approaching to the first connector, and electrically connecting the second connector to the first connector.

According to the structure of the present invention, in order to connect the electronic apparatus unit to the expansion unit, the terminal of the card-like electronic part is detached from the first connector, and the card-like electronic part is taken out to the outside of the electronic apparatus unit from the inlet. Under this state, if the electronic apparatus unit is overlaid on the overlaying surface of the expansion unit, the connector holder is inserted into the electronic apparatus unit through the opening portion, and the second connector of the connector holder is opposite to the first connector. Then, the second connector slides the connector holder in a direction approaching to the first connector through the connector operation mechanism. Thereby, the first connector and the second connector are connected to each other, and the electronic apparatus unit and the expansion unit are electrically connected.

Since both connectors are directly connected, no special cable for an external wiring is required, and the connection working of the expansion unit can be easily carried out.

Moreover, since the expansion unit and the electronic apparatus unit are formed to be overlaid on each other, it is possible to increase the number of the expansion units, and a space necessary for expanding the function of the electronic apparatus unit may be small.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 20 show a first embodiment of the present invention;

FIG. 1 is a perspective view showing a state in which a personal computer is overlaid on an expansion unit according to the present invention;

FIG. 2 is a perspective view of the expansion unit;

FIG. 3 is an exploded perspective view showing a state in which a connector unit is detached from a case of the expansion unit;

FIG. 4 is a perspective view showing a state which is just before a personal computer is overlaid on an overlaying surface of the expansion unit;

FIG. 5 is a perspective view showing a state in which a memory card is taken out of the personal computer;

FIG. 5A is an enlarged view of the encircled portion of FIG. 5 labeled 5A;

FIG. 6 is a cross sectional view showing a state, which is just before the personal computer is overlaid on the overlaying surface of the expansion unit;

FIG. 7 is a cross sectional view showing a state in which the personal computer is overlaid on the overlaying surface of the expansion unit, and a connector holder is inserted into an opening;

FIG. 8 is a cross sectional view showing a state in which the personal computer is overlaid on the overlaying surface of the expansion unit, and a first connector and a second connector are connected to each other;

FIG. 9 is a perspective view showing the connector holder, a connector operation mechanism for operating the connector holder, and a hook operation mechanism of a movable hook;

FIG. 10 is a plane view showing the connector operation mechanism, the hook operation mechanism, and a holding mechanism contained in a connector unit;

FIG. 11 is a plane view, partially a cross section, showing a state in which the connector holder is locked at a first position;

FIG. 12 is a plane view showing a state in which the connector holder is locked at a second position;

FIG. 13 is a cross sectional view showing the structure in which the connector holder is attached to a base plate;

FIG. 14 is a bottom view showing a pushing mechanism contained in the base unit, seeing from the bottom surface side of the base unit;

FIG. 15 is a cross sectional view showing a state in which the pushing mechanism is operated in a direction where the memory card or the connector holder is pushed out;

FIG. 16 is a cross sectional view showing the pushing mechanism when the terminal of the memory card or the second connector of the connector holder is connected to the first connector;

FIG. 17 is a cross sectional view showing a state in which the memory card is connected to the first connector;

FIG. 18 is a cross sectional view showing a state in which the memory card is detached from the first connector;

FIG. 19 is a cross sectional view taken along a line 19—19 of FIG. 15;

FIG. 20 is a cross sectional view taken along a line 20—20 of FIG. 15;

FIGS. 21 to 46 show a second embodiment of the present invention;

FIG. 21 is a perspective view showing a state just before a personal computer is overlaid on an expansion unit;

FIG. 22 is a perspective view showing a state in which the personal computer is overlaid on the expansion unit;

FIG. 23 is a perspective view showing a state in which the personal computer is overlaid on the expansion unit;

FIG. 24 is a perspective view showing state which is just before the memory card is incorporated into the personal computer by use of a tray;

FIG. 25 is a perspective view of the personal computer in a state a display unit rises;

FIG. 26 is a perspective view showing the tray holding the memory card and the structure of the pushing mechanism for pushing out the tray from the personal computer;

FIG. 27 is a perspective view showing the memory card and the tray holding the memory card;

FIG. 28 is a cross section view showing a state which is just before the tray holding the memory card is inserted into the personal computer;

FIG. 28A is an enlarged view of the encircled portion of FIG. 28 labeled 28A.

FIG. 29 is a cross sectional view showing a state in which the tray holding the memory card is inserted into the tray inlet of the personal computer;

FIG. 30 is a cross sectional view showing a state in which the memory card supported by the tray is connected to a first connector of the personal computer;

FIG. 31 is a cross sectional view showing the positional relationship between the tray and the pushing mechanism when the memory card supported by the tray is connected to the first connector of the personal computer;

FIG. 32 is a cross sectional view showing a state in which the tray is pushed out from the personal computer by the pushing mechanism;

FIG. 33 is a cross sectional view showing the positional relationship between the terminal of the memory card and the first connector when the tray is pressed out by the pushing mechanism;

FIG. 34 is a cross sectional view taken along a line 34—34 of FIG. 26;

FIG. 35 is a perspective view showing the pushing mechanism;

FIG. 36 is a plane view showing the pushing mechanism;

FIG. 37 is a perspective view showing a state in which a personal computer is overlaid on an expansion unit;

FIG. 38 is an enlarged perspective view showing a slider of the expansion unit, a terminal holder of the expansion unit, and the inlet of the tray of the personal computer;

FIG. 39 is an exploded perspective view showing a state in which the slider of the expansion unit is detached from the main body of the expansion unit;

FIG. 40 is an exploded perspective view showing a state in which the terminal holder holding the second connector;

FIG. 41 is a cross sectional view showing a state in which the personal computer is overlaid on the mounting surface of the expansion unit;

FIGS. 41A and 41B are enlarged views of the encircled portions of FIG. 41 labeled 41A and 41B respectively;

FIG. 42 is a cross sectional view showing a state in which the second connector of the expansion unit and the first connector of the personal computer are connected to each other;

FIG. 43 is a cross sectional view taken along a line 43—43 of FIG. 41;

FIG. 44 is a cross sectional view taken along a line 44—44 of FIG. 41;

FIG. 45 is a perspective view showing a state which is just before the personal computer is overlaid on the overlaying surface of the expansion unit;

FIG. 46 is a cross sectional view taken along a line 46—46 of FIG. 23 and FIGS. 46A, 46B, and 46C are enlarged views of the encircled portions of FIG. 46 labeled 46A, 46B, and 46C respectively.

DETAILED DESCRIPTION OF THE PREFERRED EMBODIMENT

Figure 2:
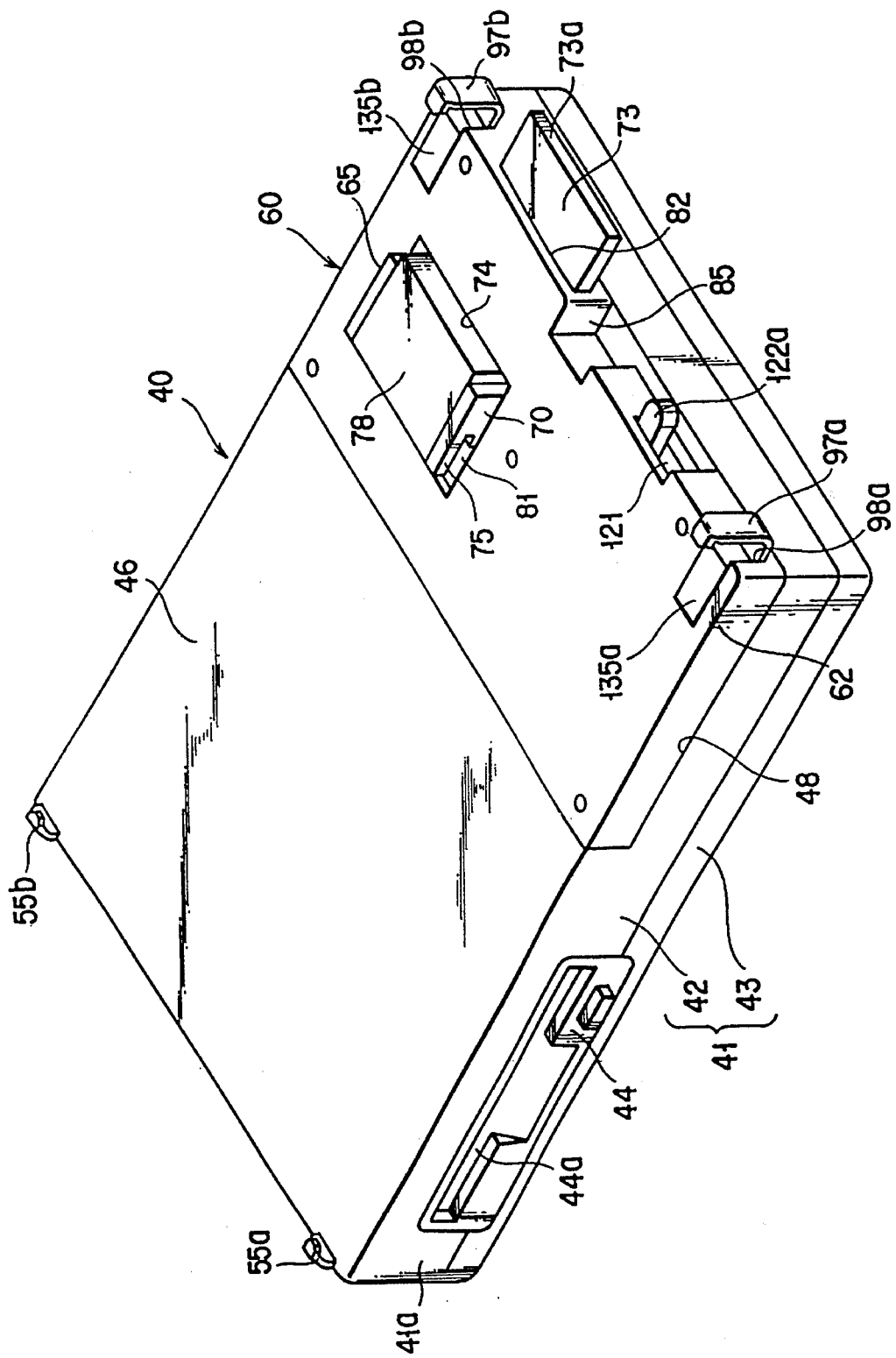

A first embodiment of the present invention will be explained with reference to FIGS. 1 to 20.

FIG. 5 shows a book-type portable personal computer 1 of A4 size. The computer 1 comprises a base unit 2 formed of synthetic resin. The base unit 2 comprises a bottom case 3 and a top cover 4 covering the bottom case 3, and the entire body of the base unit 2 is thin-box-shaped. The bottom case 3 has a rectangular flat bottom surface 3a and a side surface 3b continuous to four circumferential edges of the bottom surface 3a, and its upper surface is opened, and shallow-dish-shaped.

The top cover 4 covering the bottom case 3 have a front portion 4a and a rear portion 4b. A keyboard 5 serving as an input device is attached to the front portion 4a of the top cover 4. A display unit 7 having a liquid crystal display 6 of flat panel type is rotatably supported by the rear portion 4b of the top cover 4. The display unit 7 is rotatable between the closed position where the keyboard 5 is covered and the open position where the keyboard 5 is operably opened as an operator is permitting viewing of the liquid crystal display 6. In a state that the display unit 7 is rotated at the closed position, as partially shown in FIG. 4, the entire body of the computer 1 is flat and box-shaped for the convenience of carrying the computer.

As shown in FIGS. 19 and 20, a printed circuit board 8 on which a large number of electronic parts are mounted is contained in the base unit 2.

A slit-shaped inlet 10 is formed in the side surface 3b of the right side of the bottom case 3. The inlet 10 is used to insert a memory card 11 serving as a card-type electronic part into the base unit 2. The inlet 10 is opened between the bottom surface 3a of the bottom case 3 and the printed circuit board 8.

As shown in FIG. 19, a pair of guide rails 12 and 13, which is used for guiding the insertion direction of the memory card 11, is screwed to the lower surface of the printed circuit board 8. The guide rails 12 and 13 has a guide groove 14 into which both side portions of the memory card 11 are slidably inserted. A first connector 15 to which the memory card 11 is detachably connected is attached between the final ends of the guide rails 12 and 13. The first connector 15 is insertion-formed and has a number of pin terminals 16. These pin terminals 16 are electrically connected to the printed circuit board 8.

As shown in FIG. 5, a terminal 18 is formed at the top end in the insertion direction of the memory card 11. The terminal 18 has a number of pin holes 17 into which the pin terminal 16 of the first connector 15 is inserted. A concave portion 19 is formed in each side surface of the terminal 18. The concave portion 19 is fitted to a convex portion 20, which is positioned at the final end of the guide groove 14, when the memory card 11 is inserted into the final end along the guide rails 12 and 13. By fitting the concave portion 19 to the convex portion 20, the pin terminals 16 of the first connector 15 and the pin holes 17 of the memory card 11 are positioned.

Therefore, the memory card 11 is inserted from the inlet 10 in a state that the terminal 18 is guided as a head, and guided to the guide rails 12 and 13. Under this state, the memory card 11 is guided to the inside of the base unit 2. Then, if the pin holes 17 of the terminal 18 are fitted to the pin terminals 16 of the first connector 15, the memory card 11 and the computer 1 are electrically connected to each other.

Figure 14:
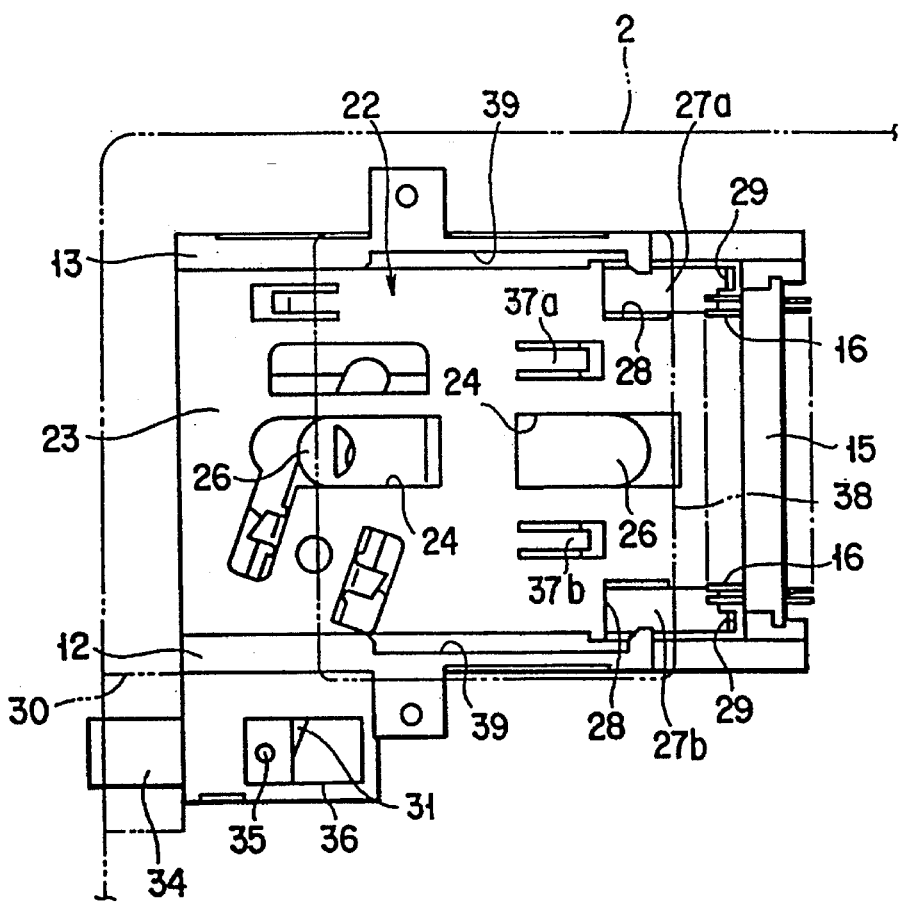

As shown in FIGS. 14 to 16, in the base unit 2, there is contained a pushing mechanism 22 for pushing the inserted memory card 11 to the outside. As shown in FIGS. 19 and 20, the pushing mechanism 22 has a metallic base panel 23, which is stretched between the guide rails 12 and 13. As shown in FIG. 17, the base panel 23 is arranged on the upper surface of the memory card 11, and one end reaches up to just before the first connector 15. A long and thin slide hole 24, which extends in the insertion direction of the memory card 11, is formed in the central portion of the base panel 23. A metallic slider 25 is overlaid on the upper surface of the base panel 23. The slider 25 has a guide piece 26, which is slidably fitted to the slide hole 24, and a pair of pressing-out pieces 27a and 27b extending along the guide rails 12 and 13. One end of the respective pressing-out pieces 27a and 27b is guided to the lower portion of the base panel 23 through a through hole 28 formed in the base panel 23. As shown in FIGS. 17 and 18, a tongue portion 29, which is bent downward, is formed in one end of the respective pressing-out pieces 27a and 27b. The tongue portion 29 is positioned between the pin terminals 16 of the first connector 15 and the guide rails 12 and 13, and is hooked to the front surface of the terminal 18 of the memory card 11.

A link plate 31, which is used to slide the slider 25 along the insertion direction of the memory card 11, is rotatably supported by the upper surface of the base panel 23. The link plate 31 extends in the direction crossing the slide direction of the slider 25. The intermediate portion of the link plate 31 is supported by the base panel 23 via a shaft 31a. One end of the link plate 31 is overlaid on the upper surface of the guide piece 26 of the slider 25, and a cutting piece 33 of the upper surface of the guide piece 26 is hooked to an engagement piece 32 of the link plate 31. Due to this, if the link plate 31 is rotated in a state that the shaft 31a is used as a fulcrum, the rotation of the link plate 31 is converted to a linear movement, and the the linear movement is transmitted to the slider 25. The slider 25 is reciprocated along the insertion direction of the memory card 11.

The other end of the link plate 31 is movably connected to a push botton 34 through a pin 35. The push button 34 is slidably supported by a housing 36 so as to be reciprocated along the sliding direction of the slider 25. As shown in FIG. 20, the housing 36 is integrally formed in the guide rail 12. One end of the push botton 34 is passed through the side surface 3b of the bottom case 3 and guided outside. The push botton 34 is arranged on the side surface 3b of the bottom case 3 to be parallel with the inlet 10 of the memory card 11. In the side surface 3b of the bottom case 3, a recess 30, to which an operator inserts the tip of his finger, is formed, and one end of the push botton 34 is positioned at the inside of the recess 30.

Due to this, if the memory card 11 is inserted into the base unit 2 through the inlet 10, both side portions of the front surface of the terminal 18 come in contact with the tongue portion 29 just before the terminal 18 reaches to the first connector 15. Then, the slider 25 is slid in the insertion direction of the memory card 11. As shown in an arrow of FIG. 16, by sliding the slider 25, the link plate 31 is rotated counterclockwise. Then, in a state in which the memory card 11 is connected to the first connector 15, the push botton 34 is maintained to be projected into the recess 30.

For taking out the memory card 11 inserted into the base unit 2, the projected push botton 34 is pushed into the recess 30 by the operator's finger. By pressing the push botton 34, as shown in FIG. 15, the link plate 31 is rotated clockwise, and the slider 25 is slid in a direction away from the first connector 15. Due to this, as shown in FIG. 18, the memory card 11 is slid to the inlet 10 through the tongue portion 29 of the slider 25, and the memory card 11 is pushed out of the inlet 10.

In the base panel 23 of the pushing mechanism 22, a pair of pressing pieces 37a and 37b extending downward is integrally formed. The pressing pieces 37a and 37b slidably contact the upper surface of the memory card 11, and press the memory card 11 downward. Thereby, both sides of the memory card 11 are pushed to the lower surface of the guide groove 14, and rattle therebetween is absorbed.

Figure 6:
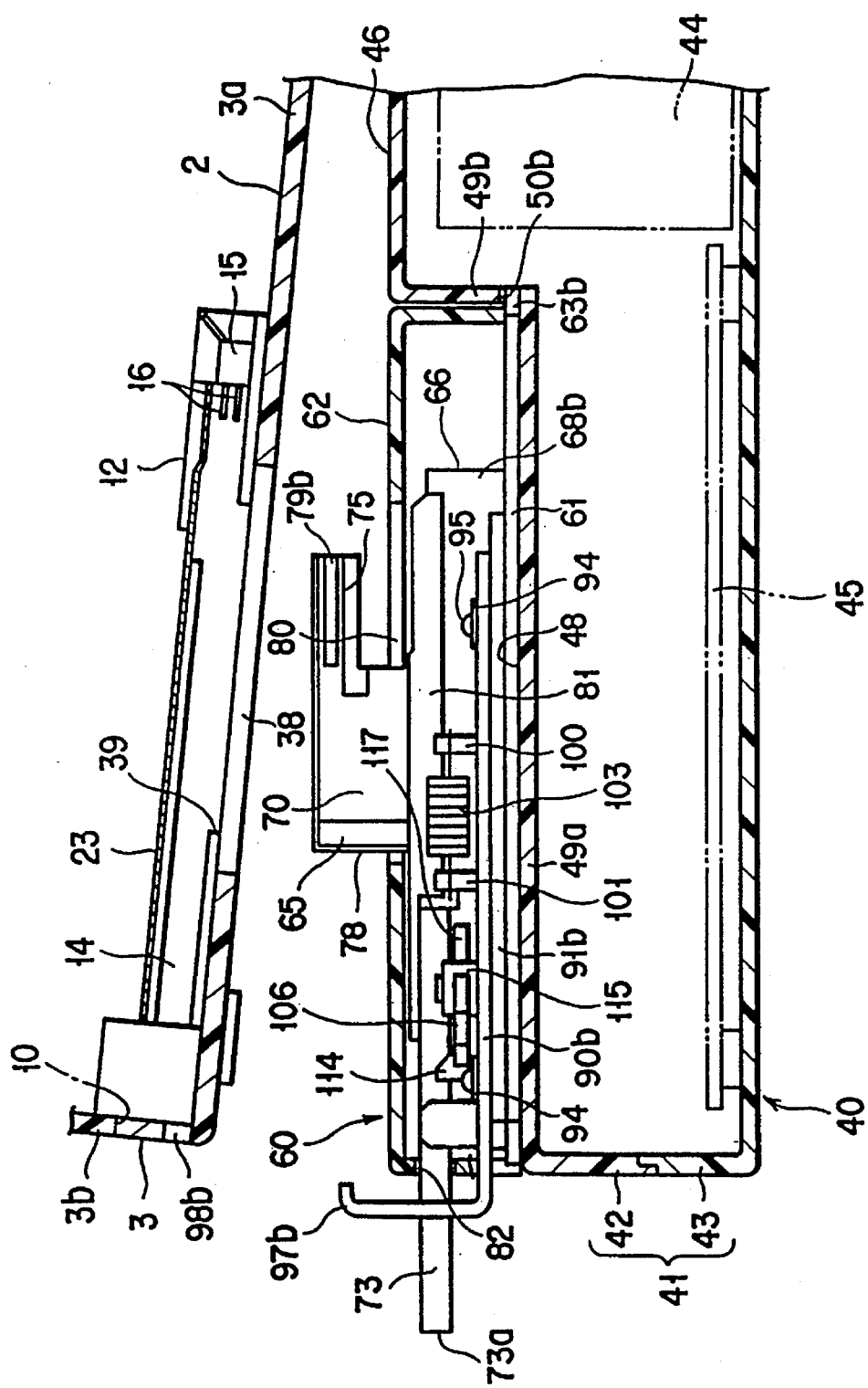

As shown in FIG. 6, a square opening 38 is formed in the bottom surface 3a of the base unit 2. The opening 38 corresponds to the insertion position of the memory card 11, and the guide rails 12 and 13 are positioned at both sides of the opening 38. As shown in FIG. 14, the guide rails 12 and 13 are notched at the position facing to the opening 38, and the guide groove 14 of the respective guide rails 12 and 13 is opened to the opening 38 through a notch 39. The opening 38 is normally closed by a cover plate (not shown).

For expanding the function of the personal computer 1, an expansion unit 40 as shown in FIG. 2 is used. The expansion unit 40 has a square-box-shaped case 41 forming a main body thereof. The size of the case 41 is formed to be substantially the same as that of the base unit 2 of the computer 1, and divided into an upper case 42 and a lower case 43. As shown in FIG. 6, in the case 41, there are contained a floppy disc driving device 44 (hereinafter called FDD) as a device for expanding the function of the computer 1, and a printed circuit board 45 adjacent to FDD 44. The printed circuit board 45 is electrically connected to FDD 45, and a large number of electronic parts (not shown) are mounted on the printed circuit board 45. FDD 45 has a floppy inlet 44a for accessing a floppy disc. The floppy inlet 44a is exposed to a front surface 41a of the case 41.

Figure 3:
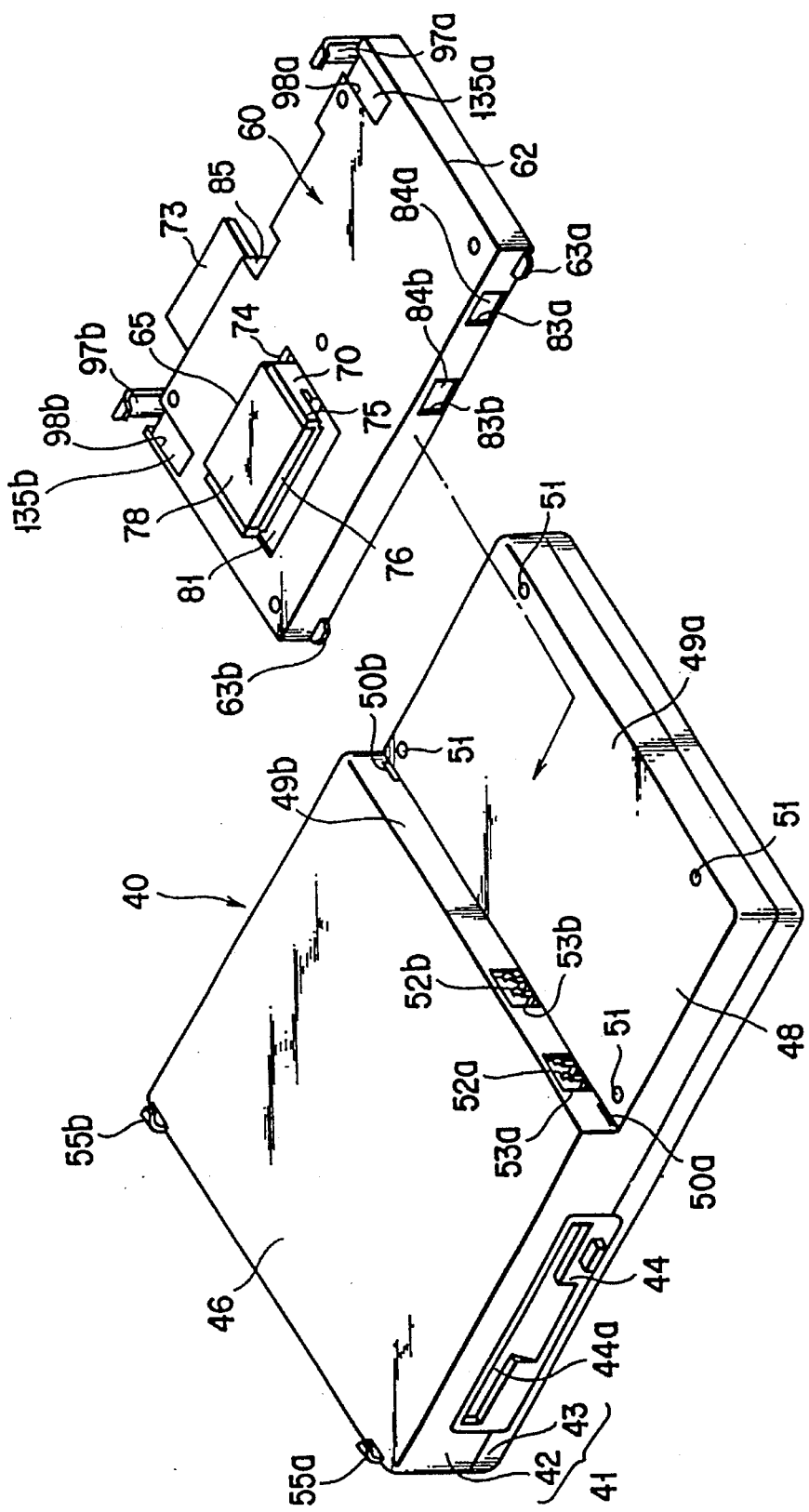

The upper surface of the case 41 forms a flat overlaying surface 46 on which the base unit 2 of the computer 1 is overlaid. An attaching recess 48 is formed in one end separated from the FDD 44 of the overlaying surface 46. The attaching recess 48 is continuous to the overlaying surface 46 of the case 41, the side surface of the case 41, the front surface, and the rear surface, which are continuous to the surface 46, and opened. In other words, as shown in FIG. 3, the attaching recess 48 comprises a bottom surface 49a, which is integral with the upper case 42, and a vertical side surface 49b continuous to the bottom surface 49a. The bottom surface 49a is formed at the position, which is lower than the overlaying surface 46 by the height of the side surface 49b. A pair of engaging holes 50a and 50b is formed in the angular portion, which is formed by the bottom surface 49a and the side surface 49b. Also, a screw hole 51 is formed in each of the four corners of the bottom surface 49a.

In the upper case 42, a pair of contact terminals 52a and 52b is arranged. The contact terminals 52a and 52b are electrically connected to the printed circuit board 45 via a lead line (not shown). The contact terminals 52a and 52b are exposed to the attaching recess 48 through a pair of terminal holes 53a and 53b formed in the side surface 49b.

A pair of first hooks 55a and 55b are screwed to the upper case 42. The first hooks 55a and 55b are projected onto the overlaying surface 46 and arranged to be spaced to each other at the end portion opposite to the attaching recess 48. As shown in FIG. 4, in a case where the base unit 2 is overlaid on the overlaying surface 46, these books 55a and 55b are fitted to a pair of positioning holes 56a and 56b formed in the right side surface 3b of the base unit 2, thereby the overlaying position of the base unit 2 is specified.

As shown in FIGS. 2 and 3, a connector unit 60 is detachably attached to the attaching recess 48 of the expansion unit 40. As shown in FIG. 6, the connector unit 60 has a metallic rectangular base plate 61 and a synthetic resin-made cover 62 covering the base plate 61. The connector unit 60 is a rectangular parallelepied having substantially the same shape and size as those of the attaching recess 48. In a state in which the connector unit 60 is attached to the attaching recess 48, the upper surface, side surface, front surface, and rear surface of the cover 62 are continuous to the overlaying surface 46, side surface, front surface, and rear surface of the case 41 so as to be flush with each other. Then, the cover 62 partially forms the case 41, and the upper surface of the cover 62 forms a part of the overlaying surface 46.

Figure 10:
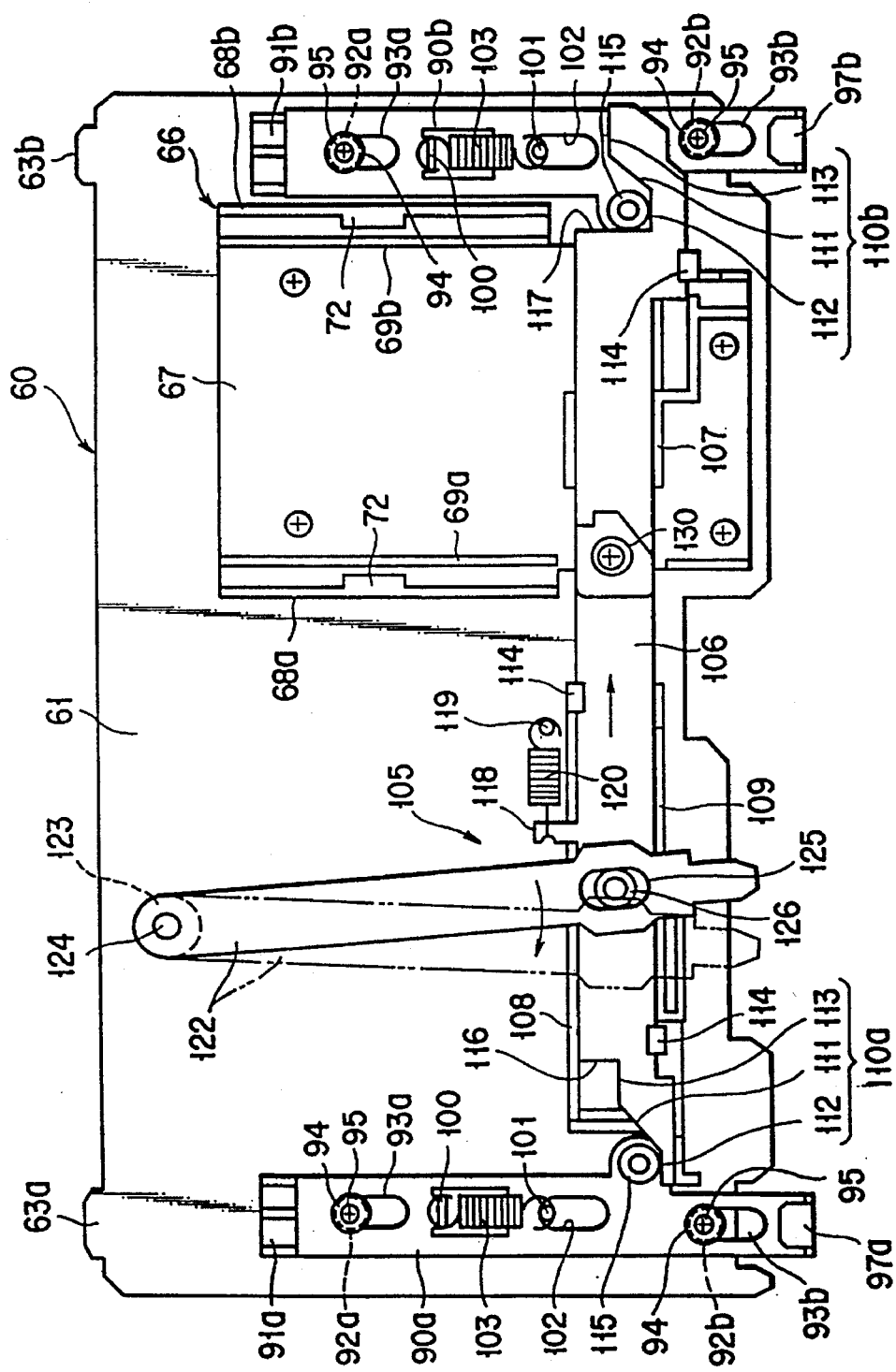

As shown in FIGS. 3 and 10, a pair of engaging projections 63a and 63b are formed in one side peripheral portion of the base plate 61. If the connector unit 60 is attached to the attaching recess 48, the engaging projections 63a and 63b are detachably inserted into the engaging holes 50a and 50b, and the positioning of the connector unit 60 to the attaching recess 48 is set.

Figure 13:
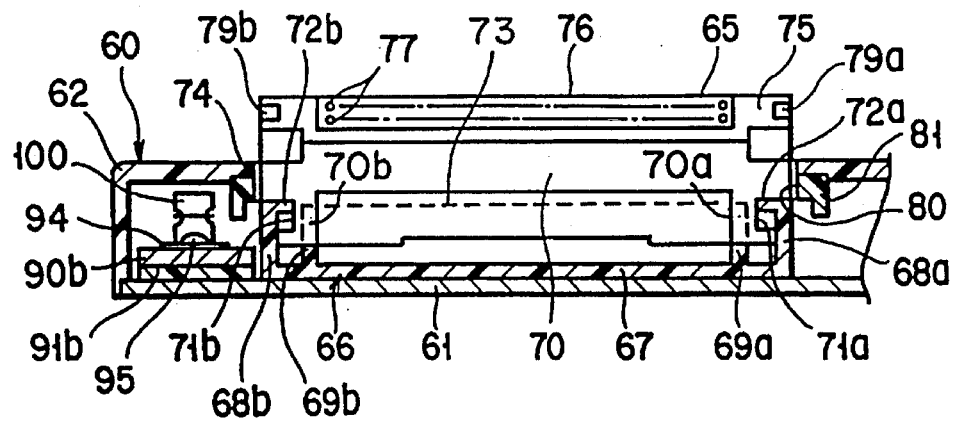

A synthetic resin-made connector holder 65 is slidably supported on the upper surface of the base plate 61. The supporting structure will be explained with reference to FIGS. 9, 10, and 13. As shown in FIG. 13, a synthetic resin-made guide member 66 is screwed onto the upper surface of the base plate 61. The guide member 66 has a flat board 67, which is overlaid on the upper surface of the base plate 61, and a pair of rise walls 68a and 68b formed to be continuous to both side peripheral portions of the board 67. The rise walls 68a and 68b are formed to be parallel with each other, and a pair of slide rails 69a and 69b are formed in the rise walls 68a and 68b. The slide rails 69a and 69b are formed to be parallel with each other and the rising height of slide rails 69a and 69b is set to be lower than those of the rise walls 68a and 68b. Then, the connector holder 65 is slidably mounted on these slide rails 69a and 69b.

As shown in FIG. 13, the connector holder 65 has a box portion 70. A pair of leg portions 70a and 70b to be slidably mounted on the slide rails 69a and 69b is integrally formed in both side portions of the lower end of the box portion 70. Slide grooves 71a and 71b extending in parallel to the slide rails 69a and 69b are formed in the face opposite to the rise walls 68a and 68b of the leg portions 70a and 70b, respectively. Stopping pieces 72a and 72b formed in the upper ends of the rise walls 68a and 68b. The stopping pieces 72a and 72b are slidably fitted in these slide grooves 71a and 71b.

Figure 9:
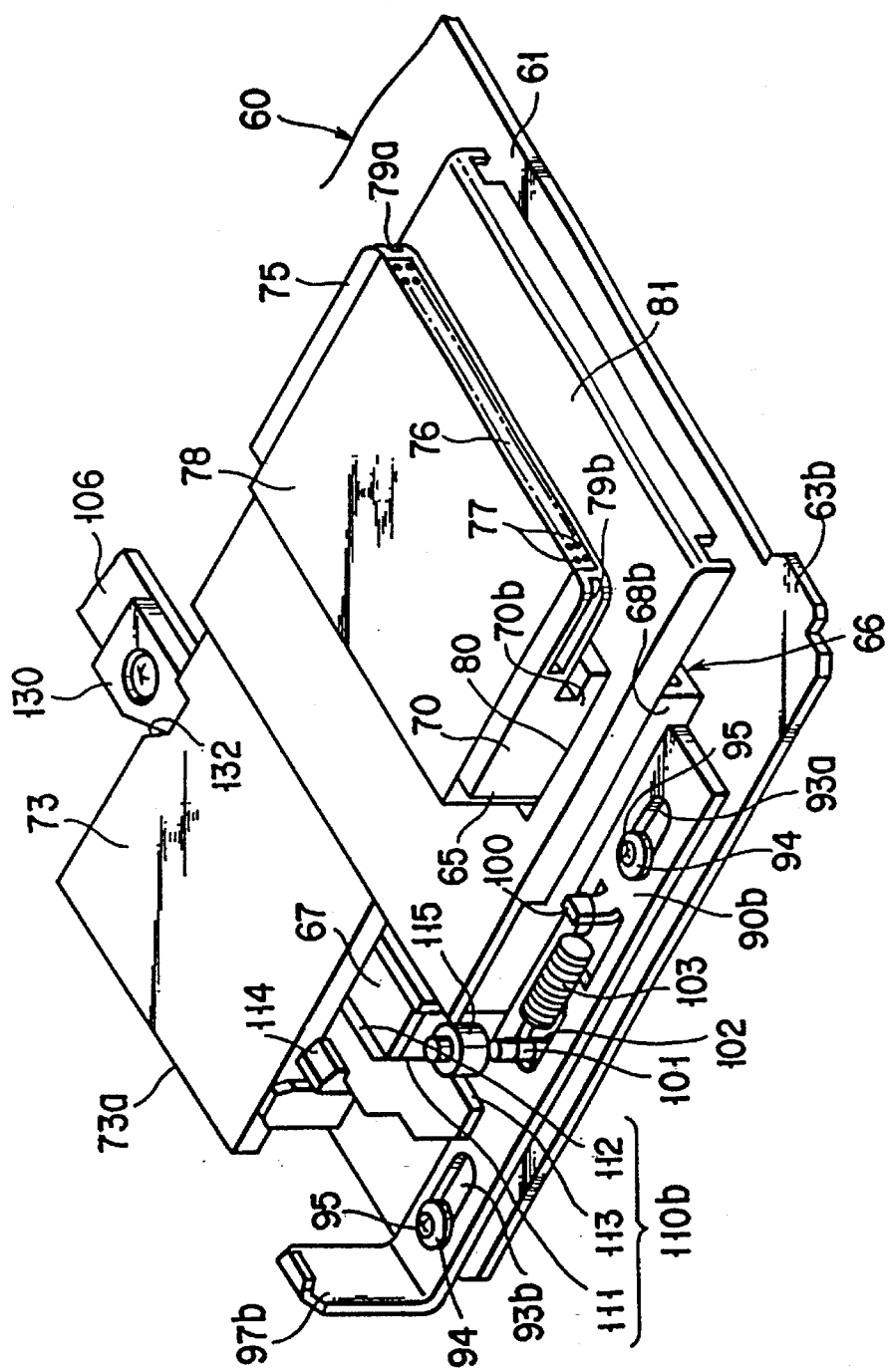

A push plate 73 extending in the direction of the slide grooves 71a and 71b is formed in one end of the box portion 70. The push plate 73 is continuous to the leg portions 70a and 70b, and slidably mounted on the slide rails 69a and 69b. As shown in FIG. 2, the upper portion of the box portion 70 is passed through a square connector through hole 74, which is formed in the upper surface of the cover 62, and projected to the outside of the connector unit 60. As shown in FIG. 9, an elongation 75 extending in the direction opposite to the push plate 73 is formed in the upper portion of the box portion 70. The elongation 75 is formed so as to be slidably fitted to the guide groove 14 of the guide rails 12 and 13. A second connector 76 to be detachably connected to the first connector 15 is incorporated into the top end of the elongation 75. The second connector 76 has a large number of pin holes 77 into which the pin terminals 16 of the first connector is inserted.

Figure 7:
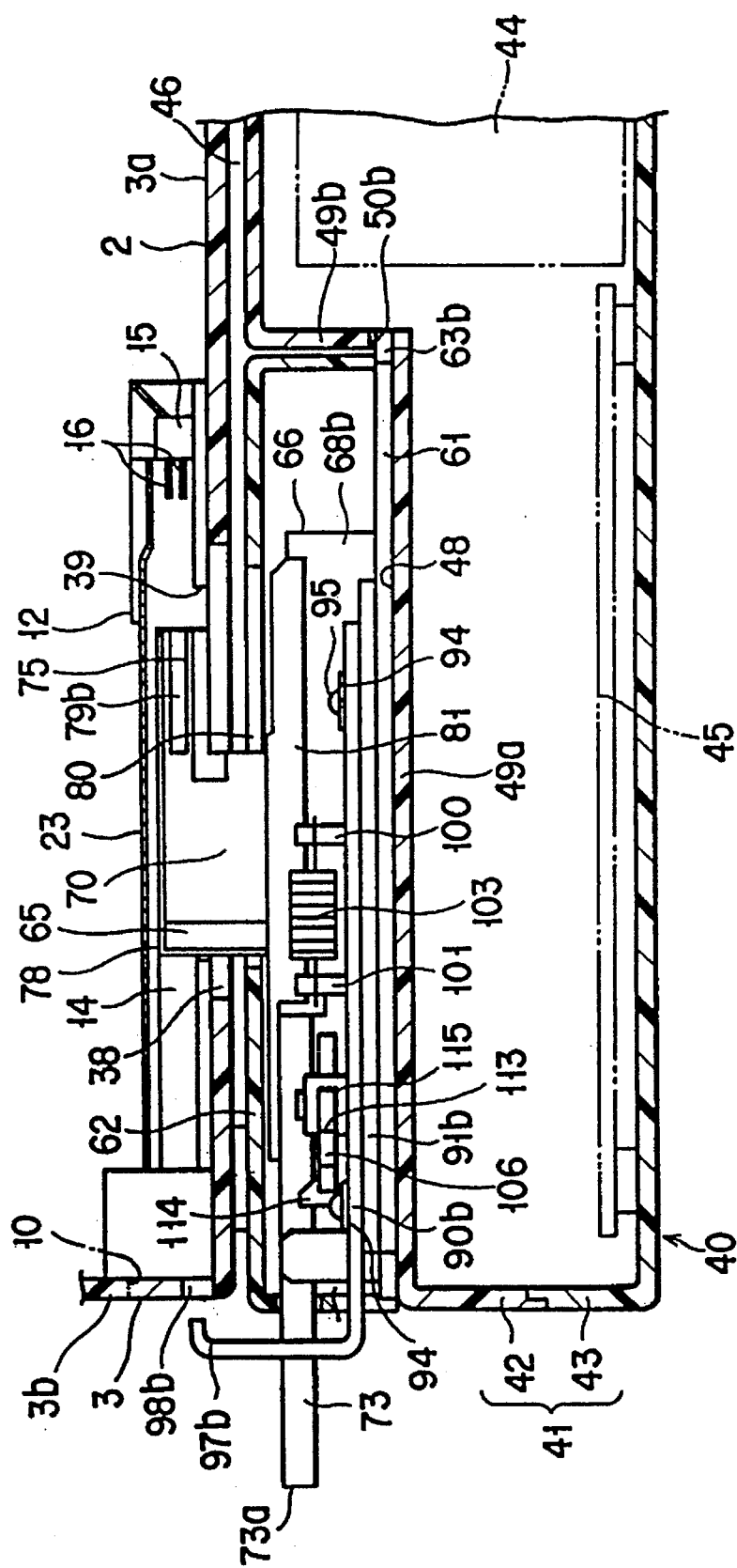

The size of the upper portion of the box portion 70 including the elongation 75 is formed to be inserted into the opening 38 of the base unit 2. As shown in FIG. 7, if the base unit 2 is overlaid on the expansion unit 40, the upper portion of the box portion 70 is provided between the guide groove 14 through the notch 39 of the guide rails 12 and 13, and the second connector 76 is opposed to the first connector 15.

Due to this, if the base unit 2 is overlaid on the overlaying surface 46 of the expansion unit 40, the connector holder 65 is linearly slid over the portion between the first position, which is inserted into the opening 38, and the second position where the second connector 76 is connected to the first connector 15.

As shown in FIGS. 9 and 13, concave portions 79a and 79b are formed in both side surfaces of the elongation 75 of the connector holder 65. If the connector holder 65 is slid to the first connector 15, the concave portions 79a and 79b are fitted to the convex portion 20 of the final end of the guide groove 14. Thereby, the pin terminals 16 of the first connector 15 and a pin holes 77 of the second connector 76 are positioned.

As shown in FIGS. 6 and 9, the portion ranging from the elongation 75 of the connector holder 65 and the upper surface of the box portion 70 to the end surface of the push plate 73 is covered with a metallic shield plate 78. The shield plate 78 comes in contact with the pressing pieces 37a and 37b of the pushing mechanism 22 (not shown).

Also, as shown in FIG. 9, a rectangular cover plate 81 is screwed to the continuous portion of the box portion 70 of the connector holder 65 and the push plate 73. The cover plate 81 has a through hole 80 to which the box portion 70 is inserted. The cover plate 81, as shown in FIG. 13, covers the space between the connector through hole 74 and the box portion 70, and is slidably overlaid on the inner surface of the cover 62.

Figure 8:
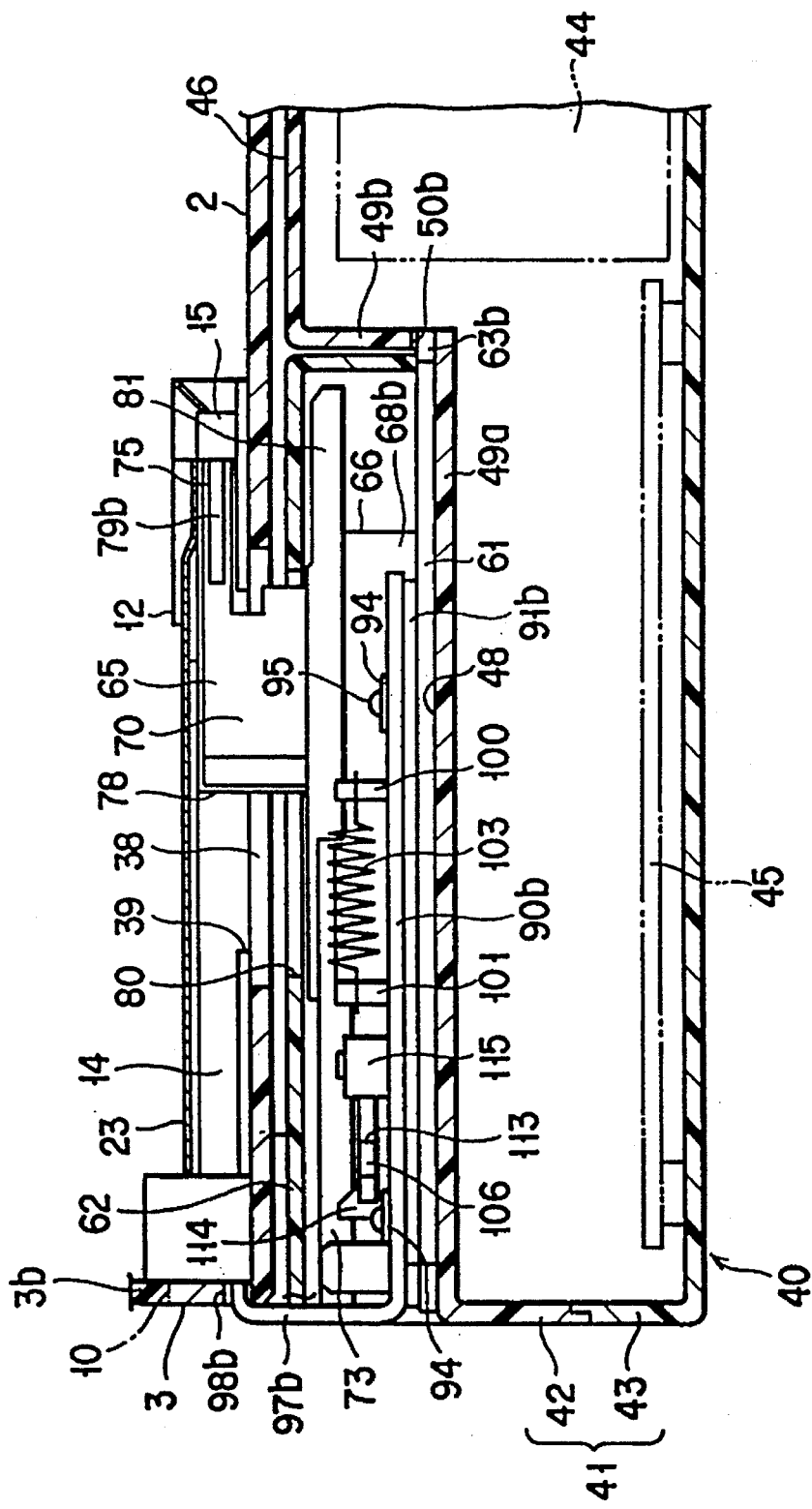

As shown in FIGS. 2 and 6, an elongation through hole 82 for exposing the push plate 73 is formed in the side surface of the cover 62. If the connector holder 65 is slid to the first position, the push plate 73 is projected to the outside of the connector unit 60 from the through hole 82. If a projection end 73a of the push plate 73 is pushed by the tip of the finger, the connector holder 65 is slid to the second position from the first position, so that the first connector 15 and the second connector 76 are electrically connected to each other. When the the connector holder 65 is slid to the the second position, as shown in FIGS. 1 and 8, the end surface of the projection end 73a of the push plate 73 is inserted into the through hole 82, and substantially flush with the side surface of the cover 62. The push plate 73 forms the connecting structure of the connector for sliding the connector holder 65.

In the above structure, the first connector 15 to which the memory card 11 is originally connected is used as a connector for connecting the expansion unit 40. Due to this, there is provided detecting means for detecting that the connector holder 65 is inserted into the opening 38. According to the result of the detection, the circuit structure on the printed circuit board 8 is changed.

As shown in FIG. 3, a pair of terminal windows 83a and 83b are formed in the side surface of the cover 62. The terminal windows 83a and 83b are facing to the side surface 49a of the attaching recess 48. Terminal metal fittings 84a and 84b are provided in the terminal windows 83a and 83b, respectively. The terminal metal fittings 84a and 84b are electrically connected to the second connector 76, and exposed to the outside of the the connector unit 60 through the terminal windows 83a and 83b. When the connector unit 60 is attached to the attaching recess 48, the terminal metal fittings 84a and 84b come in contact with contact terminals 52a and 52b of the attaching recess 48, so that the second connector 76 and the printed circuit board 45 are electrically connected to each other.

The connector unit 60 is fixed to the attaching recess 48 with a screw (not shown) screwed to the screw hole 51.

Moreover, as shown in FIG. 2, in the side surface of the cover 62, a concave 85 is formed to be adjacent to the through hole 82. When the base unit 2 is overlaid on the overlaying surface 46, the concave 85 is continuous to the recess 30 of the base unit 2. Thereby, in pushing the push button 34 of the pushing mechanism 22 is pushed by the tip of the finger, there can be reserved a space, which is large enough to easily insert the tip of the finger around the push button 34.

As shown in FIGS. 9 to 13, a pair of long and thin slide plates 90a and 90b are provided in the base plate 61 of the connector unit 60. The slide plates 90a and 90b are spaced to both end portions, which are along the longitudinal direction of the base plate 61. Then, the slide plates 90a and 90b are slidably supported in the sliding direction of the connector holder 65 to the base plate 61.

The supporting structure of the slide plates 90a and 90b will be explained. There are provided a pair of slide guides 91a and 91b, which are made of synthetic resin, between the base plate 61 and the slide plates 90a and 90b. The slide guides 91a and 91b are formed like a long and thin plate, and cylindrical guide projections 92a and 92b are projected to both end portions which are spaced along the longitudinal direction. As shown in FIG. 9, the slide plates 90a and 90b have long guide holes 93a and 93b extending in the longitudinal direction of the slide plates 90a and 90b. Guide projections 92a and 92b are slidably fitted to the guide holes 93a and 93b. Due to this, the slide plates 90a and 90b can be slid in the range of the length of the guide holes 93a and 93b.

As shown in FIGS. 9 and 10, a washer 94 is attached to each of the upper surfaces of the guide projections 92a and 92b with a screw 95. The screw 95 screws slide guides 91a and 91b to the base plate 61. The washer 94 is overlaid on the opening peripheral portions of the guide holes 93a and 93b from the upper side.

As shown in FIGS. 6 and 9, the slide plates 90a and 90b have second hooks 97a and 97b. The hooks 97a and 97b are integrally formed with the slide plates 90a and 90b by bending one end of the slide plates 90a and 90b upward at an angle of 90 degrees. As shown in FIG. 2, the second hooks 97a and 97b are passed through guiding holes 98a and 98b, which are formed in the cover 62, and guided to the outside of the the connector unit 60. The upper ends of the second hooks 97a and 97b are projected to the upper surface of the cover 62, that is, the overlaying surface 46, and positioned to be opposite to the first hooks 55a and 55b. Then, when the base unit 2 is overlaid on the overlaying surface 46, the second hooks 97a and 97b are opposite to a pair of fitting holes 99a and 99b formed in the right side surface of the bottom case 3.

As shown in FIGS. 9 and 10, a spring seat 100 and a long hole 102 are respectively formed in the slide plates 90a and 90b. A support 101, which is formed in the base plate 61, is passed through the long hole 102. An extension coil spring 103 is stretched between the spring seat 100 and the support 101. The extension coil spring 103 urges the slide plates 90a and 90b to move in the direction where the second hooks 97a and 97b are projected from the left side surface of the cover 62. Due to this, in a state that the base unit 2 is overlaid on the overlaying surface 46, the second hooks 97a and 97b are separated from the the base unit 2.

As shown in FIG. 10, the connector unit 60 has a hook operation mechanism 105 for fitting the second hooks 97a and 97b to the fitting holes 99a and 99b of the base unit 2. The hook operation mechanism 105 has a long and thin link 106, which is laid across the slide plates 90a and 90b. The link 106 extends in the direction, which is perpendicular to the slide plates 90a and 90b, and is placed on the base plate 61 to be linearly slidable to this direction. The link 106 passes the board 67 of the connector holder 65, and a guide wall 107 for guiding the sliding direction of the link 106 is formed on the upper surface of the board 67. A synthetic resin-made guide member 108, which is adjacent to the board 67 and receives the link 106, is screwed to the upper surface of the base plate 61. The guide member 108 has a guide rail 109 for guiding the sliding direction of the link 106. In the guide member 108 and the board 67, there are formed a plurality of claws 114, which are slidably hooked on the upper edge portion of the link 106 and prevents the link 106 from being slid upward.

As shown in FIGS. 9 and 10, translation cams 110a and 110b for sliding the slide plates 90a and 90b are provided in one end of the link 106 and the other end thereof, respectively. The translation cams 110a and 110b has a first cam section 111, which is inclined to the sliding direction of the link 106, a second cam section 112, which is continuous to one end of the first cam section 111 and extends in parallel to the sliding direction of the link 106, and a third cam section 113, which is continuous to the other end of the first cam section 111 and extends in parallel to the sliding direction of the link 106. The second cam section 112 maintains one end of the slide plates 90a and 90b at the position where these one end of slide plates 90a and 90b are pushed out of the connector 60. The third cam section 113 maintains one end of the slide plates 90a and 90b at the position where these one end of slide plates 90a and 90b are drawn in the connector unit 60.

The translation cams 110a and 110b contact a synthetic resin-made roller 115, which is supported by the slide plates 90a and 90b. A first stopper 116 is formed in one end of the link 106 having one translation cam 110a. When the third cam section 113 contacts the roller 115, the first stopper 116 is hooked on the roller 115, and prevents the link 106 from being slid any more. A second stopper 117 is formed in the other end of the link 106 having the other translation cam 110b. When the second cam section 112 contacts the roller 115, the second stopper 117 is hooked on the roller 115, and prevents the link 106 from being slid any more.

A spring seat portion 118 is formed in the link 106. An extension coil spring 120 is stretched between the spring seat portion 118 and a support 119, which is attached on the spring plate 61. As shown in an arrow of FIG. 10, the extension coil spring 120 always urges the link 106 to be moved in the direction where the second cam section 112 contacts the roller 115. Therefore, the second cam section 112 of the link 106 is always maintained to be in contact with the roller 115 of the slide plates 90a and 90b.

On the upper surface of the base plate 61, there is provided an operation lever 122 for sliding the link 106. The operation lever 122 extends in a direction crossing the link 106. One end of the operation lever 122 is rotatably supported on a boss 123 of the base plate 61 via a pin 124. The other end of the operation lever 122 is rotatably overlaid on the upper surface of the intermediate portion of the link 106, and guided to the outside of the connector unit 60 through a through hole 121, which is formed in the side surface of the cover 62. A synthetic resin-made knob 122a is attached to the guiding end portion of the operation lever 122.

The operation lever 122 has a long hole 125 extending in the longitudinal direction of the operation lever 122. The elongated hole 125 is positioned at the portion crossing the link 106 of the operation lever 122. A synthetic resin-made roller 126, which is rotatably fitted to the long hole 125, is supported in the link 106. Thereby, the operation lever 122 and the link 106 work together.

Due to this, as shown in FIG. 10, if the operation lever 122 is rotated clockwise against urging force of the extension coil spring 120, the link 106 is slid in the left direction. Thereby, the roller 115, which is in contact with the second cam section 112 of the translation cams 110a and 110b, is passed the first cam section 111 and mounted on the third cam section 113, and the slide plates 90a and 90b are drawn into the connector unit 60 in accordance with the shape of the translation cams 110a and 110b.

Figure 12:
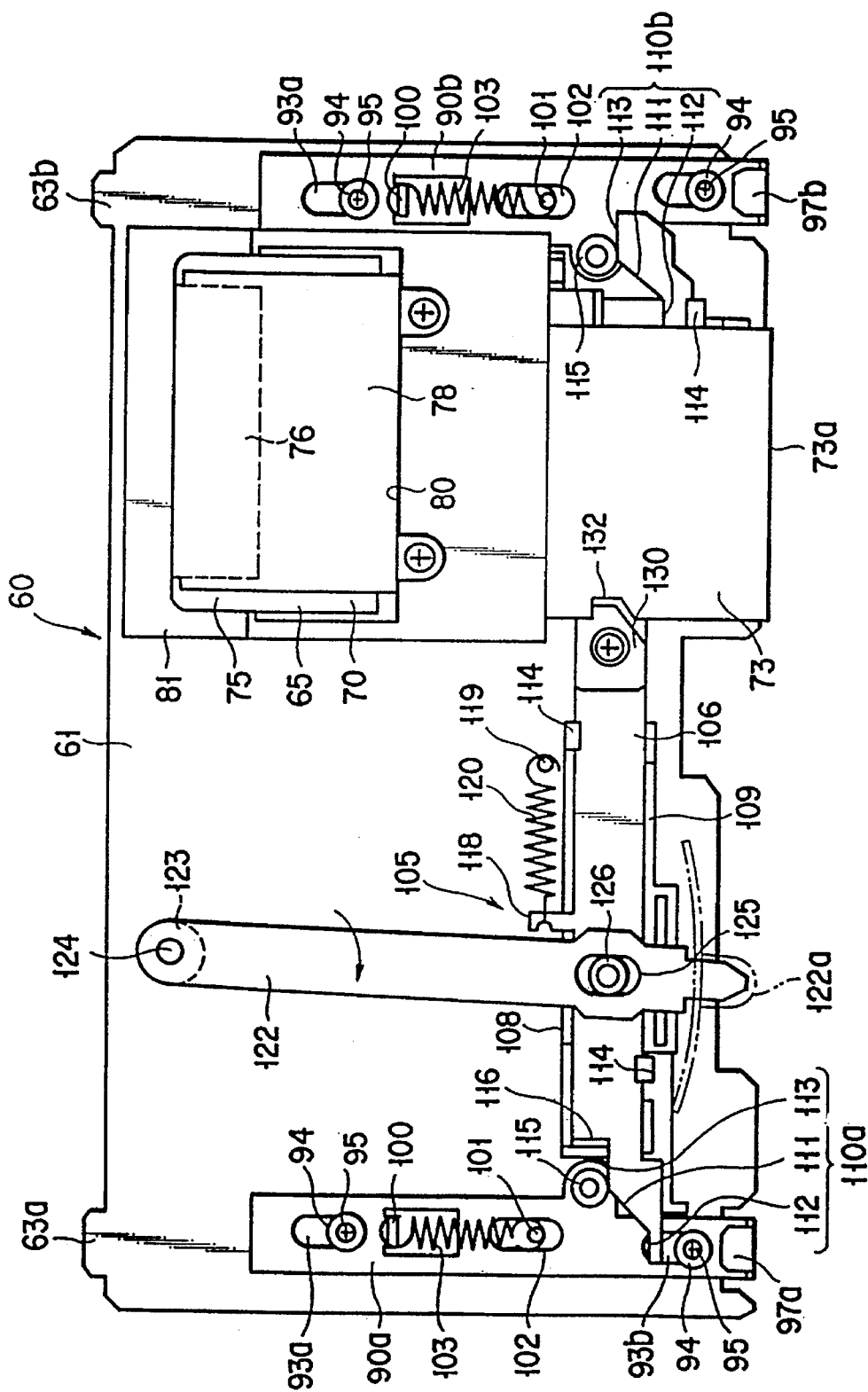

As shown in FIGS. 11 and 12, a latch piece 130, which maintains the connector holder 65 at the first and second positions, is screwed to the intermediate upper surface of the operation lever 122. The latch piece 130 is arranged in opposite to one side edge portion of the push plate 73 of the connector holder 65. In one side edge portion of the push plate 73, there are formed a first engaging recess 131 with which the latch piece 130 is engaged when the connector holder 65 is slid to the first position, and a second engaging recess 131 with which the latch piece 130 is engaged when the connector holder 65 is slid to the second position. As shown in FIG. 11, the depth of the first engaging recess 131 is formed to be larger than that of the second engaging recess 132.

Due to this, as shown in FIG. 11, in a state that the latch piece 130 is engaged with the first engaging recess 131, the amount of the slide of the link 106 to the direction of an arrow is increased, and the second cam section 112 contacts the roller 115 of the slide plates 90a and 90b. Then, when the expansion unit 40 is not used, the connector holder 65 is maintained at the first position, and the push plate 73 is largely projected to the outside of the cover 62 from the through hole 82.

As shown in FIG. 12, in a state that the latch piece 130 is engaged with the second engaging recess 132, the amount of the slide of the link 106 is decreased, and the link 106 is maintained at the position where the third cam section 113 is in contact with the roller 115.

As shown in FIGS. 2 and 3, the caps denoted by reference numerals 135a and 135b cover the opening portions of the guiding holes 98a and 98b.

The following will explain the steps of connecting the expansion unit 40 to the personal computer 1.

In a case where the memory card 11 is contained in the base unit 2 of the the computer 1, the push button 34 is projected into the recess 30 of the side surface of the base unit 2 as shown in FIG. 16. Due to this, in connecting the expansion unit 40 to the computer 1, the push button 34 is pushed by the tip of the finger. Thereby, the slider 25 is slid to the direction which is far away from the first connector 15 via the link plate 31. Then, the memory card 11 is pushed to the outside from the inlet 10 via the tongue portion 29 of the slider 25. Therefore, the pressed portion is picked up, and the memory card 11 is taken out of the computer 1.

If the memory card 11 is finished being taken out of the computer 1, the cover plate covering the opening 38 of the base unit 2 is detached, and the opening 38 is opened. Under this state, the computer 1 is overlaid on the overlaying surface 46 of the expansion unit 40. At this time, as shown in FIG. 4, the positioning holes 56a and 56b of the left side surface of the base unit 2 are hooked on the the first hooks 55a and 55b of the expansion unit 40, and the bottom plate 3a of the base unit 2 is directly overlaid on the overlaying surface 46. Thereby, the overlaying surface 46 and the computer 1 are substantially positioned, and the connector holder 65, which is projected onto the overlaying surface 46, is guided into the opening 38.

At this time, the connector holder 65 is maintained at the first position by engaging the latch piece 130 with the first engaging recess 131 of the push plate 73. Due to this, the second connector 76 supported by the connector holder 65 is positioned so as to be opposite to the first connector 15 in the opening 38.

Next, as shown in FIG. 12, the knob 122a is operated by the tip of the finger, and the operation lever 122 is rotated clockwise. Thereby, the link 106 is slid in the left side against the urging force of the extension coil spring 120, and the roller 115, which is in contact with the second cam section 112 of the translation cams 110a and 110b, is passed the first cam section 111 and mounted on the third cam section 113. Due to this, the slide plates 90a and 90b are slid in the direction where the slide plates 90a and 90b are drawn into the connector unit 60, and the second hooks 97a and 97b are fitted to the fitting holes 99a and 99b on the right side surface of the base unit 2. Thereby, the four corners of the base unit 2 are pressed by the first hooks 55a and 55b and the second hooks 97a and 97b, and the computer 1 is positioned at a predetermined position on the overlaying surface 46, and maintained.

By sliding the link 106 in the left direction, the latch piece 130 is detached from the first engaging recess 131 of the push plate 73, and the lock of the connector holder 65 including the push plate 73 is released. Due to this, in a state that the operation lever 122 is operated clockwise, the push plate 73 is pushed by the tip of the finger, and the connector holder 65 is slid to the second position. Thereby, as shown in FIG. 8, the elongation 75 of the connector holder 65 is guided by the guide groove 14 of the guide rails 12 and 13, and introduced to the first connector 15. Then, the pin holes 77 of the second connector 76 supported by the elongation 75 is fitted to the pin terminals 16 of the first connector 15. Thereby, the first connector 15 and the second connector 76 are electrically connected to each other, and the computer 1 and the extension unit 40 are electrically connected to each other.

If the connector holder 65 is slid to the first connector 15, the tongue portion 29 of the slider 25 is hooked to the top end of the elongation 75, and the slider 25 is slid together with the connector holder 65. The movement of the slider 25 is transmitted to the push button 34 via the link plate 31, and the push button 34 is projected onto the recess 30 of the base unit 2 again.

If the second connector 76 and the first connector 15 are connected to each other, the push plate 73 is inserted into the through hole 82, and the second engaging recess 132 of the push plate 73 are opposite to each other as shown in FIG. 12. Due to this, if the hand is away from the knob 122a, the link 106 is slid right by the urging force of the extension coil spring 120. Then, seemingly the roller 115 of the slide plates 90a and 90b is over the first cam section 111 of the translation cams 110a and 110b and contacts the third cam section 113, and is engaged with the second engaging recess 132 of the latch piece 130. By this engagement, the connector holder 65 is locked at the second position, and the link 106 cannot be slid any more. Due to this, the second hooks 97a and 97b are locked in a state that they are hooked to the base unit 2, and the connection between the computer 1 and the extension unit 40 is maintained.

In order to release the connection between the computer 1 and the extension unit 40, the knob 122a is first operated by the tip of the finger, and the operation lever 122 is rotated clockwise. By this rotation, the link 106 is slid left against the urging force of the extension coil spring 120, and the latch piece 130 is detached from the second engaging recess 132. Thereby, the lock of the connector holder 65 is released. Under this state, the push button 34 is pushed into the recess 30 of the base unit 2 by the tip of the finger. Thereby, the slider 25 is slid in the direction, which is away from the the first connector 15, and the connector holder 65 is pushed back to the first position from the second position through the tongue portion 29 of the slider 25. Due to this, since the push plate 73 of the connector holder 65 is pushed to the outside of the cover 62 from the through hole 82, the top end of the push plate 73 is picked up by the tip of the finger, and taken out of the connector unit 60.

By the above series of the operations, the connector holder 65 is returned to the first position, and the connection between the first connector 15 and the second connector 76 is released. Then, if the hand is away from the knob 122a in the course of taking out the push plate 73, the latch piece 130 is engaged with the first engaging recess 131 by the urging force of the extension coil spring 120 at the time when the first engaging recess 131 is opposed to the latch piece 130. By this engagement, the connector unit 60 is locked at the first position. The link 106 cannot be slid any more, and the roller 115 of the slide plates 90a and 90b is maintained to be in contact with the second cam section 112 of the translation cams 110a and 110b. Due to this, the slide plates 90a and 90b are locked to be pushed out of the connector unit 60 and the second hooks 97a and 97b are detached from the fitting holes 99a and 99b of the base unit 2, and the connection between the computer 1 and the expansion unit 40 is released.

According to the above structured electronic apparatus system, after the memory card 11 is taken up from the computer 1, the computer 1 is overlaid on the overlaying surface 46 of the expansion unit 40, and the connector holder 65 of the expansion unit 40 is inserted into the opening 38 of the base unit 2 and slid. Thereby, the second connector 76 can be connected to the first connector 15. Due to this, the first connector 15, which is used for the connection of the memory card 11, can be used as a connector for the connection of the expansion unit 40. As a result, there is no need of a special connector, which is conventionally necessary to connect the expansion unit 40.

Therefore, the number of the parts can be reduced, and the mounting space in the base unit 2 can be reduced, so that the arrangement of the parts can be set without difficulty, and the size and the weight of the computer 1 can be reduced.

Moreover, since the first connector 15 built in the computer 1 and the second connector 76 of the expansion unit 40 are directly connected to each other, there is no need of the special external wring cable, which is conventionally required, so that the connecting working of the expansion unit 40 can be easily performed. Furthermore, the expansion unit 40 is arranged by overlaying the computer 1 on the overlaying surface 46. Therefore, if only the space for mounting the computer 1 is provided, the expansion of the unit 40 can be made, and the amount of the space, which is necessary to extend the function of the computer 1, may be small.

Moreover, if the connector holder 60 is slid from the first position to the second position, the first hooks 55a and 55b and the second hooks 97a and 97b are hooked to the base unit 2, and the computer 1 is positioned at a predetermined position on the overlaying surface 46. Due to this, the positional relationship between the connector holder 60 and the first connector 15 are made suitably, and the first connector 15 and the second connector 76 can be positioned with accuracy.

As long as the second hooks 97a and 97b are not hooked to the base unit 2, the connector holder 60 cannot be slid to the second position. Due to this, in a state that the first and second connectors 15 and 76 are not positioned with accuracy, the connectors 15 and 76 can be prevented from being fitted to each other. Therefore, even in a state that the first connector 15 is contained in the base unit 2 and the fitting portion of the first connector 15 and the second connector 76 cannot be seen from the outside, the connection between the connectors 15 and 76 can be surely and smoothly performed.

According to the above-mentioned structure, the expansion unit 40 is divided into the case 41 containing the FDD 44 and the printed circuit board 45 and the connector unit 60 containing the connector holder 65 and its operation system, and the connector unit 60 is detachably attached to the attaching recess 48 of the case 41. Due to this, if a plurality of cases 41 containing various expansion devices are prepared and the connector unit 60 is selectively attached to the case 41 containing the expansion device provided to meet the object of using the device, one connector unit 60 can be used in common. Therefore, in a case where types of the expansion units are increased, only one connector unit 60 may be used and the number of cases 41 containing the expansion units may be increased. This is very economical.

The present invention is not limited to the above-explained first embodiment, and various modifications can be made within the scope of the invention.

For example, according to the above first embodiment, in the case that the expansion unit is divided into the case and the connector unit, electrical connection between the case and the connector unit are made by the contact between the contact terminal and the terminal metal fittings. However, the case and the connector unit may be electrically connected by a cable. Moreover, the expansion unit is not always divided into the case and the connector unit. The connector holder may be incorporated into the case as one unit.

A second embodiment of the present invention will be explained with reference to FIGS. 21 to 46.

In the second embodiment, since the basic structure of the computer 1 is the same as that of the first embodiment, the same reference numerals as the first embodiment are added to the same structural parts as the second embodiment, and the explanation is omitted.

As shown in FIGS. 21 to 24, the bottom case 3 of the base unit 2 has tray inlet 201a and 201b in its right and left side surfaces 3b. The tray inlet 201a and 201b have a long and thin shape extending in the front and back direction of the bottom case 3. The tray inlet 201a and 201b are positioned to be symmetrical with the bottom surface 3a of the bottom case 3. Also, the memory card 11 is detachably contained in the base unit 2 from the tray inlet 201a and 201b. In containing the memory card 11, trays 202a and 202b are used. The tray 202a in left and 202b in right are incorporated into the base unit 2 in the same structure, and the tray 202a in left will be typically explained.

Figure 26:
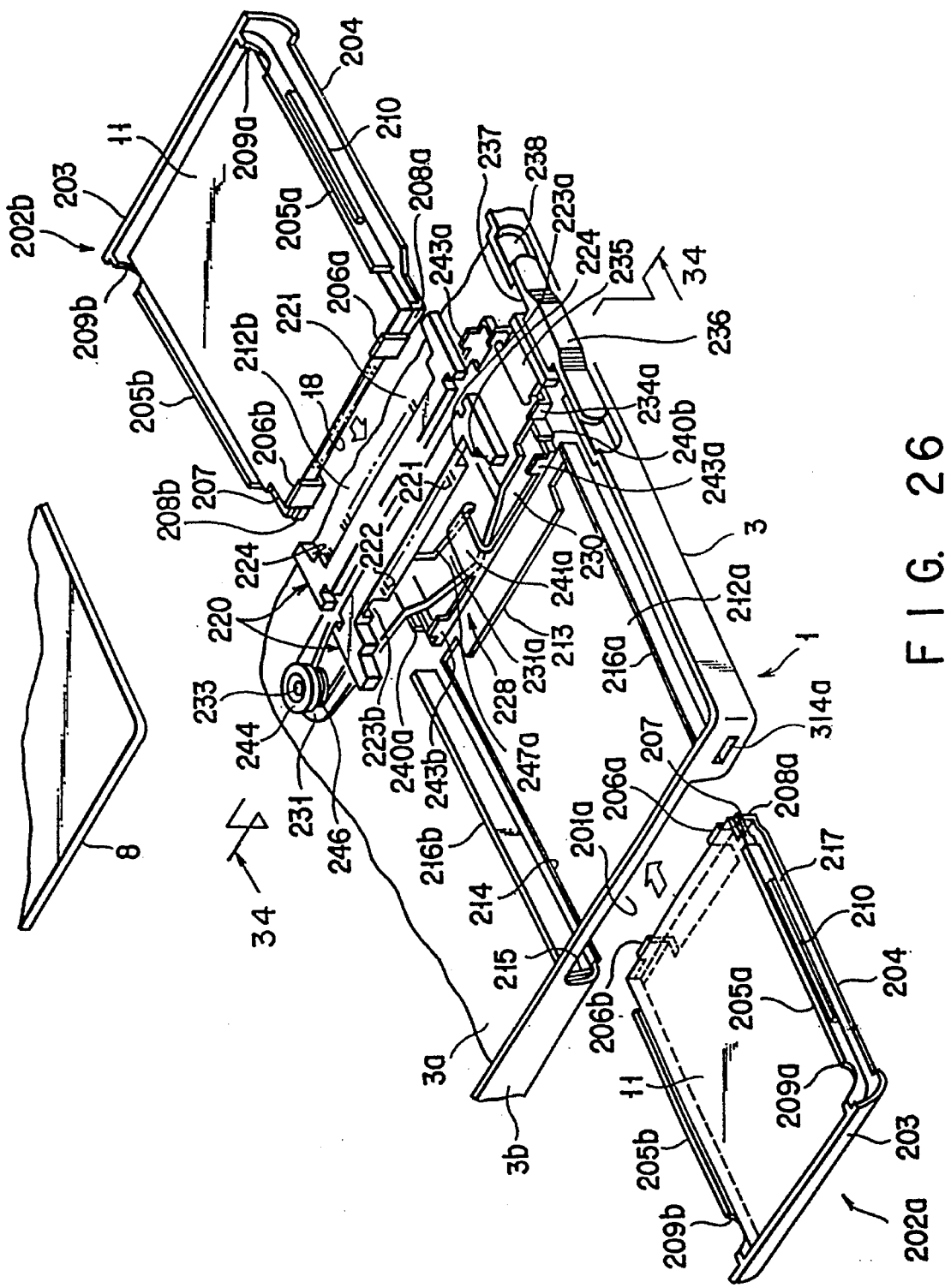
Figure 27:
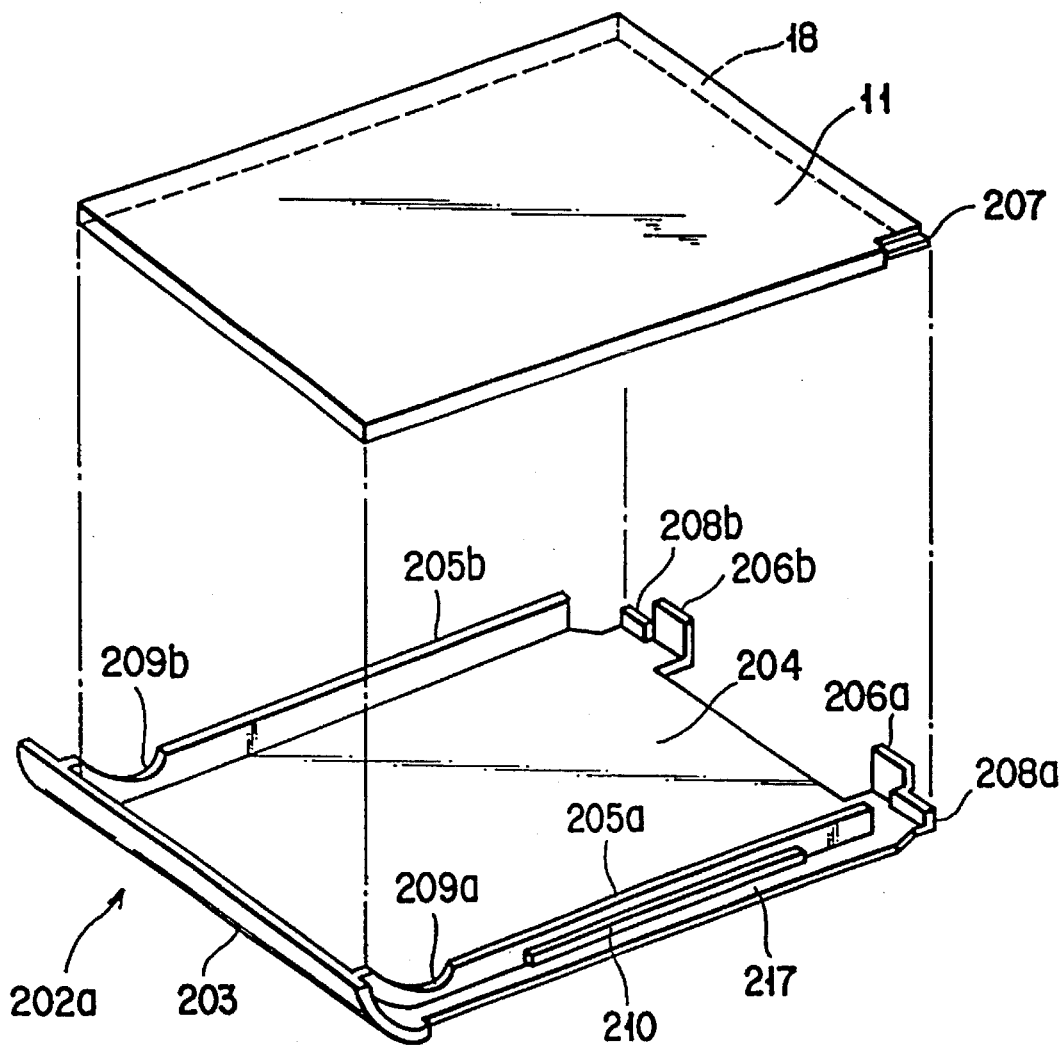

As shown in FIG. 27, the tray 202a has a circularly curved end wall 203, which closes the tray inlet 201a, and a rectangular bottom wall 204, which is continuous to the end wall 203. A pair of support walls 205a and 205b are projected from both side portions of the upper surface of the bottom wall 204. A pair of claws 206a and 206b, which project upward at an angle of 90 degrees, are formed in the edge portion, which is opposite to the end wall 203 of the bottom wall 204. These claws 206a and 206b, support walls 205a and 205b, and end wall 203 form a space for containing the memory card 11 on the bottom wall 204. As shown in FIG. 26, the memory card 11 is horizontally provided on the bottom wall 204 in a state that the memory card 11 is guided by claws 206a and 206b, support walls 205a and 205b, and end wall 203, and the terminal 18 is directed to the the claws 206a and 206b. A convex portion 207 for guiding the insertion direction of the memory card 11 is formed in the right end portion of the terminal 18.

A pair of projections 208a and 208b are formed on the upper surface of the bottom wall 204. The projections 208a and 208b are adjacent to the claws 206a and 206b so as to support the end portion of the terminal 18 of the memory card 11. By the provision of the projections 208a and 208b, the memory card 11 is maintained in a state that the memory card 11 is floated from the bottom wall 204 by height of the projections 208a and 208b. The edge portion, which is opposed to the terminal 18 of the memory card 11, is engaged with the inner surface of the circularly curved end wall 203.

The support walls 205a and 205b have concave portions 209a and 209b for taking out the card, respectively. These concave portions 209a and 209b are adjacent to the end wall 203, and circularly and deeply notched such that a part of the memory card 11 provided on the bottom wall 204 is exposed. A guide rib 210, which extends in the insertion direction of the tray 202a, is provided on each outer surface of the support walls 205a and 205b.

As shown in FIGS. 28 and 46, the inner surface of the base unit 2 including the bottom case 3 and the top cover 4 is covered with a first conductive and plating shield layer 211. As shown in FIG. 26, right and left tray insertion passages 212a and 212b, which are continuous to the tray inlet 201a and 201b, are formed in the bottom case 3. Since the tray insertion passages 212a in left and 212b in right have the same structure, the tray insertion passage 212a in the left will be typically explained. The tray insertion passage 212a has an opening 213 formed in the bottom surface 3a of the bottom case 3. The size of the opening 213 is formed to correspond to that of the bottom surface 204 of the tray 202a, and continuous to the tray inlet 202a. As shown in FIGS. 26 and 28, a slide rail 214 is provided in the edge portion of both sides of the opening 213. The slide rail 214 is formed to be slidably inserted into a space 217 between the guide rib 210 of the tray 202a and the edge portion of the bottom wall 204 opposite to the guide rib 210. Therefore, if the tray 202a is inserted into the tray insertion passage 212a from the tray inlet 201a in a state that the claws 206a and 206b are inserted first, the guide rail 214 is inserted into the space 217. By this insertion, the tray 202a is maintained at the tray insertion passage 212a together with the memory card 11. In a state that the tray 202a is completely inserted into the tray insertion passage 212a, the end wall 203 of the tray 202a closes the tray inlet 201a and the bottom wall 204 closes the opening 213. Then, the end wall 203 is continuous to the side surface 3b of the bottom case 3 to be flush therewith, and forms the part of the side surface 3b. The bottom wall 204 is continuous to the bottom surface 3a of the bottom case 3 to be flush therewith, and forms the part of the bottom surface 3a.

A stopper 215 facing to the tray inlet 201a is formed in the bottom case 3. The stopper 215 comes in contact with the end wall 203 at the time when the tray 202a is completely inserted into the tray insertion passage 212a. By this contact, the maximum insertion position of the tray 202a is specified. A pair of board support walls 216a and 216b for supporting the printed circuit board 8 are formed on the bottom surface 3a of the bottom case 3. The board support walls 216a and 216b are positioned at both sides of the opening 213, and used as a side wall of the tray insertion passage 212a.

A first connector 220 of insertion type is provided in the final end of each of the tray insertion passages 212a and 212b. The first connector 220 has a plurality of first pin terminals 221, which are inserted into the pin holes 17 of the memory card 11, and a plurality of second pin terminals 222 for expanding the function. As shown in FIGS. 28 and 29, the first connector 220 is supported by the lower surface of the printed circuit board 8. Then, when the memory card 11 is completely inserted into the tray insertion passage 212a by the tray 202a, the first connector 220 is arranged at the position opposite to the terminal 18 of the memory card 11.

Then, by this insertion of the tray 202a, the first pin terminals 221 are fitted to the pin holes 17 of the terminal 18, so that the memory card 11 and the computer 1 are electrically connected to each other.

As shown in FIG. 26, the first connector 220 has a pair of relief concave portions 223a and 223b in the surface opposite to the tray 202a. The claw portions 206a and 206b of the tray 202a are introduced into the relief concave portions 223a and 223b at the time when the tray 202a is completely inserted into the tray insertion passage 212a. An engaging concave portion 224 is formed in the right end portion of the first connector 220. The convex portion 207 of the memory card 11 is detachably engaged with the engaging concave portion 224 at the time when the memory card 11 is completely inserted into the tray insertion passage 212a. By this engagement, the first pin terminals 221 of the first connector 220 and the pin holes 17 of the memory card 11 are positioned.

Figure 34:
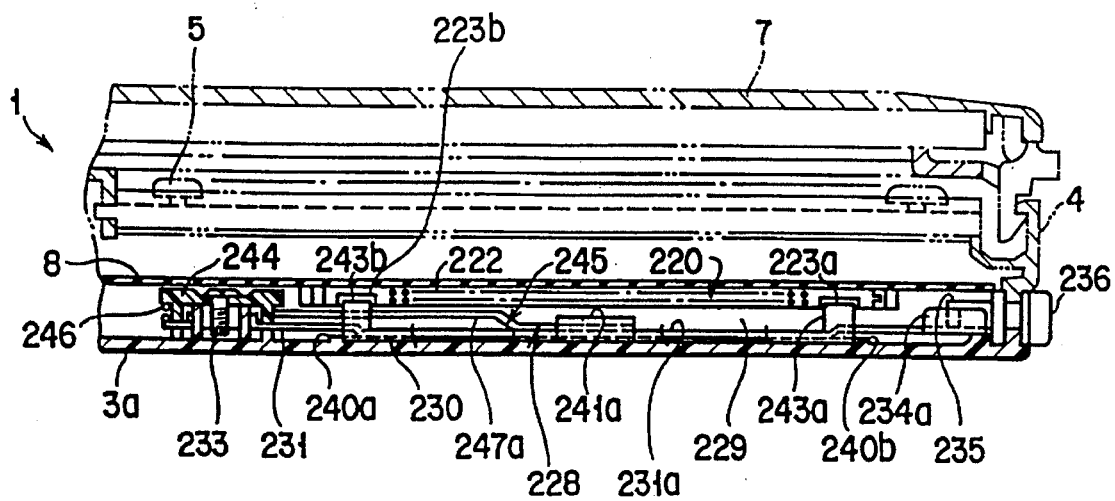
Figure 35:
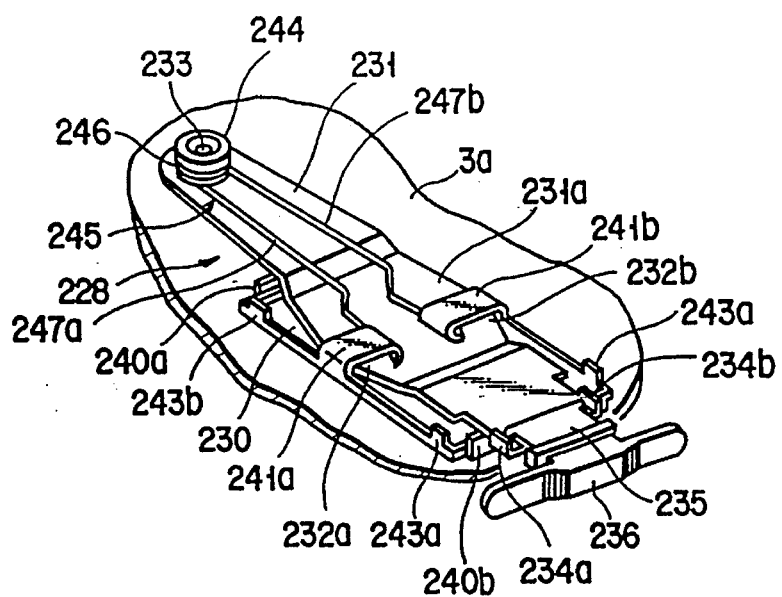
Figure 36:
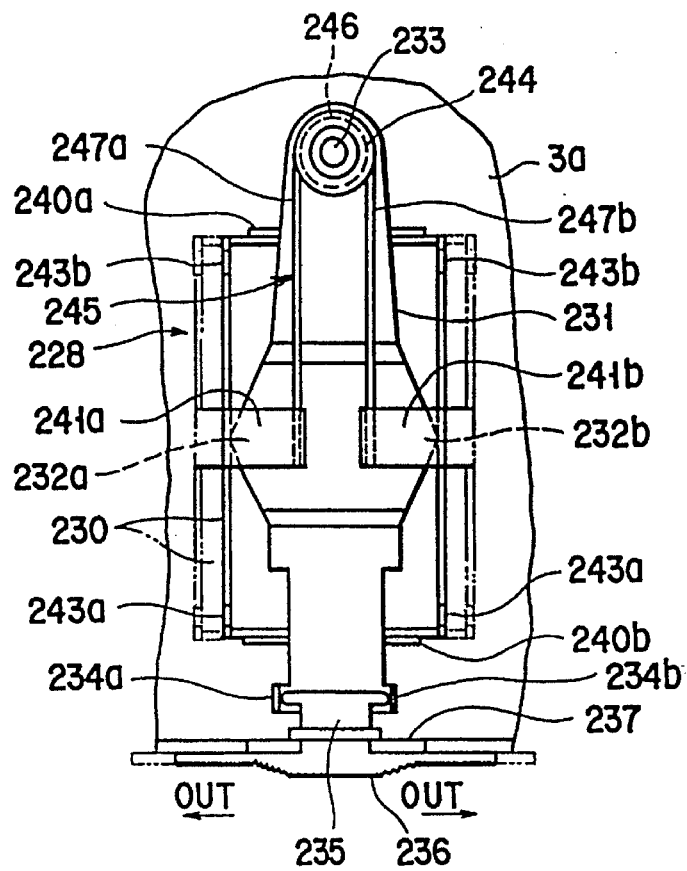

As shown in FIG. 26, in the base unit 2, there is contained a pushing mechanism 228 for pushing the inserted memory card 11 to the outside. The pushing mechanism 228 is positioned at the portion between the final ends of the right and left tray insertion passages 212a and 212b and arranged in a space 229 generated between the first connector 220 and the bottom surface 3a of the bottom case 3 as shown in FIG. 34. The pushing mechanism 228, as shown in FIGS. 35 and 36, has a slide plate 230, which is arranged on the bottom surface 3a of the bottom case 3, and a rotation plate 231 overlaid on the upper surface of the slide plate 230. The rotation plate 231 is long-and-thin-belt-shaped, and extends in the direction crossing the insertion direction of the memory card 11. The rotation plate 231 has a seat portion 231a, which is bent to be projected downward against its intermediate portion. Projections 232a and 232b projecting outside are formed in both side edge portions of the seat portion 231a, and the seat portion 231a is overlaid on the upper surface of the slide plate 230.

One end of the rotation plate 231 is rotatably supported on the bottom surface 3a of the bottom case 3 through a shaft 233. The other end of the rotation plate 231 is close to the inner side of the front surface of the bottom case 3, and includes a pair of upwardly bent engaging pieces 234a and 234b. An operation lever 235 is coupled to the portion between the engaging pieces 234a and 234b. An operation member 236 configured so as to be easily hooked by the tip of a person's finger is attached to the top end of the operation lever 235. The operation member 236 is passed through a slit 237 formed in the front surface of the bottom case 3 and guided to the outside of the bottom case 3. Moreover, as shown in FIG. 26, a mounting recess 238, which extends right and left, is formed in the front surface of the bottom case 3, and the operation member 236 is slidably arranged in the mounting recess 238. Due to this, if the operation member 238 is slid right and left by the tip of the finger, the rotation plate 231 is rotated right and left in a state that the shaft 233 is used as a fulcrum.

As shown in FIG. 36, the slide plate 230 is formed rectangular. The length of one side of the slide plate 230, which is along the longitudinal direction, is set to be substantially equal to the size of the width of the tray insertion passage 212a. A pair of guide rails 240a and 240b is provided on the bottom surface 3a on which the slide plate 230 is overlaid. The guide rails 240a and 240b extends in the direction where the tray 202a is inserted, and the slide plate 230 is positioned at the portion between these guide rails 240a and 240b. Therefore, the slide plate 230 is slidably maintained by the guide rails 240a and 240b in the direction where the tray 202a is inserted. Coupling pieces 241a and 241b are formed in both side edge portions of the slide plate 230. The coupling pieces 241a and 241b sandwich the projections 232a and 232b of the seat portion 231a of the rotation plate 231 between these coupling pieces 241a and 241b and the slide plate 230. Then, the sharp top ends of the projections 232a and 232b contact the coupling pieces 241a and 241b. Thereby, the slide plate 230 and the rotation plate 231 are movably connected to each other in a state that the top ends of the coupling pieces 241a and 241b are used as fulcrums. Therefore, if the rotation plate 231 is rotated right and left through the operation member 236, the slide plate 230 is guided by the guide rails 240a and 240b, and linearly slid.

As shown in FIG. 35, the slide plate 230 has a pair of pressing pieces 243a and 243b in its both side edge portions. As shown in FIG. 31, the pressing pieces 243a and 243b extend upward, and enter the relief concave portions 223a and 223b of the first connector 220. In the relief concave portions 223a and 223b, the pressing pieces 243a and 243b are opposite to the claws 206a and 206b each other. Due to this, if the operation member 236 is slid left, the slide plate 230 is slid through the rotation plate 231, and the pressing pieces 243a and 243b in the left side edge portion of the slide plate 230 are projected to the tray insertion passage 212a in the left from the relief concave portions 223a and 223b of the first connector 220 in the left as shown in FIG. 32. Conversely, if the operation member 236 is slid right, the pressing pieces 243a and 243b in the right side edge portion of the slide plate 230 are projected to the tray insertion passage 212b in the right from the relief concave portions 223a and 223b of the first connector 220 in the right.

As shown in FIGS. 35 and 36, a pulley-shaped spring seat 244 is secured to the upper end portion of the shaft 233. A torsion coil spring 245 is attached to the spring seat 244 so as to maintain the rotation plate 231 at the neutral position. The torsion coil spring 245 has a coil portion 246 wound around the spring seat 244 and a pair of leg portions 247a and 247b extending from both ends of the coil portion 246. The top ends of the leg portions 247a and 247b are engaged with the coupling pieces 241a and 241b of the rotation plate 231. By this engagement, the slide plate 230 and the rotation plate 231 are elastically maintained between the right and left tray insertion passages 212a and 212b, and the pressing pieces 243a and 243b of the slide plate 230 are positioned in the relief concave portions 223a and 223b of the first connector 220. Due to this, after the operation member 236 is slid, the operator's hand is detached from the operation member 236, the slide plate 230 and the rotation plate 231 are returned to the neutral position by elasticity of the torsion coil spring 245, and the pressing pieces 243a and 243b are drawn to the relief concave portions 223a and 223b of the first connector 220.

On the other hand, for expanding the function of the computer 1, an expansion unit 250 as shown in FIGS. 21 to 23, 37 and 41 are used. The expansion unit 250 has a synthetic resin-made case 251. The case 251 has the same size as the computer 1, and is shaped flat and rectangular. In the case 251, the floppy disc driving device 44 (FDD) and a printed circuit board 253 are provided. The printed circuit board 253 is electrically connected to the FDD 44, and electronic parts forming various circuits such as a power supply circuit are mounted on the printed circuit board 253. FDD 44 has the floppy insertion inlet 44a for accessing the floppy disc. The floppy inlet 44a is exposed to the right side portion of the front surface of the case 251. As shown in FIGS. 41 and 46, the inner surface of the case 251 is covered with a second conductive and plating shield layer 254.

A flat mounting surface 256 on which the computer 1 is overlaid is formed on the upper surface of the case 251. A long and thin attaching recess 257 is formed in the right end portion of the flat mounting surface 256. The attaching recess 257 is formed over the full length of the front and back of the mounting surface 256, and opened to be continuous to the left side surface of the case 251, the front and back surfaces of the case 251. In other words, as shown in FIG. 21, the attaching recess 257 has a bottom surface 257a and a vertical side surface 257b, which is continuous to the bottom surface 257a and the mounting surface 256. The bottom surface 257a is formed at the position which is lower than the mounting surface 256 by the height of the side surface 257b. Then, the attaching recess 257 corresponds to the tray inlet 201a in the left of the computer 1 and the opening 213 at the time when the computer 1 is overlaid on the mounting surface 256.

Figure 38:
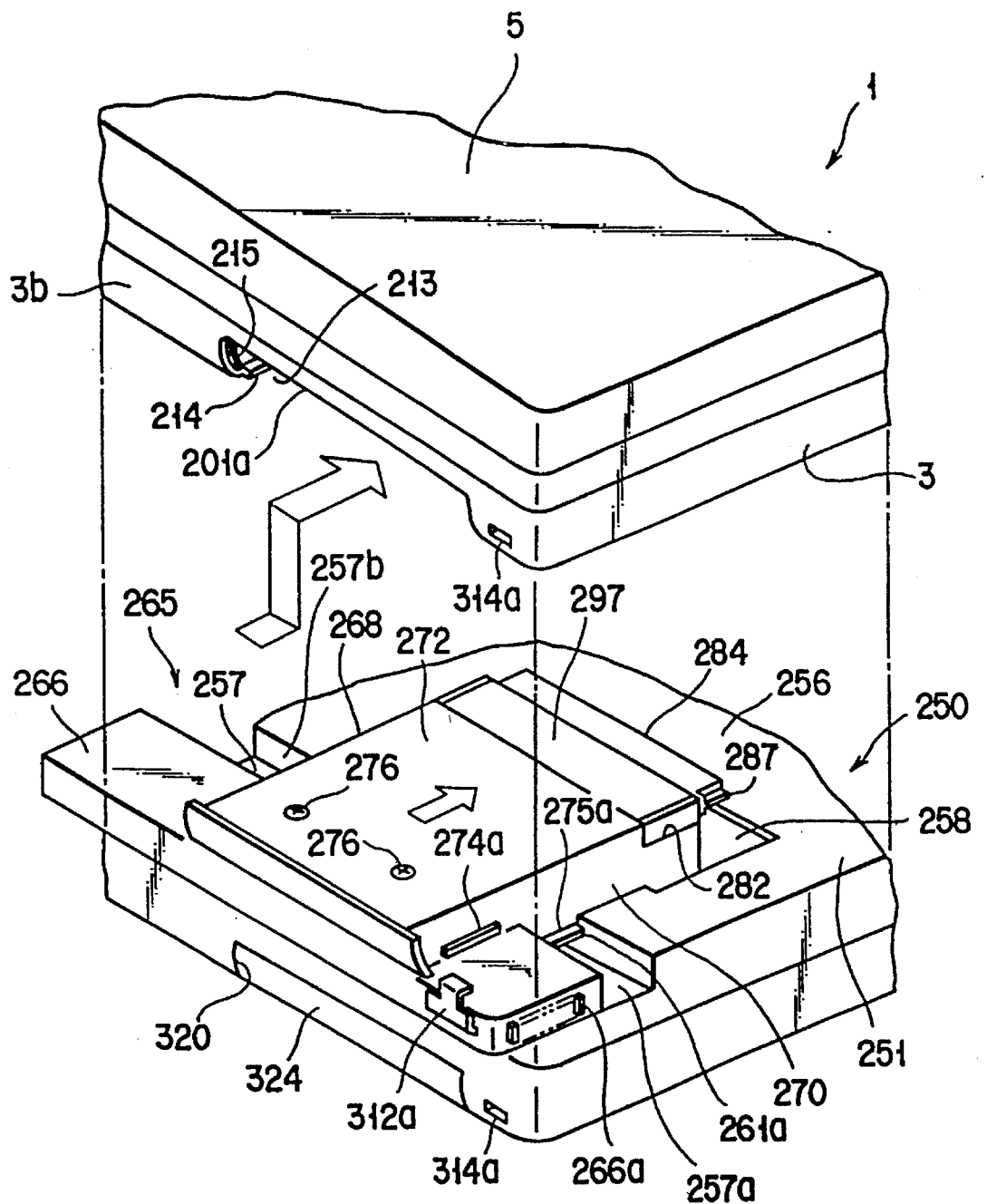
Figure 39:
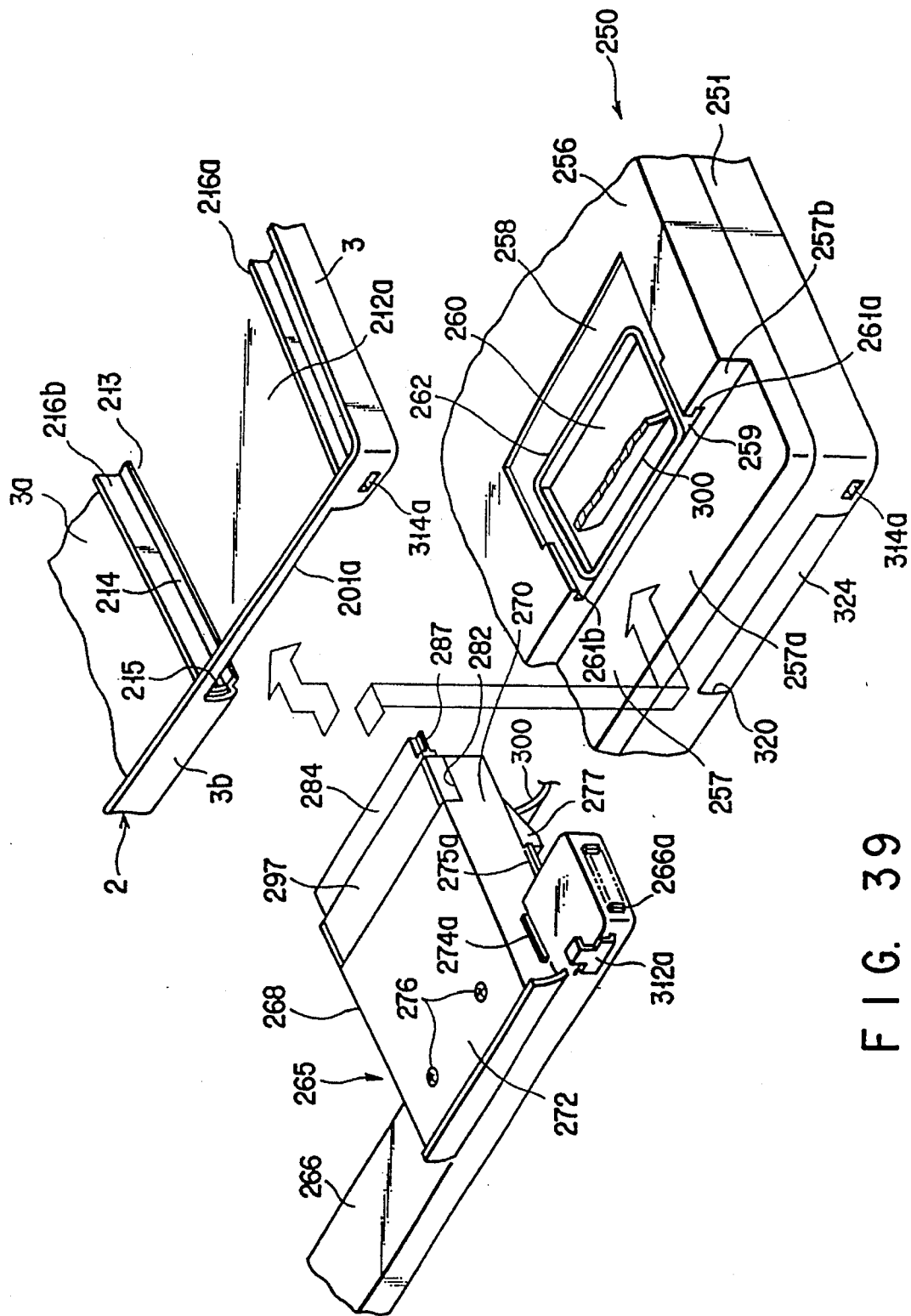

As shown in FIGS. 38 and 39, the mounting surface 256 has a square concave portion 258. The concave portion 258 is opposite to the opening 213 of the base unit 2 at the time when the computer 1 is overlaid on the mounting surface 256. The concave portion 258 and the opening 213 are formed to have substantially the same size. The concave portion 258 has a communication hole 259, which is formed in the side surface 257b of the attaching recess 257, and a cable insertion hole 260, which is continuous to the inside of the case 251. A pair of guide grooves 261a and 261b, which are opposite to each other, are formed in the end portion of the opening of the communication hole 259 formed in the side surface 257b. The guide grooves 261a and 261b are formed to be parallel with the mounting surface 256, and extend right and left of the mounting surface 256. The cable insertion hole 260 is formed in the bottom surface of the concave portion 258. A sheet-metallic frame 262 is attached to the edge portion of the opening of the cable insertion hole 260. The frame 262 comes in contact with the second shield layer 254 of the case 251, and is electrically connected thereto.

Figure 37:
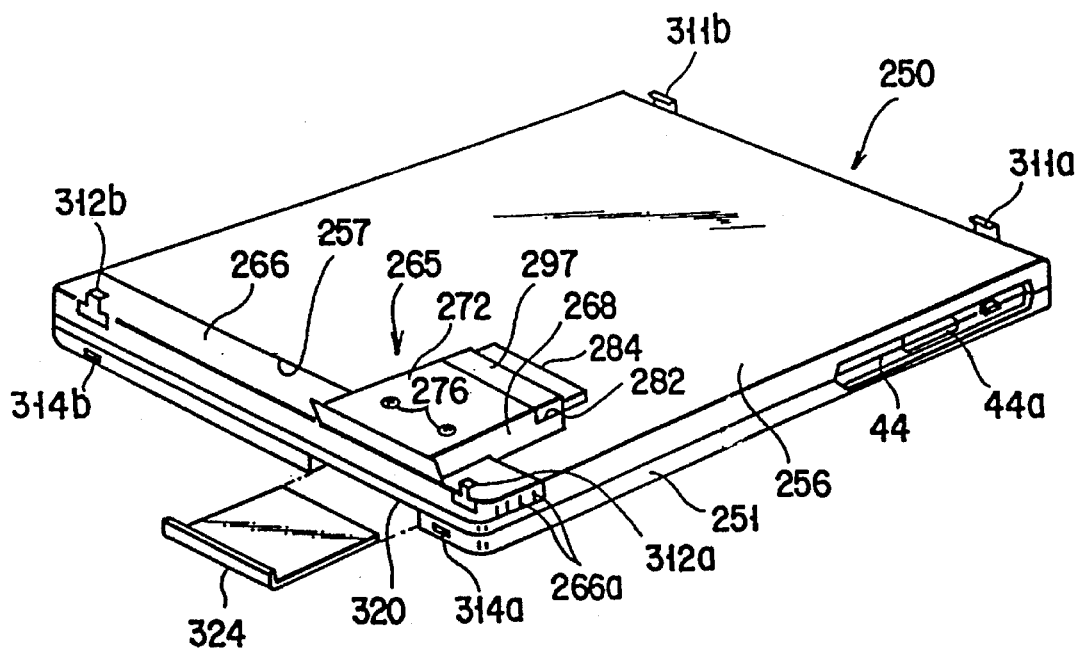

As shown in FIGS. 38 and 39, a connector unit 265 for electrically connecting the computer 1 to the expansion unit 250 is mounted to the attaching recess 257. The connector unit 265 has a synthetic resin-made slider 266. The slider 266 is long and thin box-shaped to have substantially the same shape and size as the attaching recess 257. Then, the slider 266 is attached to the attaching recess 257 to be movable right and left. As shown in FIG. 46, the inner surface of the slider 266 is covered with a third conductive and plating shield layer 267. As shown in FIG. 37, in a state that the connector unit 265 is attached to the attaching recess 257, the upper surface, side surface, front surface, and back surface of the slider 266 are continuous to the mounting surface 256, the side surface, front surface, and back surface of the case 251 to be flush therewith. The slider 266 forms a part of the case 251. Therefore, the upper surface of the slider 266 forms a part of the mounting surface 256. Additionally, a plurality of projections 266a for hooking the tip of the finger are formed in both end portions of the slider 266.

Figure 40:
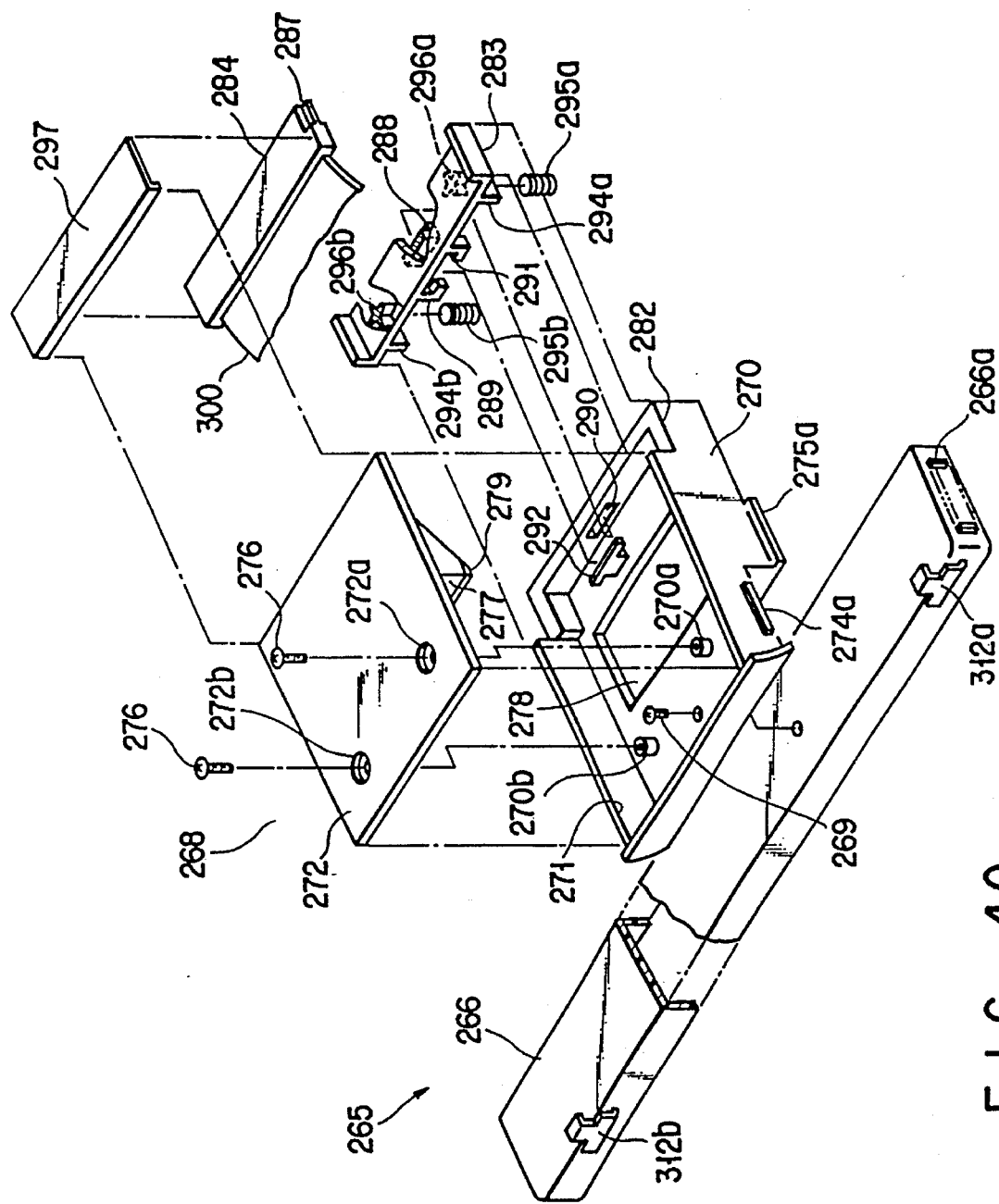

As shown in FIGS. 38 and 39, the slider 266 has a synthetic resin-made terminal holder 268. The terminal holder 268 is box-shaped to be detachable from both the tray insertion passage 212a of the computer 1 and the concave portion 258 of the mounting surface 256. One end of the terminal holder 268 is projected on the mounting surface 256. As shown in FIG. 40, the terminal holder 268 has a holder body 270 fixed to the upper surface of the slider 266 by a screw 269. The holder body 270 is square box-shaped and has an opening 271 on its upper surface. A pair of bosses 270a and 270b are projected on the bottom surface of the holder body 270. The opening 271 of the holder body 270 is closed by a cover 272. A shown in FIGS. 40 and 41, the cover 272 has a pair of screw receiving portions 272a and 272b projecting to the back of the cover 272. The screw receiving portions 272a and 272b are opposite to the bosses 270a and 270b of the holder body 270. A screw 276 is inserted into each of the screw receiving portions 272a and 272b. The screws 276 are screwed to the bosses 270a and 270b. Thereby, the cover 272 is fixed to the holder body 270. Then, as shown in FIG. 41, the inner surface of the holder body 270 including the bosses 270a and 270b is covered with a fourth conductive and plating shield layer 273.

As shown in FIGS. 39 and 40, a pair of first guide rails 274a and 274b and a pair of second guide rails 75a and 275b are provided in both side surfaces of the holder body 270. The first guide rails 274a and 274b slidably comes in contact with the lower surface of the slide rail 214 of the computer 1 when the computer 1 is overlaid on the mounting surface 256. The second slide rails 275a and 275b detachably enter the guide grooves 261a and 261b of the expansion unit 250. Thereby, if the slider 266 is slid to the side surface 257b on the attaching recess 257, the terminal holder 268 is inserted into both the concave portion 258 on the mounting surface 256 and the tray insertion passage 212a of the computer 1, which is overlaid on the mounting surface 256, as shown in FIG. 38.

Figure 42:
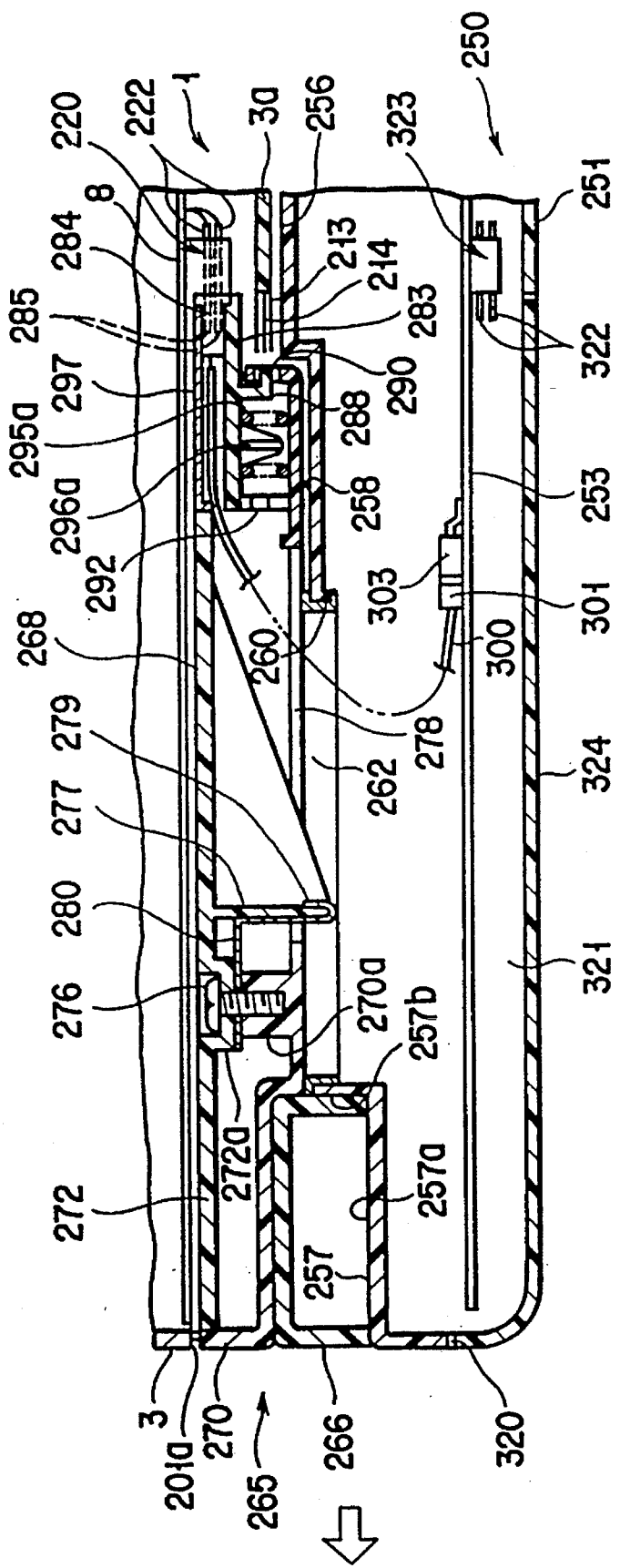
Figure 43:
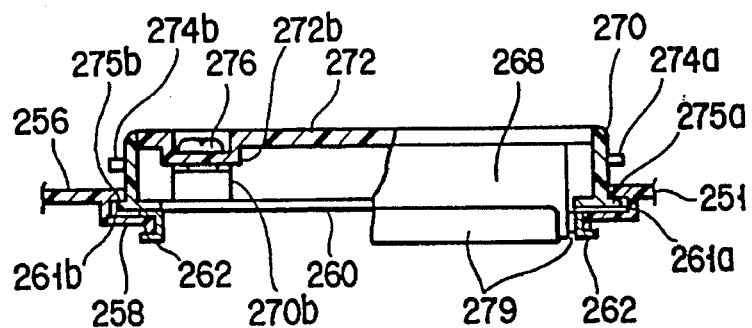

As shown in FIGS. 40 and 41, a contact support 277 is projected to the back surface of the cover 272. The contact support 277 is passed through a through hole 278 formed in the bottom surface of the holder body 270, and projected to the lower portion of the terminal holder 268. The lower end portion of the contact support 277 is passed through the cable insertion hole 260, and projected to the inside of the case 251 of the expansion unit 250. A metal fitting 279 is attached to the lower end portion of the contact support 277. The metal fitting 279 slidably comes in contact with the frame 262 of the cable insertion hole 260. By this contact, the case 251 of the expansion unit 250 and the connector unit 265 are electrically connected to each other. In other words, as shown in FIGS. 41 and 42, the metal fitting 279 has an elongation 280. The elongation 280 is provided between the bosses 270a and 270b and the screw receiving portions 272a and 272b, and comes in contact with the fourth shield layer 273 covering the bosses 270a and 270b. That is, the second shield layer 254 of the case 251 is electrically connected to the third shield layer 265 of the inner surface of the slider 266 through the frame 262, contact fitting 279, fourth shield layer 273 of the holder body 270, and screw 269 fixing the holder body 270 to the slider 266.

As shown in FIG. 40, the terminal holder 268 has a connector attaching recess 282 in its one end projected to the mounting surface 256. A terminal base 283 is attached to the connector attaching recess 282. A second connector 284 is attached to the second connector 284. The second connector 284, which is an insertion type, is detachably connected to the first connector 220, and has a number of contacts 285 where the second pin terminals 222 of the first connector 220 contacts. The second connector 284 is supported in a state that the second connector 284 is slightly projected from the terminal base 283. Due to this, if the terminal holder 268 is inserted into the opening 213 of the computer 1, the second connector 284 and the first connector 220 are opposite to each other in the tray insertion passage 212a. Under this state, if the slider 266 is slid to the first connector 220, the first connector 220 and the second connector 284 are detachably connected to each other. A convex portion 287 is formed in the right end portion of the second connector 284. The convex portion 287 is detachably engaged with the engaging concave portion 224 of the first connector 220 when the terminal holder 268 is slid to the first connector 220 in the tray insertion passage 212a. By this engagement, the second pin terminals 222 of the first connector 220 and the contacts 285 of the second connector 284 are positioned.

Figure 44:
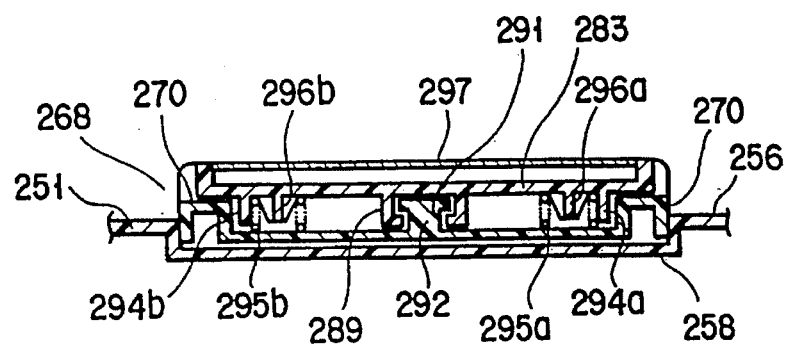

As shown in FIG. 40, a first engaging projection 288 and a second engaging projection 289 are formed in the lower surface of the terminal base 283. The first engaging projection 288 is inserted into an engaging hole 290 formed in the front surface of the holder body 270. There is provided gap in up and down direction between the engaging projection 288 and the engaging hole 290. As shown in FIG. 44, the second engaging projection 289 has an engaging groove 291 formed downward. A third engaging projection 292 is formed in the bottom surface of the holder body 270 facing to the engaging projection 289. The third engaging projection 292 is engaged with the engaging groove 291. There is provided gap in up and down direction in the engaging portion between the engaging projection 292 and the engaging groove 291. Moreover, a pair of stopper walls 294a and 294b are formed in the lower surface of the terminal base 283. The stopper walls 294a and 294b are positioned at both sides sandwiching the second engaging projection 289 therebetween. The stopper walls 294a and 294b enter the inside of the connector attaching recess 282, and position the terminal base 283 against the holder body 270. Due to this, the terminal base 283 is supported to be movable to the holder body 270 only in the upper and lower direction by the engagement between the first engaging projection 288 and the engaging hole 290 and the engagement between the second engaging projection 289 and the third engaging projection 292.

A pair of coil springs 295a and 295b is provided between the lower surface of the terminal base 283 and the bottom surface of the holder body 270. The coil springs 295a and 295b are supported by a pair of support projections 296a and 296b projected to the lower surface of the terminal base 283. These coil springs 295a and 295b always urges the terminal base 283 to move upward. Thereby, the terminal base 283 is supported to be floated in the holder body 270, so that the shift, which is generated when the second connector 284 is connected to the first connector 220, can be absorbed. Moreover, a connector cover 297 is attached to the upper end of the terminal base 283. The connector cover 297 sandwiches the second connector 284 between the terminal base 283 and the cover 297, and is continuous to the cover 272 of the terminal holder 268 to be flush therewith.

A flexible cable 300 is connected to the second connector 284. As shown in FIGS. 39 and 41, the cable 300 is passed through the through hole 278 of the holder body 270, the cable insertion hole 260 of the expansion unit 250, and guided to the inside of the case 251. The cable 300 has a third connector 301 its top end. The third connector 301 is electrically connected to a terminal 303 of the printed circuit board 253.

Figure 45:
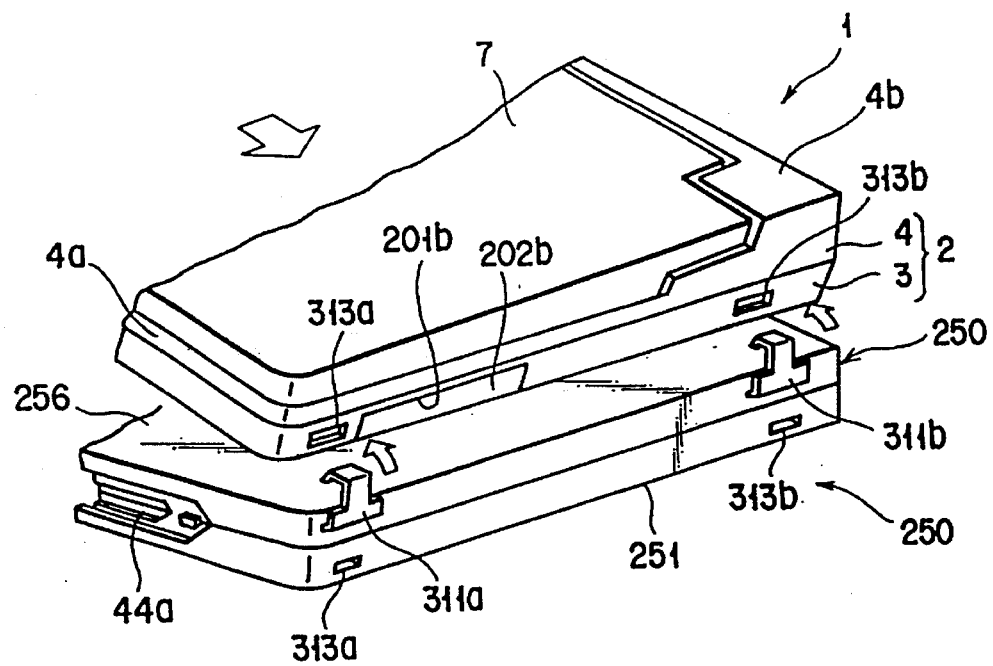

As shown in FIGS. 40, 45 and 46, the expansion unit 250 has a fixing mechanism 310 for overlaying the computer 1 on a predetermined position on the mounting surface 256 and fixing thereto. The fixing mechanism 310 has a pair of first fixing claws 311a and 311b arranged in the right side surface of the case 251 and a pair of second fixing claws 312a and 312b arranged in the left side surface of the slider 266. These fixing claws 311a, 311b, 312a, and 312b are formed of conductive metallic material. As shown in FIG.

46, one end of each of the first fixing claws 311a and 311b are inserted into the case 251, and screwed to the inner surface of the case 251. Thereby, the first fixing claws 311a and 311b comes in contact with the second shield layer 254 covering the inner surface of the case 251. The other end of each of the first fixing claws 311a and 311b are guided to the portion, which is upper than the mounting surface 256, and curved at an angle of 90 degrees so as to extend onto the mounting surface 256. One end of each of the second fixing claws 312a and 312b are inserted into the slider 266, and screwed to the inner surface of the slider 266. Thereby, the second fixing claws 312a and 312b comes in contact with the third shield layer 267 covering the inner surface of the slider 266. The other end of each of the second fixing claws 312a and 312b are guided to the portion, which is upper than the upper surface of the slider 266, and curved at an angle of 90 degrees so as to extend onto the upper surface. Therefore, these four fixing claws 311a, 311b, 312a, 312b are positioned at four corners of the mounting surface 256. The first fixing claws 311a and 311b are fitted to a pair of first positioning holes 313a and 313b formed in the right side surface of the base unit 2, and the second fixing claws 312a and 312b are fitted to a pair of second positioning holes 314a and 314b formed in the left side surface of the base unit 2.

As shown in FIG. 46, a pair of first leaf springs 315 (only one leaf spring 315 is shown in the drawing) and a pair of second leaf springs 316 (only one leaf spring 316 is shown in the drawing) are contained in the base unit 2. These leaf springs 315 and 316 are formed of conductive metallic material, and come in contact with the first shield layer 211 covering the inner surface of the base unit 2. The first leaf springs 315 are arranged at the position corresponding to the first positioning holes 313a and 313b. when the first fixing claws 311a and 311b are inserted into the first positioning holes 313a and 313b, the first leaf springs 315 come in contact with the tip of the fixing claws 311a and 311b. The second leaf springs 316 are arranged at the position corresponding to the second positioning holes 314a and 314b. When the second fixing claws 312a and 312b are inserted into the second positioning holes 314a and 314b, the second leaf springs 316 come in contact with the tip of the fixing claws 312a and 312b. Due to this, if the fixing claws 311a, 311b, 312a, and 312b are inserted into the positioning holes 313a, 313b, 314a, and 314b, respectively, the first shield layer 211 of the computer 1, the second shield layer 254 and the third shield layer 267 of the expansion unit 250 are electrically connected to each other.

Figure 22:
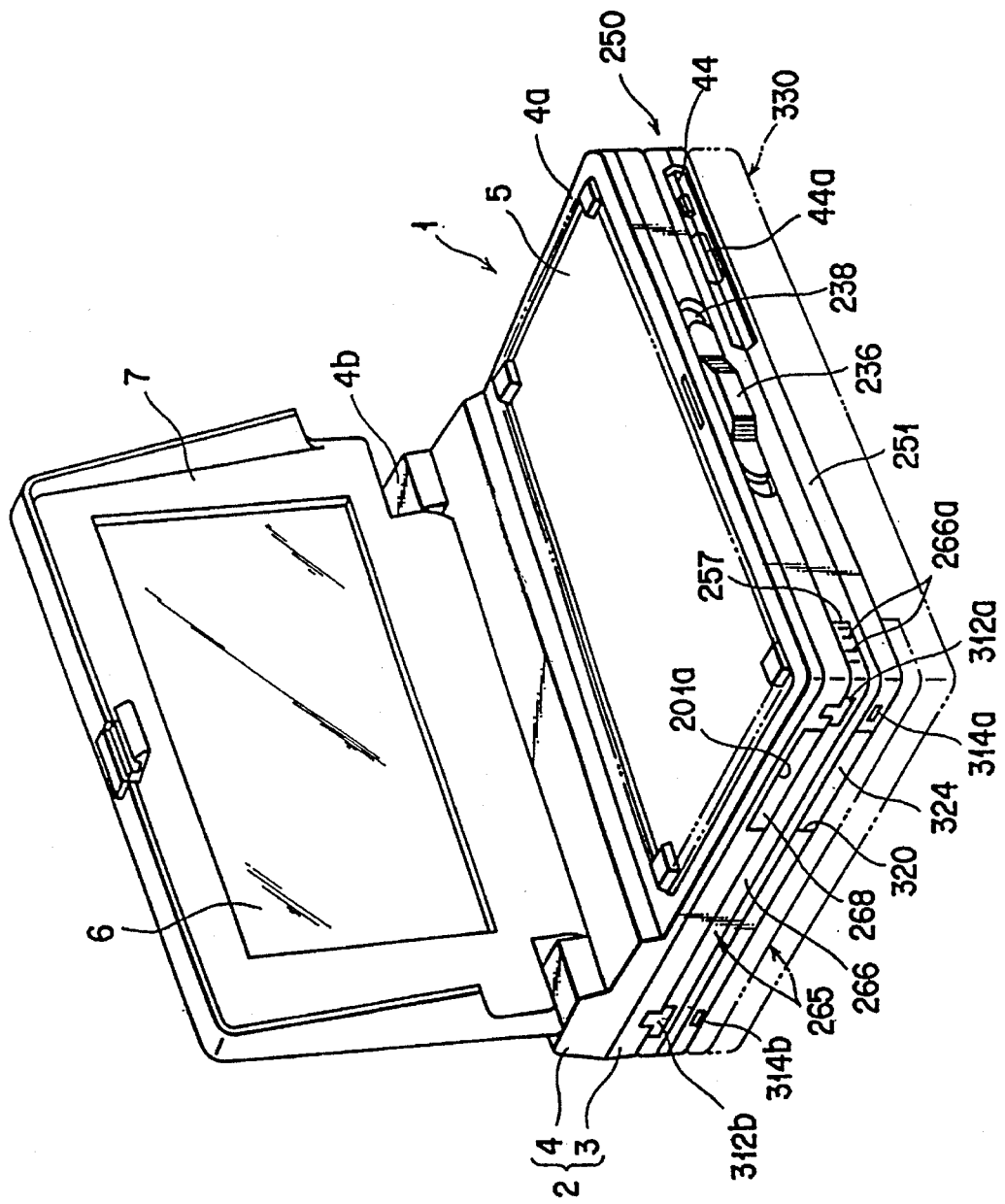
Figure 23:
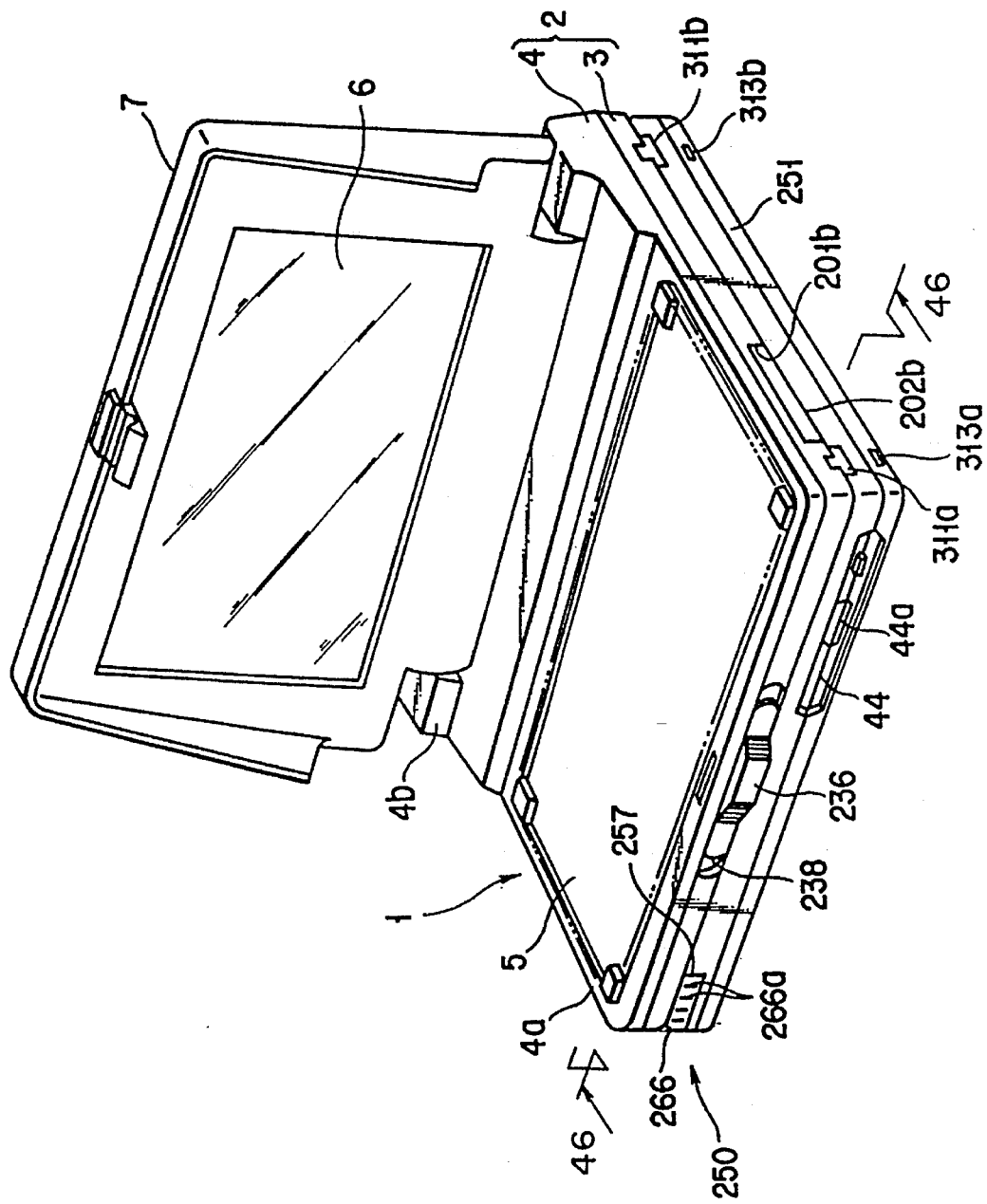
Figure 24:
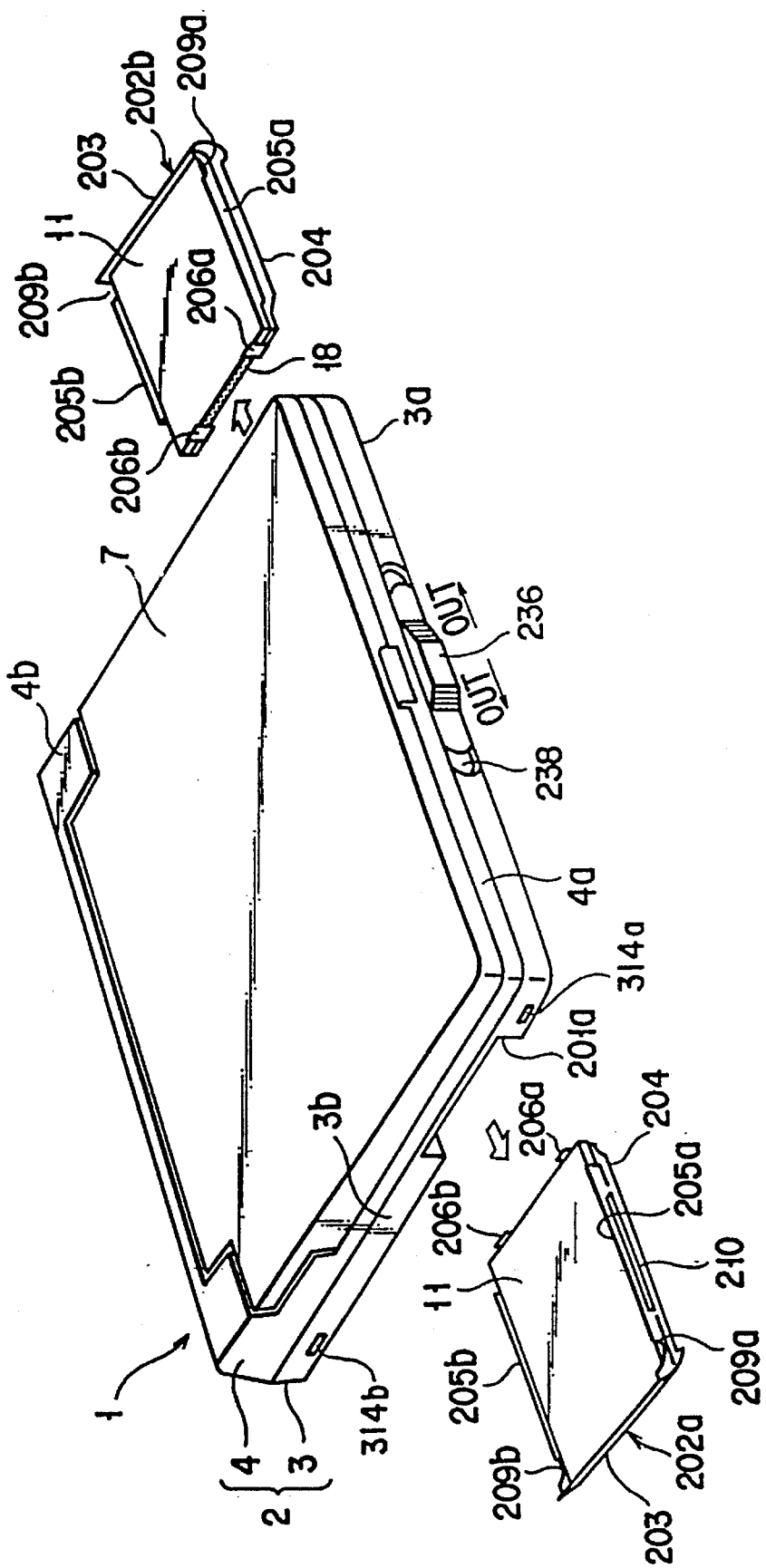
Figure 25:
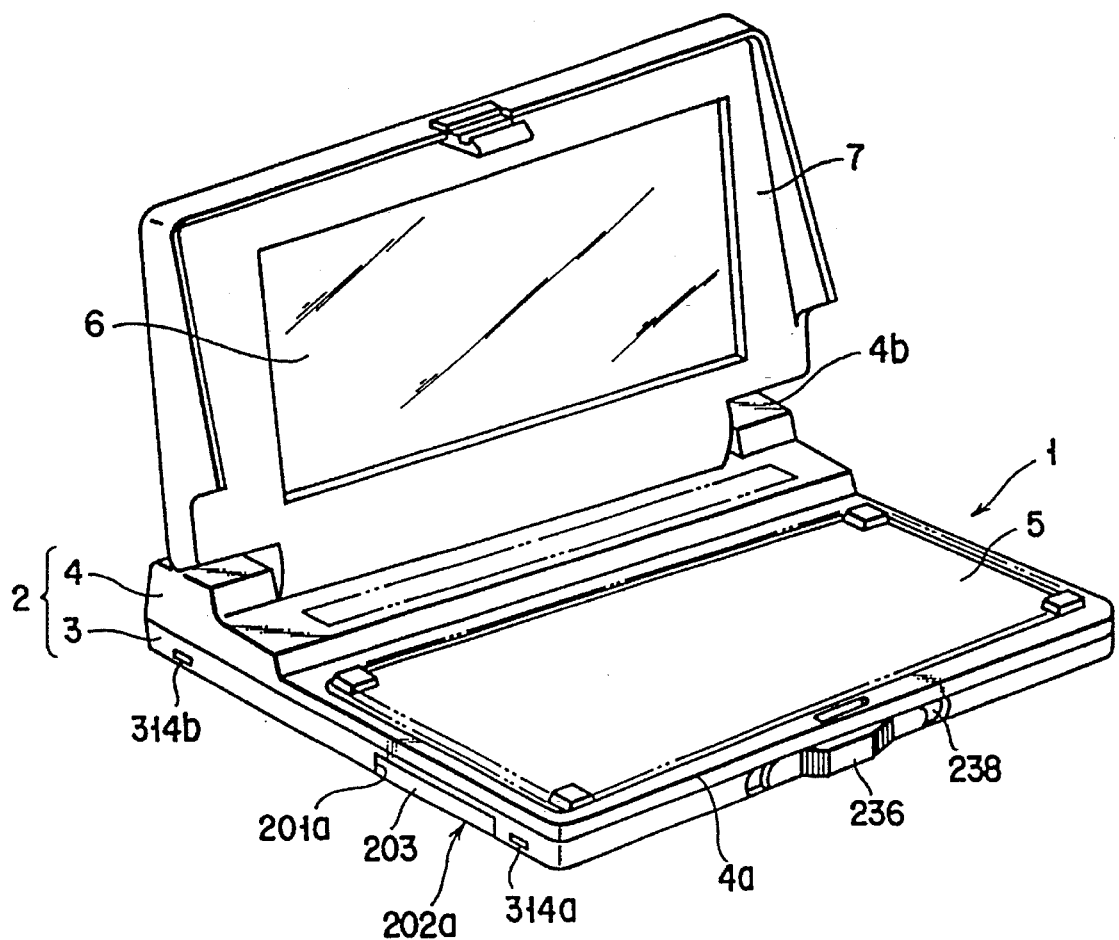

As shown in FIGS. 37, 41, and 42, the case 251 of the expansion unit 250 has an inlet 320, which is similar to the tray inlet 201a of the computer 1, an insertion passage 321, which is similar to the tray insertion passage 212a, and positioning holes 313a, 313b, 314a, and 314b similar to the computer 1. An expansion connector 323 has a number of pin terminals 322 are provided in the final end of the insertion passage 321. The connector 323 is supported by the lower surface of the printed circuit board 253. The inlet 320 is detachably covered with a cover 324, which is similar to the tray 202a of the computer 1. As shown in a two-dotted chain line of FIG. 22, an expansion units 330, which is to be connected to the expansion unit 250, has a connection mechanism including the mounting surface and the connector similar to the expansion unit 250. Due to this, for further expanding the function of the computer 1, as shown in FIG. 22, the expansion units 250 and 330 are overlaid in double or more stages and connected to each other.

The steps for using the personal computer 1 and the step for connecting the expansion unit 250 to the computer 1 will be explained.

In a case where the memory card 11 is incorporated into the computer 1, the tip of the finger is hooked to the end wall 203 of the tray 202a, and the tray 202a is drawn, and detached from the base unit 2.

As for detaching the tray 202a, the memory card 11 is mounted on the space formed in the bottom wall 204 of the tray 202a. In this operation, the tray 202a is moved to the location where the operation can be easily made, and the memory card 11 is horizontally mounted on the bottom wall 204. In this case, the terminal 18 is directed to the claw portions 206a and 206b opposite to the end wall 203, and the terminal 18 is positioned at the top end of the insertion direction of the tray 202a. The memory card 11 may be mounted in the space on the bottom wall 204 in a state that the tray 202a is drawn from the tray inlet 201a without detaching from the base unit 2.

Next, as shown in FIGS. 28 and 29, the tray 202a is inserted into the tray inlet 201a in a state the claw portions 206a and 206b inserted first, so that the slide rail 214 is guided to the the space 217 between the guide rib 210 of the tray 202a and the edge portion of the bottom wall 204. Under this state, the tray 202a is pressed into the tray insertion passage 212a. As a result, the tray 202a is inserted into the tray insertion passage 212a with the memory card 11 along the slide rail 214, thereafter, the convex portion 207 of the memory card 11 is engaged with the engaging concave portion 224 of the first connector 220.

By this engagement, the pin holes 17 of the terminal 18 and the first pin terminals 221 of the first connector 220 are positioned, and the pin holes 17 of the terminal 18 are inserted into the first pin terminals 221 as shown in FIG. 30. In this case, as shown in FIG. 31, the claw portions 206a and 206b of the top end of the tray 202a are introduced into the relief concave portions 223a and 223b of the first connector 220. In accordance with the insertion of the tray 202a, if the end wall 203 of the tray 202a comes in contact with the stopper 215, the tray 202a is inserted up to the predetermined position of the tray insertion passage 212a, and the first pin terminals 221 are completely fitted to the pin holes 17. Thereby, the memory card 11 and the computer 1 are electrically connected to each other, the incorporation of the memory card 11 into the computer 1 is finished. Then, at the same time with this connection, the end wall 203 of the tray 202a is continuous to the side surface 3b of the base unit 2 to be flush therewith, and the tray inlet 201a is closed. Moreover, the bottom wall 204 of the tray 202a is continuous to the bottom surface 3a of the base unit 2 to be flush therewith, and the opening 213 is closed.

For detaching the memory card 11 from the computer 1, the operation member 236, which is exposed to the front surface of the base unit 2, is slid left by the tip of the finger. Thereby, the rotation plate 231 is rotated left in a state that the shaft 233 is used as a fulcrum. As a result, the slide plate 230 on which the rotation plate 231 is overlaid are movably connected to each other by that the coupling pieces 241a and 241b come in contact with the projections 232a and the 232b. Due to this, the slide plate 230 is slid left in accordance with the rotation of the rotation plate 231 as being guided by the guide rails 240a and 240b.

As shown in FIG. 32, the pressing pieces 243a and 243b of the slide plate 230 are projected to the tray insertion passage 212a from the relief concave portions 223a and 223b of the first connector 220, and the claw portions 206a and 206b of the tray 202a are pressed. Therefore, the tray 202a is pressed out in a direction where the tray 202a is away from the first connector 220, and the pin holes 17 of the memory card 11 are detached from the first pin terminals 221, and the end wall 203 of the tray 202a is pressed to the outside of the base unit 2 from the tray inlet 201a. Then, the tip of the finger is hooked to the end wall 203, and the tray 202a is largely drawn from the tray inlet 201a. Under this state, the tip of the finger is inserted into the the concave portions 209a and 209b, and the memory card 11 is taken out of the tray 202a.

Next, the step for connecting the expansion unit 250 to the computer 1 will be explained. FIG. 21 shows the state just before the computer 1 is mounted on the expansion unit 250. Under this state, in the computer 1, the display unit 7 is closed and the entire body of the computer is flat and box-shaped. Also, the tray 202a in left is detached, and the tray inlet 201a and the opening 213 are opened.

As shown in FIGS. 38 and 41, in the expansion unit 250, the connector unit 265 is slid in advance in a left direction where the connector unit 265 is detached from the concave portion 258 on the attaching recess 257, and drawn to the side portion of the case 251.

Under this state, the computer 1 is overlaid on the the mounting surface 256 of the expansion unit 250. At this time, as shown in FIG. 45, the computer 1 is guided onto the mounting surface 256 as being inclined, and the first positioning holes 313a and 313b in the right side surface of the base unit 2 are hooked to the first fixing claws 311a and 311b. Then, the computer 1 is rotated downward in a state that the engagement between the first positioning holes 313a and 313b and the first fixing claws 311a and 311b are used as a fulcrum, and the base unit 2 is overlaid on the mounting surface 256. Thereby, the mounting surface 256 and the computer 1 are roughly positioned, and the terminal holder 268 of the connector unit 265, which is projected onto the mounting surface 256, is inserted into the tray inlet 201a of the computer 1 and the opening 213 as shown in FIG. 41. Under this state, as shown in an arrow of FIG. 41, the slider 266 of the connector unit 256 is slid to the side surface 256b of the attaching recess 257, and the terminal holder 268 is pushed into the tray insertion passage 212a. When the terminal holder 268 reaches up to the position close to the first connector 220, the first guide rails 274a and 274b of the upper portion of the terminal holder 268 slidably come in contact with the lower surface of the slide rail 214 facing the tray inlet 201a. At the same time, the second guide rails 275a and 275b of the lower portion of the terminal holder 268 are slidably fitted to the the guide grooves 261a and 261b of the expansion unit 250. That is, the connector unit 265 is slid in a state that both computer 1 and expansion unit 250 are used as a guide. Then, the computer 1 and the expansion unit 250 are coupled to each other through the terminal holder 268 of the connector unit 265.

By the slide of the connector unit 265, if the second connector 284 reaches just before the first connector 220, the convex portion 287 of the second connector 284 is engaged with the engaging concave portion 224 of the first connector 220. By this engagement, the contacts 285 of the second connector and the pin terminals 222 of the first connector 220 are positioned, and the second pin terminals 222 are fitted to the contacts 285 as shown in FIG. 42. At substantially the same time with this fitting, as shown in FIG. 46, the second fixing claws 312a and 312b of the slider 266 are hooked to the second positioning holes 314a and 314b of the base unit 2. Due to this, the four corners of the base unit 2 are held by the first fixing claws 311a and 311b and second fixing claws 312a and 312b, so that the computer 1 is positioned at the predetermined position on the mounting surface 256.

If the end portion of the terminal holder 268 comes in contact with the stopper 215 in accordance with the slide of the connector unit 265, the terminal holder 268 is inserted up to the predetermined position of the tray insertion passage 212a, and the contacts 285 is completely fitted to the second pin terminals 222. By this fitting, the expansion unit 250 and the computer 1 are electrically connected to each other, and the connection of the expansion unit 250 to the computer 1 is finished. Then, at the same time with this connection, the end portion of the terminal holder 268 is continuous to the side surface 3b of the base unit 2 to be flush therewith, and the tray inlet 201a is closed.

The first fixing claws 311a and 311b are in contact with the second shield layer 254 of the case 251, and the second fixing claws 312a and 312b are in contact with the third shield layer 267 of the slider 266. The leaf springs 315 and 316 with which the top ends of the fixing claws 311a, 311b, 312a, and 312b are contact are brought into contact with the first shield layer 211 of the base unit 2. Due to this, at the time when the computer 1 is positioned on the mounting surface 256 through the fixing claws 311a, 311b, 312b, and 312b, the first shield layer 211, second shield layer 256, and the third shield layer 267 are electrically connected to each other and leakage of the electromagnetic waves can be prevented.

As shown in FIG. 22, for further connecting the other expansion unit 330 to the expansion unit 250 on which the computer 1 is overlaid, the cover 324 of the expansion unit 250 is detached, and the inlet 320 and the insertion passage 321 are opened. Under this state, the expansion unit 250 is overlaid on the other expansion unit 330. Then, the connector unit 265 of the expansion unit 330 may be inserted into the insertion passage 321 in the same steps as the above.

In order to release the connection between the computer 1 and the expansion unit 250, the tip of the finger is hooked to the projections 266a of both end portions of the slider 266, and the slider 266 is slid in a direction where the slider 266 is drawn from the attaching recess 257 as shown in an arrow of FIG. 42. By this slide, the contacts 285 of the second connector 284 are detached from the second pin terminals 222 of the first connector 220, and the convex portion 287 of the second connector 284 is detached from the engaging concave portion 224 of the first connector 220. Sequentially, the first guide rails 274a and 274b of the terminal holder 268 is detached from the slide rail 214 of the tray insertion passage 212a, and the second guide rails 275a and 275b are detached from the guide grooves 261a and 261b of the expansion unit 250. Thereby, the connection between the computer 1 and the expansion unit 250 by the terminal holder 268 are released.

Moreover, by the side of the slider 266, the second fixing claws 312a and 312b are detached from the second positioning holes 314a and 314b, so that the positioning of the left end portion of the computer 1 and the mounting surface 256 is released. Under this state, the left end portion of the computer 1 rises, and the computer 1 is drawn left. Thereby, the first positioning holes 313a and 313b are detached from the first fixing claws 311a and 311b, and the connection between the computer 1 and the expansion unit 250 is released.

According to the above-structured electronic apparatus system, the first connector 220 for connecting the memory card 11 to the computer 1 can be used as a connector for the expansion unit 250. Therefore, there is no need of a dedicated connector for the expansion unit 250, the number of the parts can be reduced, and the size and the weight of the computer 1 can be reduced.

Moreover, according to the above structure, the slidable connector unit 265 is provided on the mounting surface 256 of the expansion unit 250, and the connector unit 256 is inserted into the tray insertion passage 212a of the computer 1. Thereby, the second connector 284 of the connector unit 256 is connected to the first connector 220 in the tray insertion passage 212a. Therefore, the computer 1 can be connected to the expansion unit 250 without using the external connection cable. Moreover, only if the mounting space for the computer 1 is provided, the connection of the expansion unit 250 to the computer 1 can be made, and the mounting space, which is necessary for expanding the function of the computer 1, can be set to a minimum. Furthermore, the first connector 220 has the first pin terminals 221 to which the terminal 18 of the memory card 11 is connected and the second pin terminals 222 to which the second connector 284 of the expansion unit 250 is connected. Due to this, one connector 220 can be connected to both the terminal 18 of the memory card 11 whose number of pins is different and the second connector 284. Therefore, the circuit change between the memory card 11 and the expansion unit 250 can be performed without using the changing structure of the circuit.

Furthermore, the first connector 220 and the second connector 284 are connected to each other in a state that the computer 1 is positioned at the fixed position on the mounting surface 256 by the first fixing claws 311a, 311b, and the second fixing claws 312a and 312b. Therefore, the connection between the expansion unit 250 to the computer 1 can be smoothly made without applying excessive force to the connecting portion between the connectors 220 and 284. Moreover, the slider 266 of the connector unit 265 is drawn, so that the the connector unit 265 can be detached from the computer 1, and no dedicated detaching mechanism is needed.

The present invention invention is not limited to the above second embodiment. Various modifications can be worked within the scope of the invention.

In the second embodiment, the expansion unit is connected to the computer into which the memory card can be incorporated. However, for example, it is possible to connect the expansion unit to a computer having a card containing section in which an interface card interfacing to the external input device, and a connector, which can connect a terminal of the interface card to the card containing section.

Moreover, the expansion device is not limited to FDD. For example, a modem device, which is connected to a telephone line, may be used.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic apparatus system comprising:

a card-like electronic part having a terminal;

an electronic apparatus unit having a card insertion position into which said card-like electronic part is accessibly inserted;

wherein said electronic apparatus unit includes a bottom surface and a side surface continuous to said bottom surface, wherein said side surface has an inlet into which said card-like electronic part is detachably inserted with the terminal first and said bottom surface has an opening corresponding to the card insertion position of said card-like electronic part, and wherein a first connector to which said terminal of the card-like electronic part is detachably connected is arranged in said opening;

an expansion unit containing an expansion device for expanding the function of said electronic apparatus unit, said expansion unit having a main body with a mounting surface on which the bottom surface of said electronic apparatus unit is removably overlaid, and a slider provided on said main body to be movable in an insertion direction of said card-like electronic part, said slider having an upper surface to be flush with the mounting surface, said upper surface facing the inlet of the electronic apparatus unit and the opening when the electronic apparatus unit is overlaid on the mounting surface; and a second connector provided in said slider, wherein said second connector enters the opening when said card-like electronic part is separated from said card insertion position, and said second connector is connected to the first connector by the movement of said slider, thereby electrically connecting the expansion device to the electronic apparatus unit.

2. The system according to claim 1, wherein said electronic apparatus unit comprises a tray which is allowed to be inserted into said electronic apparatus unit when said second connector is out of said electronic apparatus unit, wherein said tray has a bottom wall, which covers the opening and contains a holding wall holding the card-like electronic part, and an end wall, which is continuous to the bottom wall and covers the inlet, and said card-like electronic part is inserted into the electronic apparatus unit from the inlet in an insertion direction with the card-like electronic part being supported by the tray.

3. The system according to claim 2, wherein said bottom wall comprises a pair of edge portions extending along the insertion direction of the card-like electro nic part, and said opening comprises a pair of slide rails slidably contacting the edge portions and guiding the insertion direction of the tray.

4. The system according to claim 3, wherein the mounting surface of the expansion unit has substantially the same shape and size as the bottom surface of the electronic apparatus unit.

5. The system according to claim 4, wherein said expansion unit has a side surface continuous to the side surface of the electronic apparatus unit, said mounting surface has an attaching recess to which said slider is attached, said attaching recess is opened in the side surface of the expansion unit and has a bottom surface on which the slider is mounted and a side surface continuous to the bottom surface and said mounting surface in series, and the slider has an upper surface forming a part of the mounting surface when the slider is attached to the attaching recess.

6. The system according to claim 5, wherein said mounting surface has a concave portion continuous to the side surface of the attaching recess, the concave portion opposite to the opening of the electronic apparatus unit, and has a cable insertion hole continuous to the expansion unit and a pair of edges having a guide groove extending in a moving direction of the slider.

7. The system according to claim 6, wherein said slider has a terminal holder projected onto the mounting surface, the terminal holder enters the inlet and the opening when the card-like electronic part and the tray are removed from said electronic apparatus unit, wherein the terminal holder has an end portion opposite to the first connector in the opening, and a terminal base having the second connector is attached to the end portion.

8. The system according to claim 7, wherein said terminal holder comprises a first guide portion, which is slidably guided to the slide rails, and a second guide portion, which is slidably guided to the guide groove.

9. The system according to claim 7, wherein said terminal base is held in said terminal holder in a floating state to be changeable in upper and lower direction.

10. The system according to claim 7, wherein said terminal holder has a through hole continuous to the cable insertion hole of the mounting surface, and a cable for electrically connecting the second connector to the expansion device is inserted through the through hole and the cable insertion hole.

11. The system according to claim 2, wherein said bottom wall of said tray is continuous to the bottom surface of the electronic apparatus unit to be flush therewith and forms a part of the bottom surface, and the end wall of the tray is continuous to the side surface of the electronic apparatus unit to be flush therewith, and forms a part of the side surface.

12. The system according to claim 2, wherein said electronic apparatus unit comprises a printed circuit board having the first connector held on its lower surface, a case containing the printed circuit board, said case having a bottom inner surface opposite to the first connector, and a space is provided between the bottom inner surface and the first connector.

13. The system according to claim 12, wherein said electronic apparatus unit further comprises a pushing mechanism having a slide plate which is located on the bottom inner surface of the case such that the slide plate is linearly slidable, in the insertion direction of the tray, between a first position where the slide plate is in contact with the tray to project the tray from the inlet and a second position where the slide plate is separated from the tray to permit the tray to be inserted into said electronic apparatus unit, a rotation plate having one end rotatably supported to the bottom inner surface by a shaft, and another end with an operation member, for sliding the slide plate, and a spring member for holding said slide plate at a neutral position where the slide plate is separated from the tray.

14. The system according to claim 13, wherein said pushing mechanism is arranged in the space between the first connector and the bottom inner surface of the case.

15. The system according to claim 13, wherein said slide plate has an upper surface on which the rotation plate is overlaid, and an engaging portion engaging with the rotation plate and interlocking the slide plate with the rotation plate, and said spring member has a coil portion around said shaft, and a leg portion, which is extended from the end portion of the coil portion and hooked to the engaging portion.

16. The system according to claim 1, wherein said expansion unit further comprises a fixing mechanism for fixing the electronic apparatus unit to a fixed position on the mounting surface, said fixing mechanism has a pair of first fixing claws provided in the main body and a pair of second fixing claws provided in the slider, and these first and second fixing claws are opposite to each other on the mounting surface, and detachably engaged with the side surface of the electronic apparatus unit.

17. The system according to claim 16, wherein the side surface of the electronic apparatus unit comprises a plurality of positioning holes with which the first and second fixing claws are detachably engaged.

18. The system according to claim 16, wherein said claws are formed of conductive metal.

19. The system according to claim 18, wherein said electronic apparatus unit comprises an inner surface having a first shield layer, said expansion unit comprises an inner surface having a second shield layer, said plurality of positioning holes have a plurality of conductive spring pieces electrically connected to the second shield layer, the spring pieces coming in contact with the fixing claws when the first and second fixing claws are engaged with the positioning holes, and the first and second shield layers are electrically connected to each other.

20. The system according to claim 1, wherein said electronic apparatus unit comprises a base unit having an input device in its upper surface, and a display unit having a flat panel display rotatably coupled to the base unit, said display unit can be rotated between a closed position where the input device is covered an open position where the input device can be operated.

* * * * *